(12) United States Patent
Yoshizawa et al.

(10) Patent No.: US 10,138,807 B2
(45) Date of Patent: Nov. 27, 2018

(54) DRIVE DEVICE PROVIDED WITH XY-SEPARATING CRANK MECHANISM

(71) Applicant: Z Mechanism Technology Institute Co., Ltd., Yonezawa-shi, Yamagata (JP)

(72) Inventors: Yasuo Yoshizawa, Yonezawa (JP); Takumi Yoshizawa, Yonezawa (JP); Yutaka Yoshizawa, Yonezawa (JP); Satoshi Yoshizawa, Yonezawa (JP); Shuji Ogai, Osaka (JP)

(73) Assignee: Z MECHANISM TECHNOLOGY INSTITUTE CO., LTD., Yonezawa-shi (JP)

( * ) Notice: Subject to any disclaimer, the term of this patent is extended or adjusted under 35 U.S.C. 154(b) by 0 days.

(21) Appl. No.: 15/693,060

(22) Filed: Aug. 31, 2017

(65) Prior Publication Data

US 2018/0030889 A1    Feb. 1, 2018

Related U.S. Application Data

(63) Continuation of application No. PCT/JP2016/056655, filed on Mar. 3, 2016.

(30) Foreign Application Priority Data

Mar. 3, 2015  (WO) .................. PCT/JP2015/056215
Dec. 8, 2015  (JP) ................................ 2015-239743

(51) Int. Cl.
*F02B 75/22*    (2006.01)
*F02B 75/24*    (2006.01)
(Continued)

(52) U.S. Cl.
CPC ................ *F02B 75/28* (2013.01); *F01B 1/10* (2013.01); *F01B 9/02* (2013.01); *F02B 33/18* (2013.01);
(Continued)

(58) Field of Classification Search
CPC .......... F02B 75/28; F02B 33/18; F02B 75/18; F02B 75/32; F01B 1/10; F01B 9/02;
(Continued)

(56) References Cited

U.S. PATENT DOCUMENTS 2,409,555 A    10/1946  Gadoux
4,466,400 A    8/1984   Irimajiri
(Continued)

FOREIGN PATENT DOCUMENTS

JP    54-160943 A    12/1979
JP    56-027047 A     3/1981
(Continued)

OTHER PUBLICATIONS

International Search Report issued in connection with PCT International Application No. PCT/JP2015/056215.
(Continued)

*Primary Examiner* — Syed O Hasan
(74) *Attorney, Agent, or Firm* — John P. White; Cooper & Dunham LLP

(57) ABSTRACT

According to one embodiment, a drive device includes a first piston reciprocatively along a first direction within a first mount plane, a first crankshaft orthogonal to the first mount plane, a first XY separation crank mechanism between the first piston and the first crankshaft, which converts reciprocating motion of the first piston and rotary motion of the first crankshaft into each other, a second piston reciprocatively along a second direction symmetrical to the first direction within a second mount plane symmetrical to the first mount plane about a central reference plane, a second crankshaft orthogonal to the second mount plane, a second XY separation crank mechanism between the second piston and the second crankshaft, which converts reciprocating motion of the second piston and rotary motion of the second crankshaft
(Continued)

into each other, and a coupler-synchronizing mechanism which rotates the first and second crankshafts in synchronous with each other.

18 Claims, 31 Drawing Sheets

(51) Int. Cl.
| | |
|---|---|
| *F02B 75/28* | (2006.01) |
| *F02B 75/18* | (2006.01) |
| *F02B 75/32* | (2006.01) |
| *F02B 33/18* | (2006.01) |
| *F01B 1/10* | (2006.01) |
| *F16H 21/18* | (2006.01) |
| *F04B 27/02* | (2006.01) |
| *F02F 1/18* | (2006.01) |
| *F02F 3/28* | (2006.01) |
| *F16C 3/12* | (2006.01) |
| *F01B 9/02* | (2006.01) |

(52) U.S. Cl.
CPC .............. *F02B 75/18* (2013.01); *F02B 75/32* (2013.01); *F02F 1/186* (2013.01); *F02F 3/28* (2013.01); *F04B 27/02* (2013.01); *F16C 3/12* (2013.01); *F16H 21/18* (2013.01)

(58) Field of Classification Search
CPC ... F02F 1/186; F02F 3/28; F04B 27/02; F16C 3/12; F16H 21/18
USPC .................. 123/52.1, 53.3, 53.6, 55.7, 55.6
See application file for complete search history.

(56) References Cited

U.S. PATENT DOCUMENTS

| | | | | |
|---|---|---|---|---|
| 5,259,256 | A * | 11/1993 | Brackett | F01B 9/023 |
| | | | | 123/55.3 |
| 5,560,327 | A * | 10/1996 | Brackett | F01B 9/023 |
| | | | | 123/197.1 |
| 5,873,332 | A | 2/1999 | Yaue | |
| 8,555,828 | B2 * | 10/2013 | Jones | F01L 1/047 |
| | | | | 123/47 A |
| 8,960,138 | B2 * | 2/2015 | Leone | F16F 15/24 |
| | | | | 123/52.1 |
| 2013/0199463 | A1 | 8/2013 | Pischinger et al. | |
| 2013/0239930 | A1 | 9/2013 | Leone | |
| 2013/0319349 | A1 | 12/2013 | Obrist | |
| 2014/0041622 | A1 * | 2/2014 | Yoshizawa | F04B 9/04 |
| | | | | 123/197.4 |

FOREIGN PATENT DOCUMENTS

| | | | |
|---|---|---|---|
| JP | 07-243328 | A | 9/1995 |
| JP | 09-068216 | A | 3/1997 |
| JP | 09-324652 | A | 12/1997 |
| JP | 10-159572 | A | 6/1998 |
| JP | 2004-316576 | A | 11/2004 |
| JP | 2008-045516 | A | 8/2006 |
| JP | 2006-307961 | A | 11/2006 |
| JP | 2007-270653 | A | 10/2007 |
| JP | 2013-534586 | A | 9/2013 |
| JP | 2013-545920 | A | 12/2013 |
| JP | 2014-111921 | A | 6/2014 |
| JP | 2014-152609 | A | 8/2014 |
| WO | WO 2008/010490 | A1 | 1/2008 |
| WO | WO 2012/144073 | A1 | 10/2012 |

OTHER PUBLICATIONS

International Search Report issued in connection with PCT International Application No. PCT/JP2016/056655.

* cited by examiner

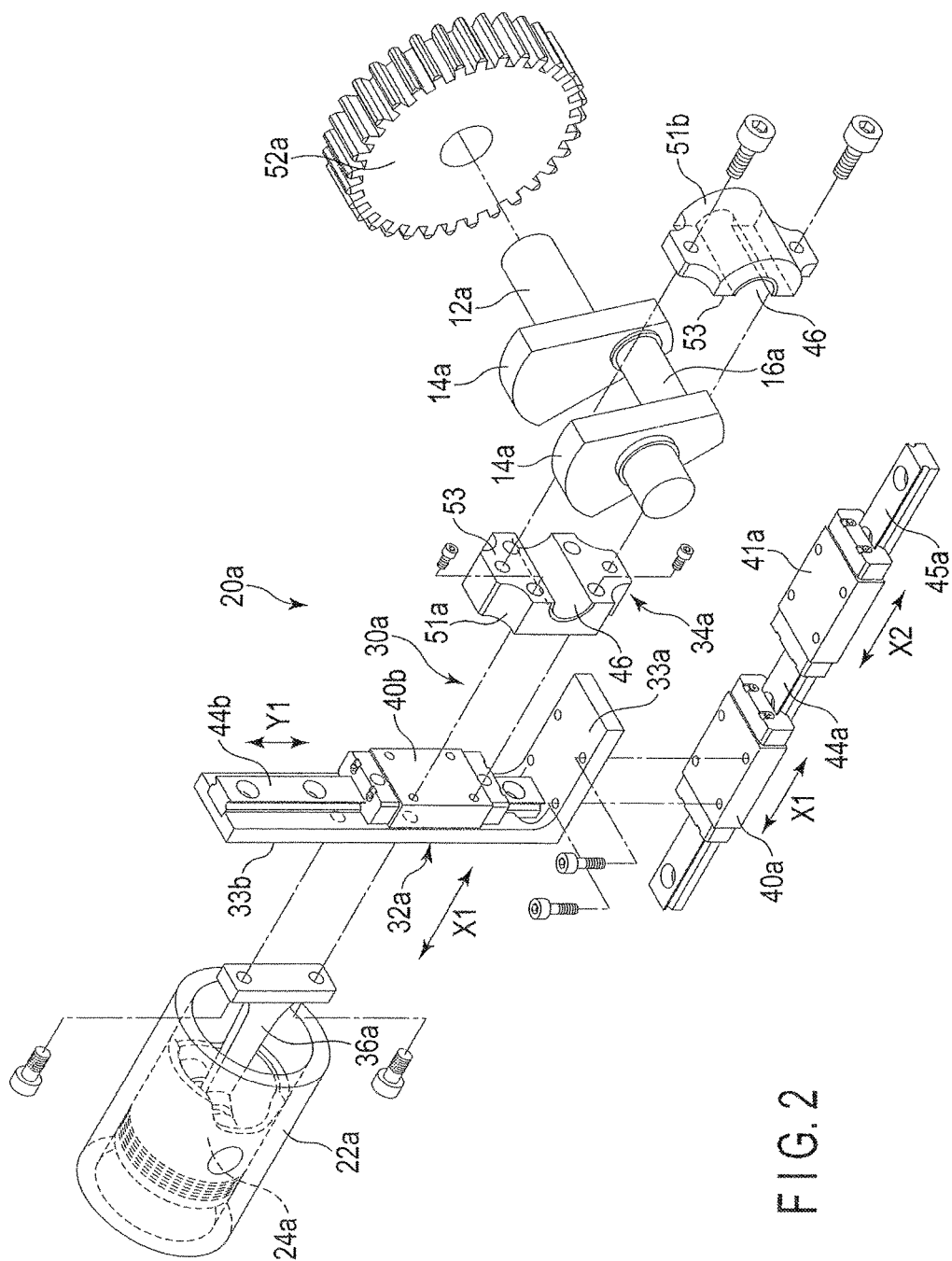
F I G. 2

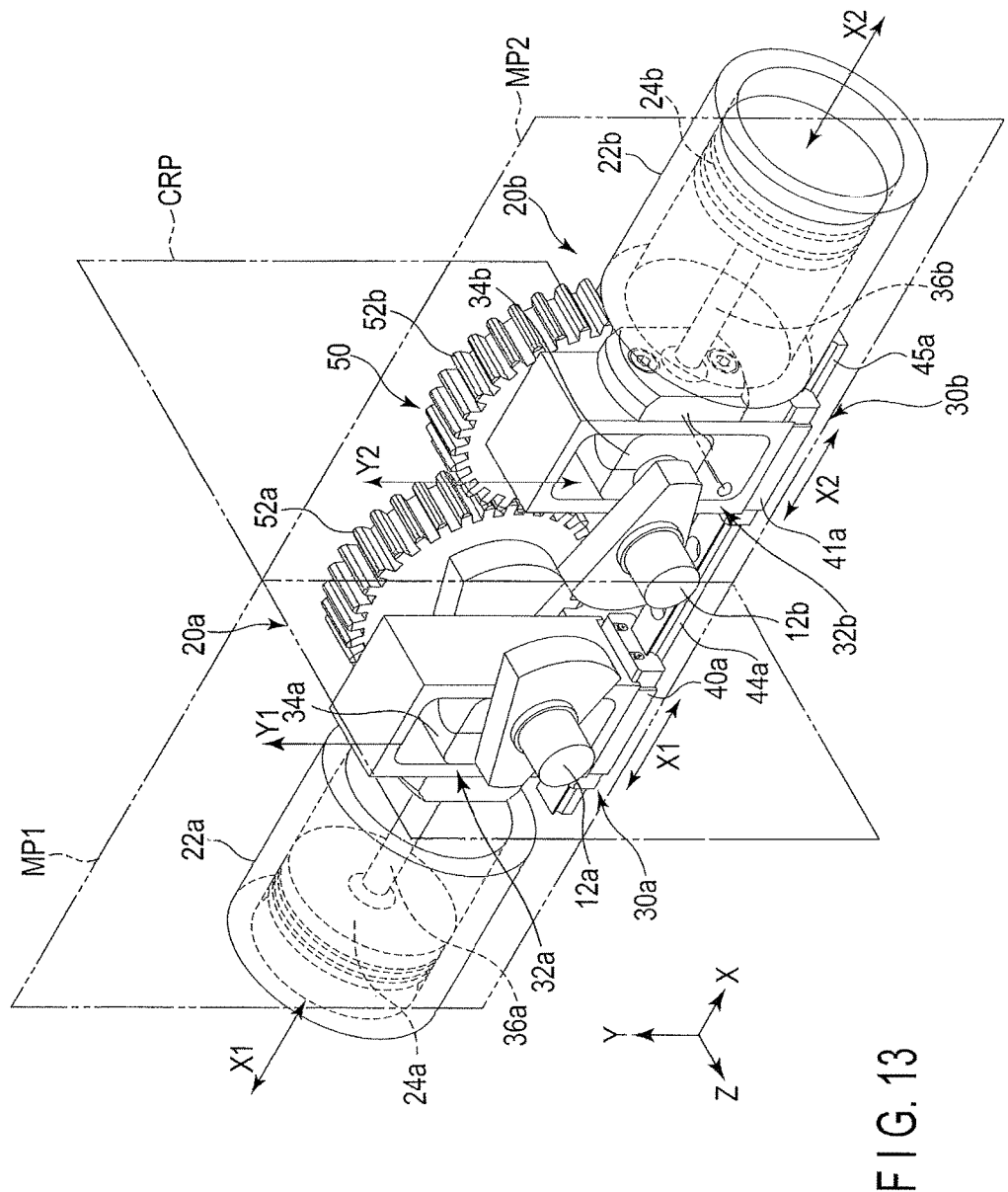
F I G. 13

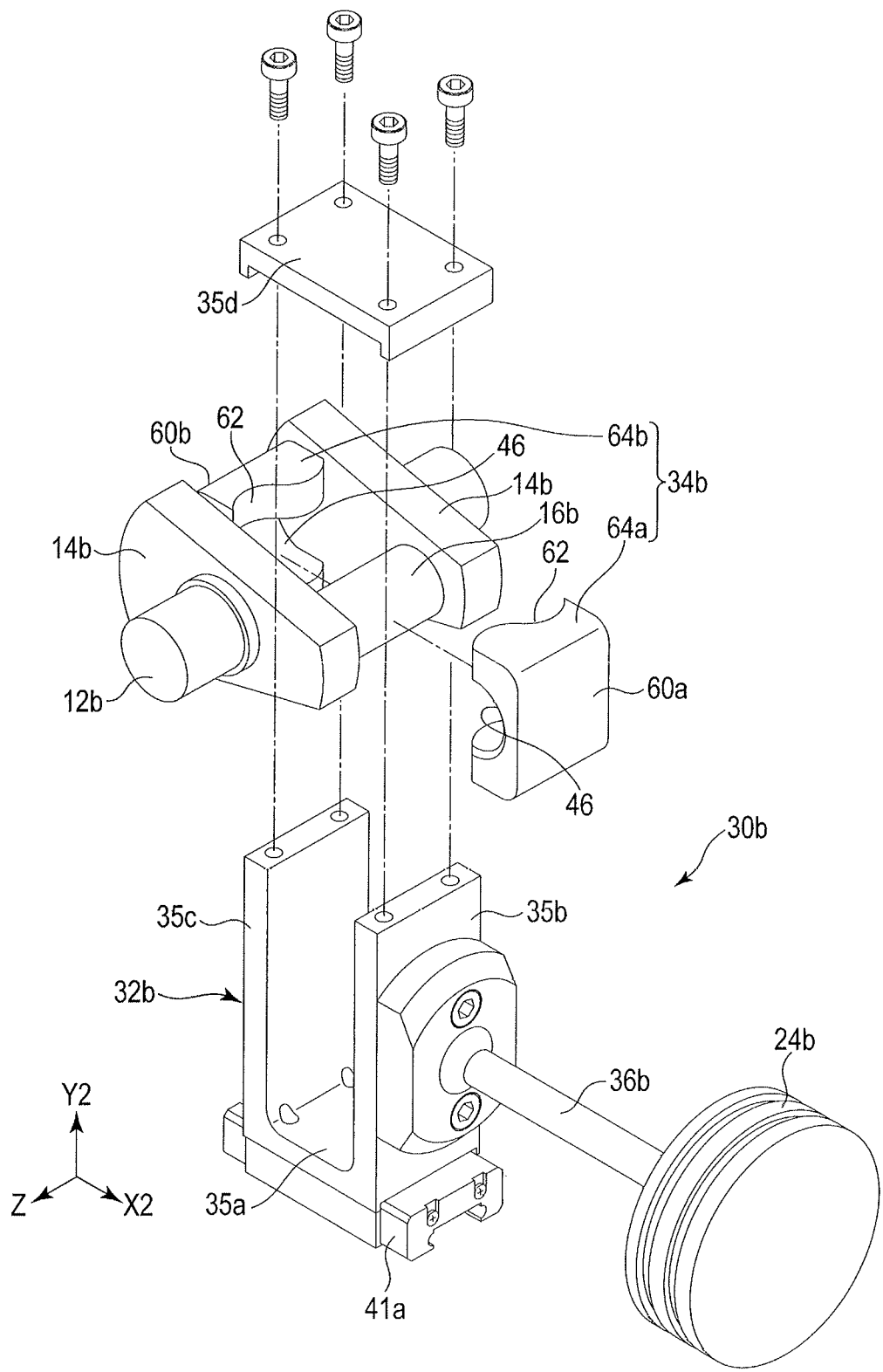
F I G. 14

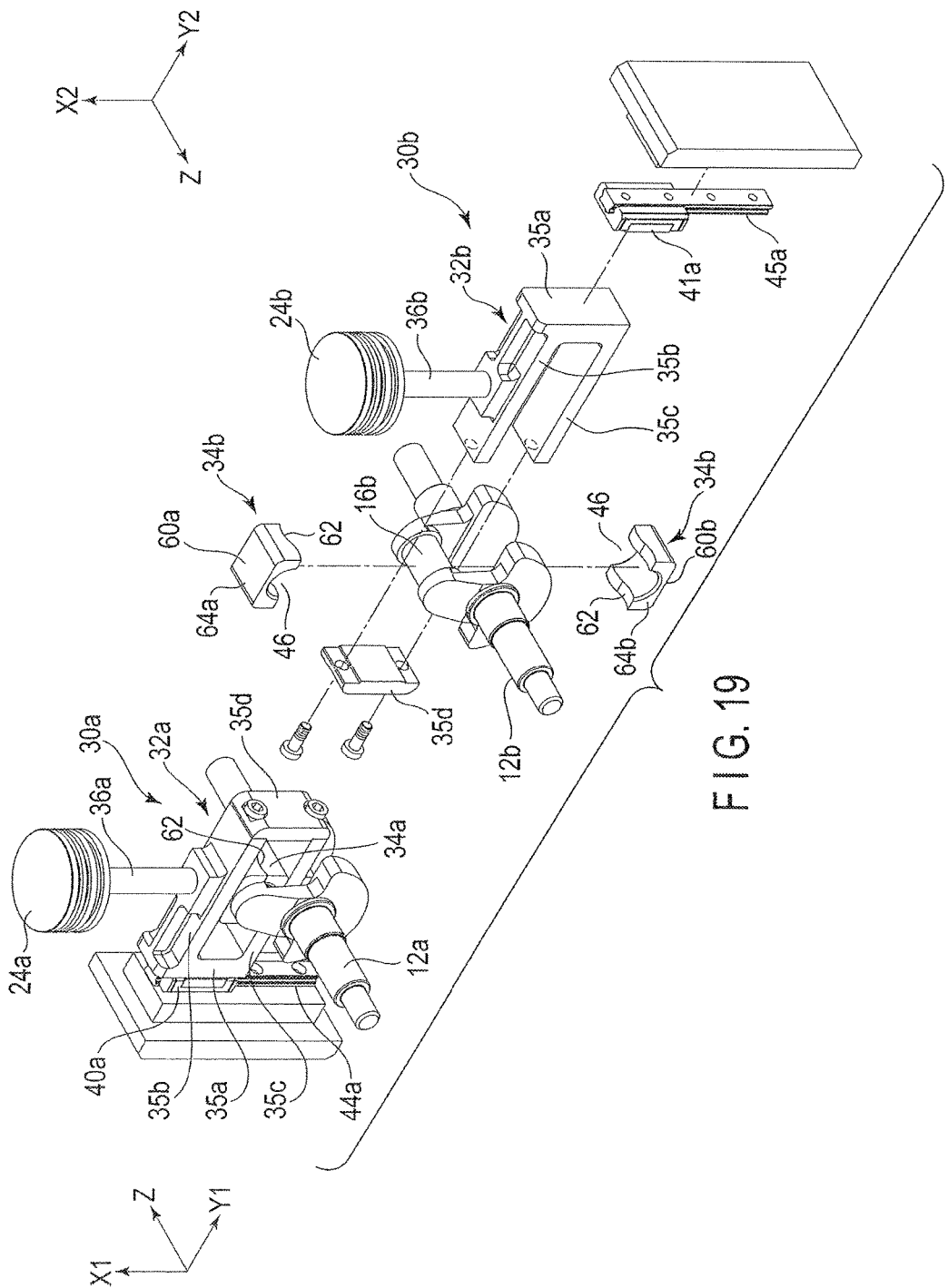
F I G. 19

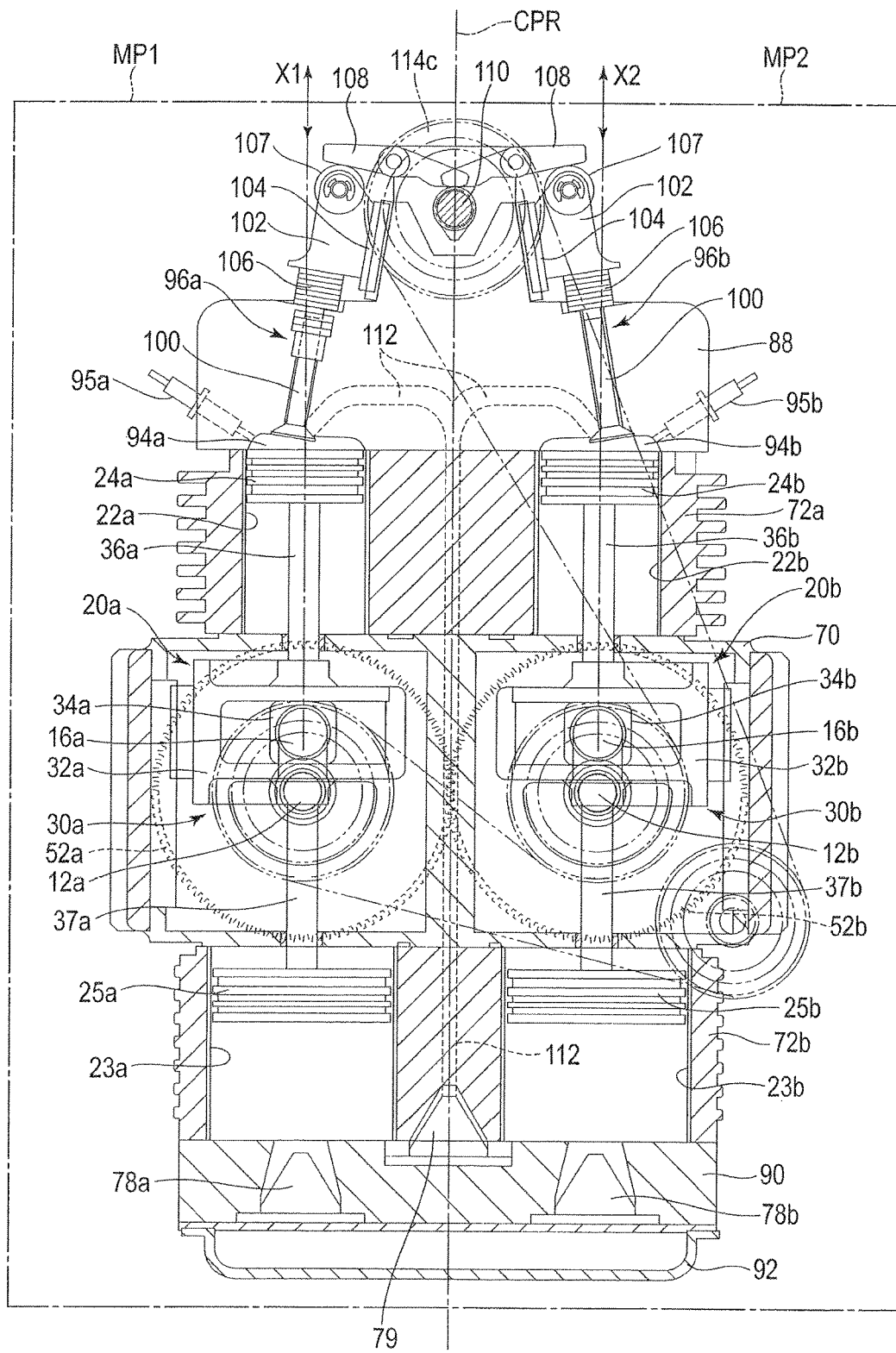
F I G. 22

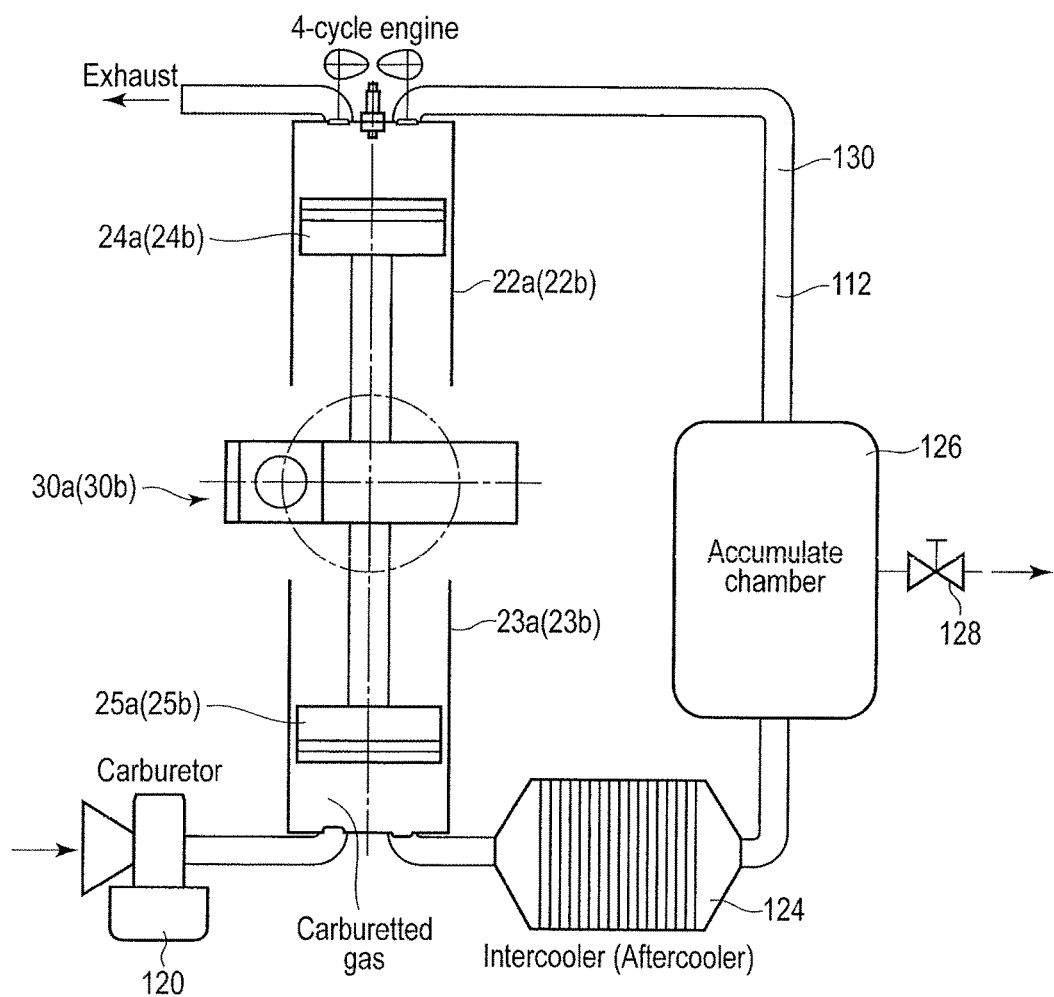
F I G. 24

DRIVE DEVICE PROVIDED WITH XY-SEPARATING CRANK MECHANISM

CROSS-REFERENCE TO RELATED APPLICATIONS

This is a Continuation application of PCT Application No. PCT/JP2016/056655, filed Mar. 3, 2016 and based upon and claims the benefit of priority from the prior PCT Application No. PCT/JP2015/056215, filed Mar. 3, 2015, and Japanese Patent Application No. 2015-239743, filed Dec. 8, 2015, and is based upon the prior Japanese Patent Application No. 2015-512407, filed Mar. 3, 2015, the entire contents of which are incorporated herein by reference.

FIELD

Embodiments described herein relate generally to a driving device comprising an XY separate crank mechanism that transmits reciprocating motion by converting the reciprocating motion into rotational motion or transmits rotational motion by converting the rotational motion into reciprocating motion.

BACKGROUND

A crank mechanism is known as a Mechanism that transmits reciprocating motion by converting the reciprocating motion into rotational motion. For example, engines, compressors and the like include a piston provided reciprocatively inside a cylinder, a coupling rod rotatably connected to the piston, and a crankshaft extending in a direction perpendicular to the direction of reciprocating movement of the piston. The other end of the coupling rod is rotatably connected to a crank pin provided eccentrically with respect to the crankshaft. When the piston reciprocates inside the cylinder, the reciprocating motion is converted into rotational motion of the crankshaft by oscillations of the coupling rod and eccentric rotation of the crankshaft.

In the crank mechanism configured as described above, normally the coupling rod is rotatably connected to the piston via a piston pin and, when power is transmitted, is translated while oscillating about the piston pin. Thus, a force in a rotation direction acts on the piston, causing a frictional loss in a wedge effect shape on a cylinder inner surface at two locations, an outer circumferential portion at a top edge and an outer circumferential portion at a bottom edge of the piston. Normally, smooth reciprocating motion of the piston is enabled by reducing the frictional loss by using a lubricant. However, when a large piston is used, oil may run out, which manifests itself as a sticking phenomenon.

To reduce sticking by such a frictional loss, a driving mechanism provided with a cross head between the piston and coupling rod or using a short piston for a small engine has been proposed.

However, while it is possible to increase the degree of sealing of the piston by providing a cross head, a frictional loss changing every 180° is caused by a wedge effect at two locations also in the cross head. Thus, while a reciprocating motion is produced as a motion, a loss is caused by vibration derived from the reciprocating motion.

BRIEF DESCRIPTION OF THE DRAWINGS

FIG. 2 is an exploded perspective diagram showing a first drive unit of the drive device.

FIG. 13 is a perspective diagram showing a driving device according to a tenth embodiment.

FIG. 14 is an exploded perspective diagram showing an XY separate crank mechanism of the drive unit according to the tenth embodiment.

FIG. 19 is an exploded perspective diagram showing an XY separate crank mechanism of the drive unit according to the eleventh embodiment.

FIG. 22 is a partially exploded perspective diagram showing the front side of the drive unit according to the twelfth embodiment.

FIG. 24 is a diagram schematically showing an example of an intake-and-exhaust system of the drive unit according to the twelfth embodiment.

DETAILED DESCRIPTION

Figure 1:
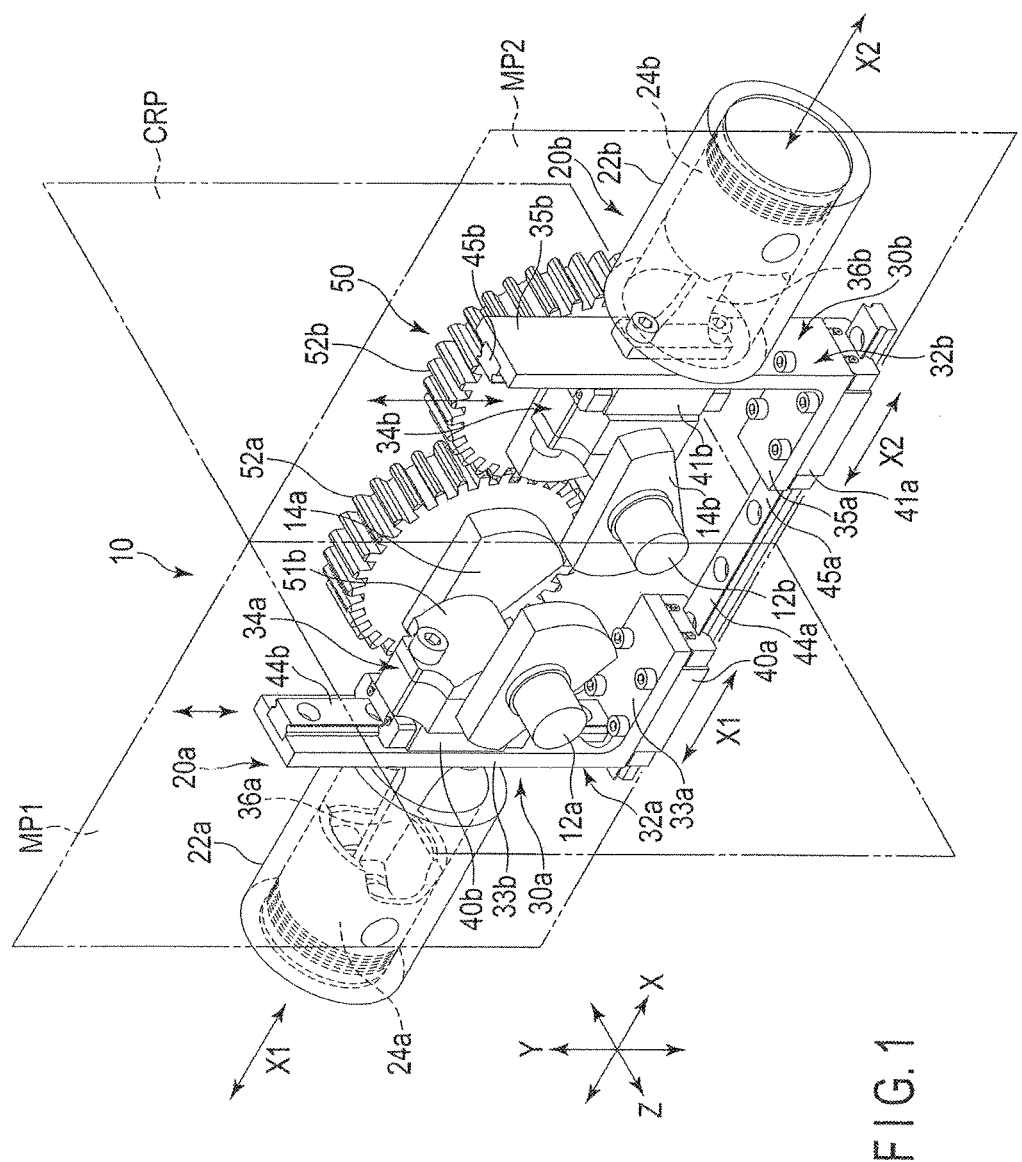
FIG. 1 is a perspective diagram showing a driving apparatus according to a first embodiment.

Various embodiments will be described hereinafter with reference to the accompanying drawings. In general, according to one embodiment, a drive device includes a first cylinder in a first mount plane located on one side of a central reference plane, a first piston in the first cylinder reciprocatively along a first direction within the first mount plane, a first crankshaft extending orthogonal to the first mount plane, a first XY separation crank mechanism between the first piston and the first crankshaft within the first mount plane, which converts reciprocating motion of the first piston and rotary motion of the first crankshaft into each other, a second cylinder in a second mount plane located on an opposite side of the central reference plane and located in the second mount plane symmetrical to the first mount plane with regard to the central reference plane, a second piston in the second cylinder reciprocatively along a second direction symmetrical to the first direction within the second mount plane, a second crankshaft extending orthogonal to the second mount plane, a second XY separation crank mechanism between the second piston and the second crankshaft within the second mount plane, which converts reciprocating motion of the second piston and rotary motion of the second crankshaft into each other, and a coupler-synchronizing mechanism which couples the first crankshaft and the second crankshaft with each other and rotates the first crankshaft and the second crankshaft in synchronous with each other.

The first XY separation crank mechanism comprises a first support member provided reciprocatively along in the first direction, a first crank connection member mounted to the first support member reciprocatively along the third direction orthogonal to the first direction within the first mount plane, to which a crankpin of the first crankshaft is engaged rotatably, a first coupling member which couples the first piston and the first support member with each other and a third coupling member which couples the third piston and the first support member with each other, and the second XY separation crank mechanism comprises a second support member provided reciprocatively along the second direction; a second crank connection member mounted to the second support member reciprocatively along the fourth direction orthogonally to the second direction within the second mount plane, to which a crankpin of the second crankshaft is engaged rotatably, a second coupling member which couples the second piston and the second support member and a fourth coupling member which couples the second piston and the fourth support member.

Z-mechanism XY separate crank mechanisms according to embodiments and various driving apparatus provided therewith will be described with reference to the drawings. Structures common in embodiments are denoted by the same reference numbers or symbols. Overlapping explanations are omitted. Each figure is an exemplary diagram of an embodiment to prompt understanding of the embodiment. The shapes, dimensions or ratios in the drawings may differ from those of the actual device. However, they may be appropriately changed in consideration of the explanation below and known art.

First Embodiment

FIG. 1 is a perspective diagram showing a drive device according to the first embodiment and FIG. 2 is an exploded perspective diagram showing a first drive unit of the drive device.

In this embodiment, the drive device is constituted as, for example, an engine or a compressor. As shown in FIG. 1, a drive device 10 comprises a first drive unit 20a including a first crankshaft 12a, a second drive unit 20b including a second crankshaft 12b and a coupler-synchronizing mechanism 50 which couples the first crankshaft 12a and the second crankshaft 12b with each other and synchronously rotates them.

The first drive unit 20a and the second drive unit 20b have the same structure. The first drive unit 20a and the second drive unit 20b are arranged on the respective sides of a central reference plane CRP and further the first drive unit 20a and the second drive unit 20b are arranged to be symmetrical with respect to the central reference plane CRP in terms of lateral and longitudinal directions (mirror arrangement).

In this embodiment, the first drive unit 20a comprises a first cylinder 22a located on one side of the central reference plane CRP and provided on a first mount plane MP1 which intersects orthogonally with the central reference plane CRP, a first piston 24a provided in the first cylinder 22a to be reciprocative along a first direction within the first mount plane MP1, the first crankshaft 12a extending orthogonal to the first mount plane MP1 and a first XY separate crank mechanism 30a provided between the first piston 24a and the extending first crankshaft 12a and within the first mount plane MP1, which converts reciprocating motion of the first piston 24a to rotational motion of the first crankshaft 12a and vice versa. A piston with a circular cross section is used for the first piston 24a.

In this embodiment, the first direction, which is the reciprocating direction of the first piston 24a, is defined as a first direction X1 orthogonal to the central reference plane CRP. The first crankshaft 12a is disposed substantially parallel to the central reference plane CRP.

The second drive unit 20b comprises a second cylinder 22b located on an opposite side of the central reference plane CRP and provided on a second mount plane MP2 intersecting orthogonally to the central reference plane CRP, the second piston 24b provided in the second cylinder 22b to be reciprocatively in a second direction within the second mount plane MP2, a second crankshaft 12b extending orthogonal to the second mount plane MP2 and a second XY separate crank mechanism 30b provided between the second piston 24b and the second crankshaft 12b and within the second mount plane MP2, which converts reciprocating motion of the second piston 24b to rotational motion of the second crankshaft 12b and vice versa. A piston with a circular cross section is used for the second piston 24b.

The second mount plane MP2 is located symmetrical with the first mount plane MP1 with respect to the central reference plane CRP. The second direction which is the direction of reciprocation motion of the second piston 24a is symmetrical with the first direction X1 mentioned above, and is defined as a second direction X2 orthogonal to the central reference plane CRP. The first direction X1 and the second direction X2 make an angle of 180 degrees, that is, they are along the same direction. The first piston 24a and the second piston 24b are arranged to be coaxial.

As shown in FIGS. 1 and 2, the first crankshaft 12a of the first drive unit 20a is supported rotatably with a bearing (not shown) by both axial ends of the shaft. One set of crank webs 14a are fixed to a halfway portion of the first crankshaft 12a, and a crankpin 16a is fixed between the crank webs 14a. The central axis of the crankpin 16a is located to be parallel and also eccentrically with respect to the first crankshaft 12a. The crankpin 16a eccentrically rotates around the first crankshaft 12a according to the rotation of the first crankshaft 12a.

A first XY separate crank mechanism 30a is provided between the first piston 24a and the first crankshaft 12a and configured to convert the reciprocating motion of the first piston 24a along the first direction X1 and the rotary motion of the first crankshaft 12a to each other to be transmitted.

The first XY separate crank mechanism 30a comprises, in the first mount plane MP1 including the central axis of the first piston 24a (the moving shaft or the X-axis), a first support member (L-shaped combinatory member) 32a provided reciprocatively along the first direction X1, a first crank connection member (crank connection plate) 34a attached to the first support member 32a so as to be reciprocative along the third direction Y1 (Y-axis direction) orthogonal to the first direction X1 in the first mount plane MP1, and a first coupling rod 36a as a coupling member which couples the first piston 24a and the first support member 32a. The movable central axis (the first direction X1) of the first support member 32a, the movable central axis (the third direction Y1) of the first crank connection member 34a, and the movable central axis (the first direction X1) of the first coupling rod 36a are located in the first mount plane MP1.

The first support member 32a is formed into, for example, an L shape and comprises a first support portion 33a extending along the first direction X1 and a second support portion 33b extending along the third direction Y1 from one end (a left end, here) of the first support portion 33a, as an integrated member. A first linear slider 40a is fixed to the first support portion 33a. Further, a guide rail 44a is installed in an inner surface of the housing (not shown) so as to extend along the first direction X1 within the first mount plane MP1. The first linear slider 40a is supported and guided reciprocatively by the guide rail 44a. Thus, of the first support members 32a, only the first support portion 33a is supported reciprocatively on the guide rail 44a along the first direction X1.

A guide rail 44b extending along the third direction Y1 is fixed to the second support portion 33b of the first support member 32a or is formed to be integrated with the second support portion. A second linear slider 41a is mounted to the first crank connection member 34a so as to extend along the third direction Y1. The second linear slider 41a is supported and guided reciprocatively by the guide rail 45a. Thus, only one end of the first crank connection member 34a is supported by the first support member 32a reciprocatively along the third direction Y1.

The first and the second linear sliders 40a and 41a may comprise ball bearings build therein, which rollably contact the guide rails 44a and 45a, respectively.

The first crank connection member 34a is formed into, for example, a circular block shape, and comprises a through-hole 46 having a circular cross section. The first crank connection member 34a is formed to be dividable into a first half portion 51a and a second half portion 51b nu a dividing surface 53 containing a center of the through-hole 46, and the second half portion 51b is fixed to the first half portion 51a with a screw or the like. The second linear slider 41a described above is fixed to a flat portion of the first half portion 51a.

The crankpin 16a of the first crankshaft 12a is rotatably penetrated through the through-hole 46 of the first crank connection member 34a via a bearing such as a ball bearing or a plain bearing. Thus, the first crank connection member 34a is engaged with the first crankshaft 12a to connect the first crankshaft 12a and the first support member 32a together.

The connection member includes the first coupling rod 36a. An axial end of the first coupling rod 36a is coupled with the first piston 24a via a support pin and the other axial end is coupled with the second support portion 33b of the first support member 32a. The first coupling rod 36a extends along the first direction X1 and is coaxial with a moving shaft of the first piston 24a. The first coupling rod 36a reciprocates along the first direction X1 together with the first support member 32a as one unit to reciprocally move the first piston 24a along the first direction X1.

As shown in FIG. 1, the second crankshaft 12b and the second XY separate crank mechanism 30b of the second drive unit 20b have the identical structures as those of the first crankshaft 12a of and the first XY separate crank mechanism 30a of the first drive unit 20a, respectively. The second crankshaft 12b and the second XY separate crank mechanism 30b are symmetrical with the first crankshaft 12a and the first XY separate crank mechanism 30a with respective to the central reference plane CRP.

In detail, the second crankshaft 12b is rotatably supported with bearings (not shown) by both axial ends, and is arranged substantially parallel to the first crankshaft 12a. One set of crank webs 14b are fixed to the halfway portion of the second crankshaft 12b, and the crankpin 16b (see FIG. 3) is fixed between these crank webs 14b. The crankpin 16b eccentrically rotates around the second crankshaft 12b according to the rotation of the second crankshaft 12b.

The second XY separate crank mechanism 30b comprises, in the second mount plane MP2 including the central axis of the second piston 24b (the moving shaft or the X-axis), a second support member (L-shaped combinatory member) 32b provided reciprocatively along the second direction X2, a second crank connection member (crank connection plate) 34b attached to the second support member 32b so as to be reciprocative along the fourth direction Y2 (Y-axis direction) orthogonal to the second direction X2 in the second mount plane MP2, and a second coupling rod 36b as a coupling member which couples the second piston 24b and the second support member 32b. The movable central axis (the second direction X2) of the second support member 32b, the movable central axis (the fourth direction Y2) of the second crank connection member 34b, and the movable central axis (the second direction X2) of the second coupling rod 36b are located in the second mount plane MP2.

The second support member 32b is formed into, for example, an L shape and comprises a first support portion 35a extending along the second direction X2 and a second support portion 35b extending along the fourth direction Y2 from one end (a right end, here) of the first support portion 35a, as an integrated member. The first support portion 35a is fixed to a first linear slider 40a, which is reciprocatively supported and guided by a guide rail 45a along the second direction X2. Thus, of the second support members 32b, only the first support portion 35a is supported reciprocatively on the guide rail 45a along the second direction X2. In this embodiment, the guide rail 45a is formed from a common guide rail used also for the guide rail 44a of the first drive unit 20a. The guide rail 45a may be divided from the guide rail 44a at a position of the central reference plane CRP.

A guide rail 45b extending along the fourth direction Y2 is fixed to the second support portion 35b of the second support member 32b, or it is formed integrally with second support portion as one unit. A second linear slider 41b is attached to the second crank connection member 34b to extend along the fourth direction Y2. The second linear slider 41b is reciprocatively supported and guided by the guide rail 45b. Thus, only one end portion of the second crank connection member 34b is reciprocatively supported by the second support member 32b along the fourth direction Y2.

The second crank connection member 34b comprises a through-hole with a circular cross section, in which the crankpin 16b of the second crankshaft 12b is penetrated rotatably via a bearing such as a ball bearing or a plain bearing. Thus, the second crank connection member 34b is engaged with the second crankshaft 12b to connect the second crankshaft 12b and the second support member 32b together.

The axial end of the second coupling rod 36b is connected with the second piston 24b via a support pin, and the other axial end is connected with the second support portion 35b of the second support member 32b. The second coupling rod 36b extends along the second direction X2 and is provided coaxially with the moving shaft of the second piston 24b. The second coupling rod 36b reciprocates together with the second support member 32b as one unit along the second direction X2 to reciprocally move the second piston 24b along with the second direction X2.

As shown in FIGS. 1 and 2, a coupler-synchronizing mechanism 50 of the drive device 10 comprises a first gear 52a attached coaxially to one end portion of the first crankshaft 12a and a second gear 52b attached coaxially to one end portion of the second crankshaft 12b. The first gear 52a and the second gear 52b are formed to have the same diameter and the same number of teeth and to be engaged with each other. The first crankshaft 12a and the second crankshaft 12b are coupled with each other via the first gear 52a and the second gear 52b. As the first gear 52a rotates, the second gear 52b rotates synchronously with the rotation of the first gear 52a in a direction reverse to that of the first gear 52a. Thus, the first crankshaft 12a and the second crankshaft 12b rotate synchronously in opposite directions.

Figure 3:
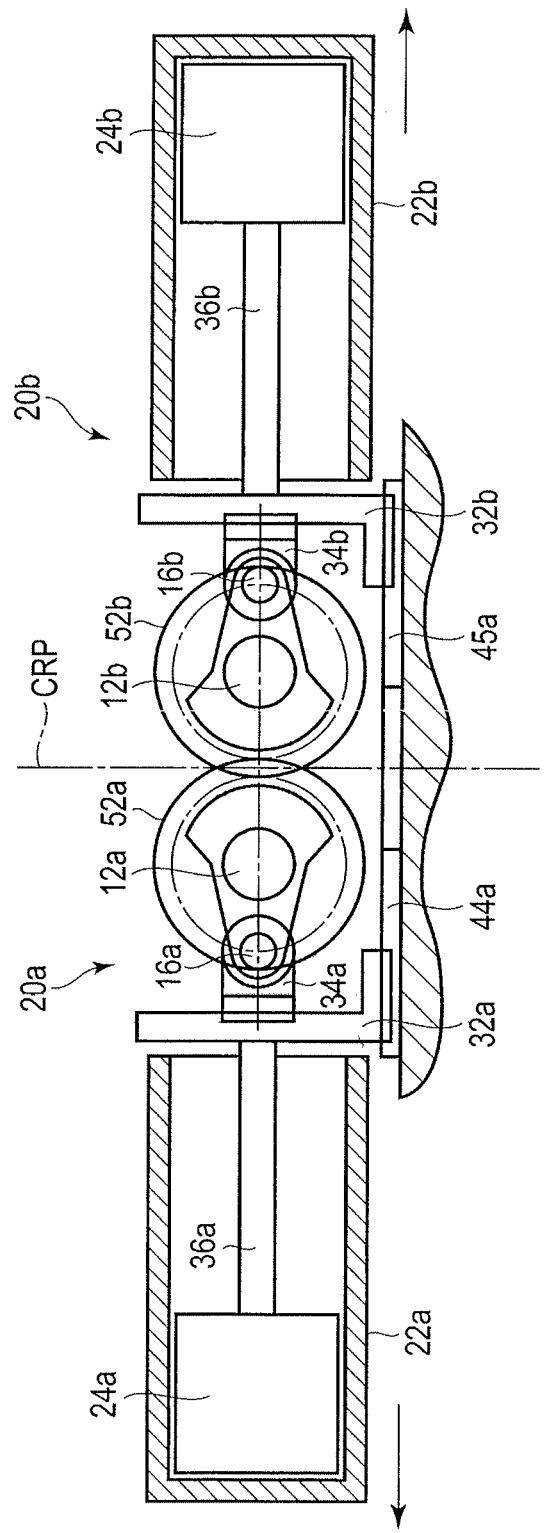
FIG. 3 is a side view schematically showing a state where a first piston and a second piston of the drive unit move to a top dead center.
Figure 4:
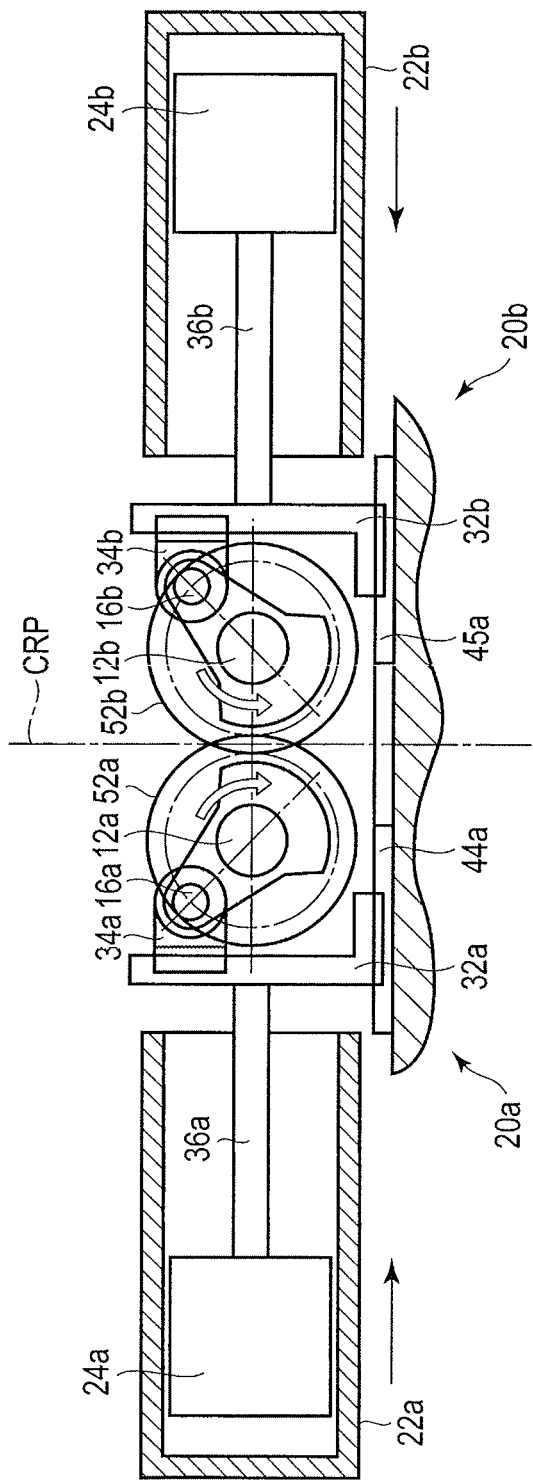
FIG. 4 is a side view schematically showing a state where the first piston and the second piston of the drive unit move in a direction of the bottom dead center.

The first drive unit 20a and the second drive unit 20b are arranged to be symmetrical laterally and longitudinally with respect to the central reference plane CRP, and therefore they operate symmetrically. As shown in FIG. 3, when the first piston 24a moves to a top dead center, the second piston 24b synchronously also moves to a top dead center. As shown in FIG. 4, when the first piston 24a moves toward a bottom dead center from the top dead center, the second piston 24b moves simultaneously from the top dead center toward a bottom dead center. As shown in FIGS. 3 and 4, the first XY separate crank mechanism 30a and second XY separate crank mechanism 30b also operate synchronously with each other while maintaining the symmetrical state with respect to the central reference plane CRP.

When the drive device 10 configured as above is used as an engine, a suction valve and an exhaust valve are provided for a cylinder head of the first cylinder 22a and a cylinder head of the second cylinder 22b to introduce fuel and air into the first cylinder 22a and the second cylinder 22b, which are compressed with the first piston 24a and the second, piston 24b, and the fuel is combusted. Thereby, driving force is applied to the first piston 24a and the second piston 24b, and the first piston 24a and the second piston 24b reciprocate along the first direction X1 and the second direction X2, respectively. The reciprocating motion of the first piston 24a is converted into rotary motion by the reciprocating motion of the first support member 32a along the first direction X1 and the reciprocating motion of the first crank connection member 34a along the third direction Y1 in the first XY separate crank mechanism 30a, and transmitted to the first crankshaft 12a. Thereby, rotation output is applied to the first crankshaft 12a.

Simultaneously, the reciprocating motion of the second piston 24b is converted into rotary motion by the reciprocating motion of the second support member 32b along the second direction X2 and the reciprocating motion of the second crank connection member 34b along the fourth direction Y2 in the second XY separate crank mechanism 30b, and transmitted to the second crankshaft 12b. Thereby, rotation output is applied to the second crankshaft 12b.

When the drive device 10 is used as a compressor, rotational force is applied at least one of the first crankshaft 12a and the second crankshaft 12b by a motor or the like. Thereby, the first crankshaft 12a and the second crankshaft 12b rotate in opposite directions to each other, and the crankpin of each crankshaft eccentrically rotate therearound. The eccentric rotary motion of the crankpin 16a of the first crankshaft 12a is separated into the reciprocating motion along the third direction Y1 and the reciprocating motion along the first direction X1 by the first crank connection member 34a and the first support member 32a of the first XY separate crank mechanism 30a, and the reciprocating motion of the first support member 32a along the first direction X1 is transmitted to the first piston 24a via the first connection member 36a. Thereby, the first piston 24a reciprocates in the first cylinder 22a along the first direction X1 to compress the fluid in the first cylinder 22a and then output it from the cylinder head.

Similarly, the eccentric rotary motion of the crankpin 16b of the second crankshaft 12b is separated into the reciprocating motion along the fourth direction Y2 and the reciprocating motion along the second direction X2 by the second crank connection member 34b and the second support member 32b of the second XY separate crank mechanism 30b, and the reciprocating motion of the second support member 32b along the second direction X2 is transmitted to the second piston 24b via the second connection member 36b. Thus, the second piston 24b reciprocates in the second cylinder 22b along the second direction X2 to compress the fluid in the second cylinder 22b and output it from the cylinder head.

With the drive device 10 configured as above, the first drive unit 20a and the second drive unit 20b respectively include the first and second XY separate crank mechanisms 30a and 30b which can separate and convert the rotary motion of the first crankshaft 12a and the rotary motion of the second crankshaft 12b into linear reciprocating motion along the first direction and linear reciprocating motion along the third and fourth directions orthogonal to the first direction and second direction, respectively, thereby making it possible to realize perfect parallel motion of the first piston 24a and the second piston 24b. Therefore, uneven contact of the piston to the cylinder can be avoided, and the sealing property can be improved, the friction loss can be reduced, and side thrust lossless can be achieved. Thus, a high efficiency can be achieved. Further, since the first drive unit and the second drive unit are arranged and configured to be symmetrical along left to right directions as well as front to rear directions (mirror arrangement) with respect to the central reference plane, vibration caused by deviation can be completely canceled out, thereby making it possible to form a non-vibrating rotary structure.

As to conventional engines, vibration decreases slowly as the number of cylinders increases as 6 cylinders, 8 cylinders, and 12 cylinders. In contrast, when an engine is configured using the drive unit according to this embodiment, the engine can balance completely only by two cylinders and can realize far less vibration than the conventional multi-cylinder engine with three or more cylinders. Thus, ultimately, a three or more-cylinder engine can be compacted to 2 cylinders of extremely low vibration amplitude, thereby making it possible to realize significant downsizing of the engine, reduction of the weight, and less valves.

Further, when the drive device 10 is used as an engine, reverse rotary outputs equal to and reversed from each other, can be obtained from the first crankshaft and the second crankshaft, that is, synchronous identical reverse rotation two-shaft outputs can be obtained. The synchronous identical reverse rotation two-shaft outputs can produce stable thrust without unsteadiness, which can drive, for example, the blades of helicopters or the screws of marine vessels. Furthermore, the drive device 10 can also be used for the engines of airplanes. The first pistons and the second piston move simultaneously in directions opposite to each other, and therefore even when the drive device 10 is applied not only to an engine but to a compressor or a pump, non-vibrating operation can be achieved.

Moreover, with the XY separate crank mechanism, the side thrust of the pistons can be avoided, and therefore the cylinders and pistons can be formed from a ceramic, glass or the like, thereby making it possible to structure a heat-insulating engine with sufficient thermal efficiency at low temperature. Further, in the drive unit, no vibration caused by side thrust is produced; therefore the cylinder can be formed from carbon fiber, or a plastic raw material such as PBT. Thus, an ultralight engine, which is $\frac{1}{5}$ to $\frac{1}{10}$ of the conventional engines, can be manufactured.

As described above, according to the first embodiment, the friction loss and vibration can be reduced and thus a drive unit with high operation efficiency can be obtained.

Figure 26:
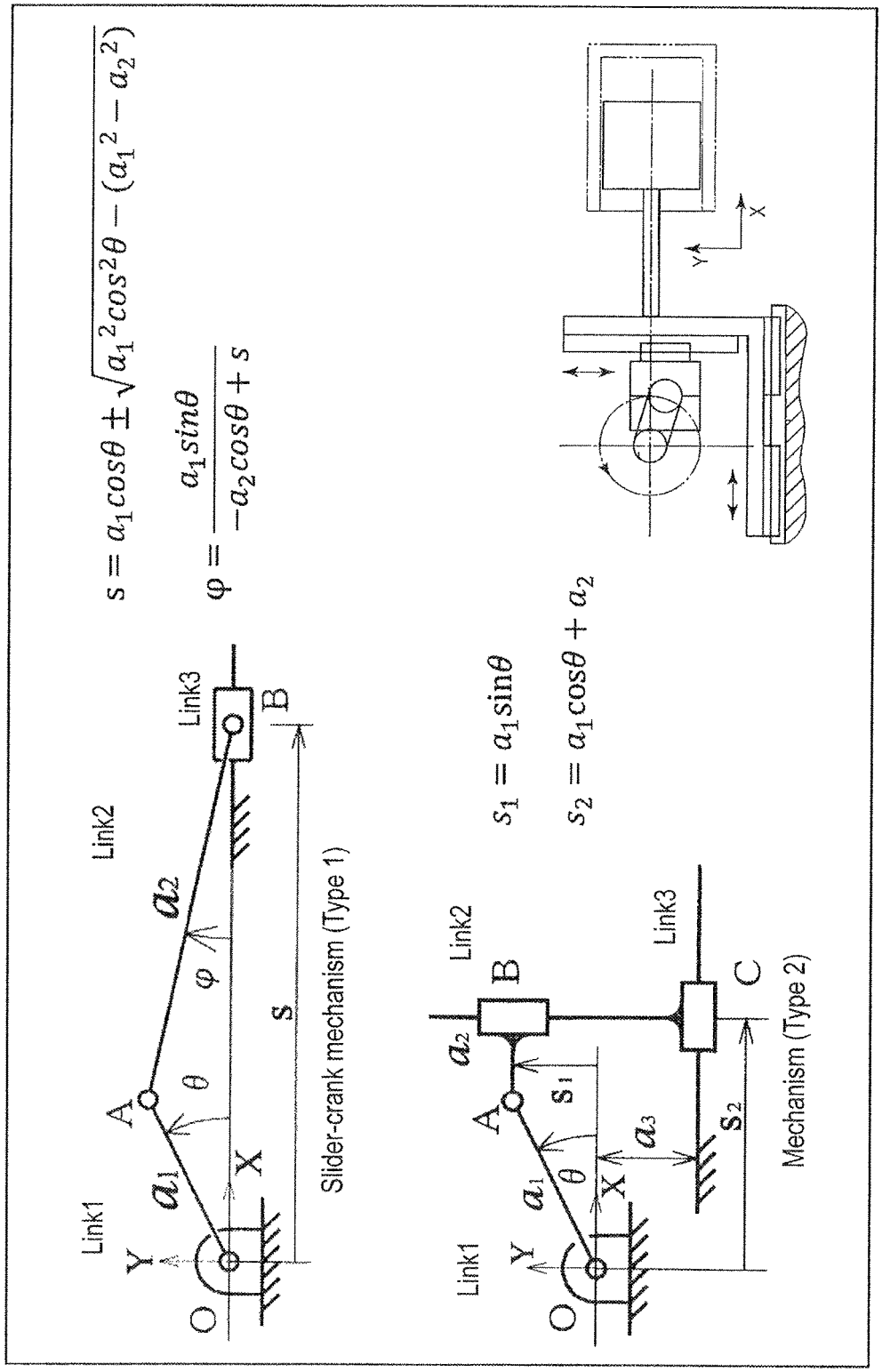
FIG. 26 is a diagram showing a formula for obtaining displacement of a slider crank mechanism comprising a conventional coupling rod and a formula for obtaining displacement of the XY separate crank mechanism according to this embodiment, for comparison.
Figure 27:
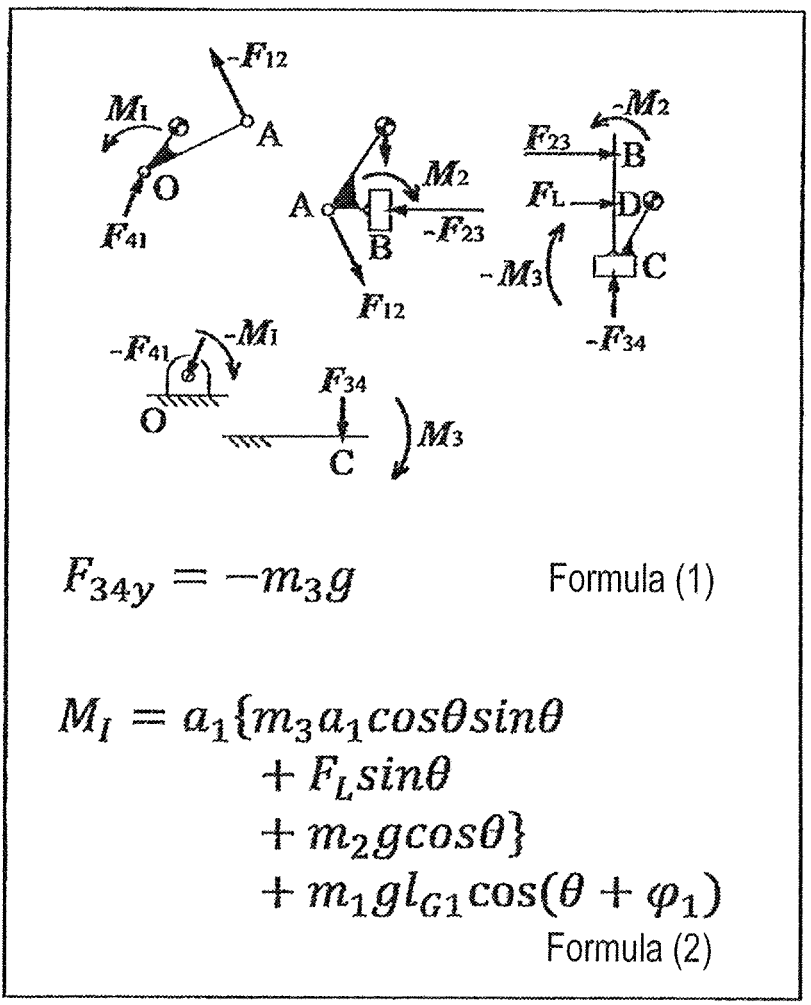
FIG. 27 is a diagram showing a formula for a kinetics analysis of the XY separate crank mechanism according to this embodiment.
Figure 28:
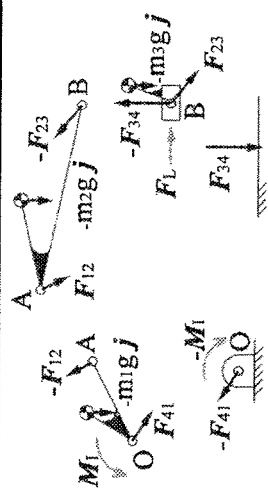
FIG. 28 is a diagram showing a formula for a kinetics analysis of the slider crank mechanism.
Figure 29:
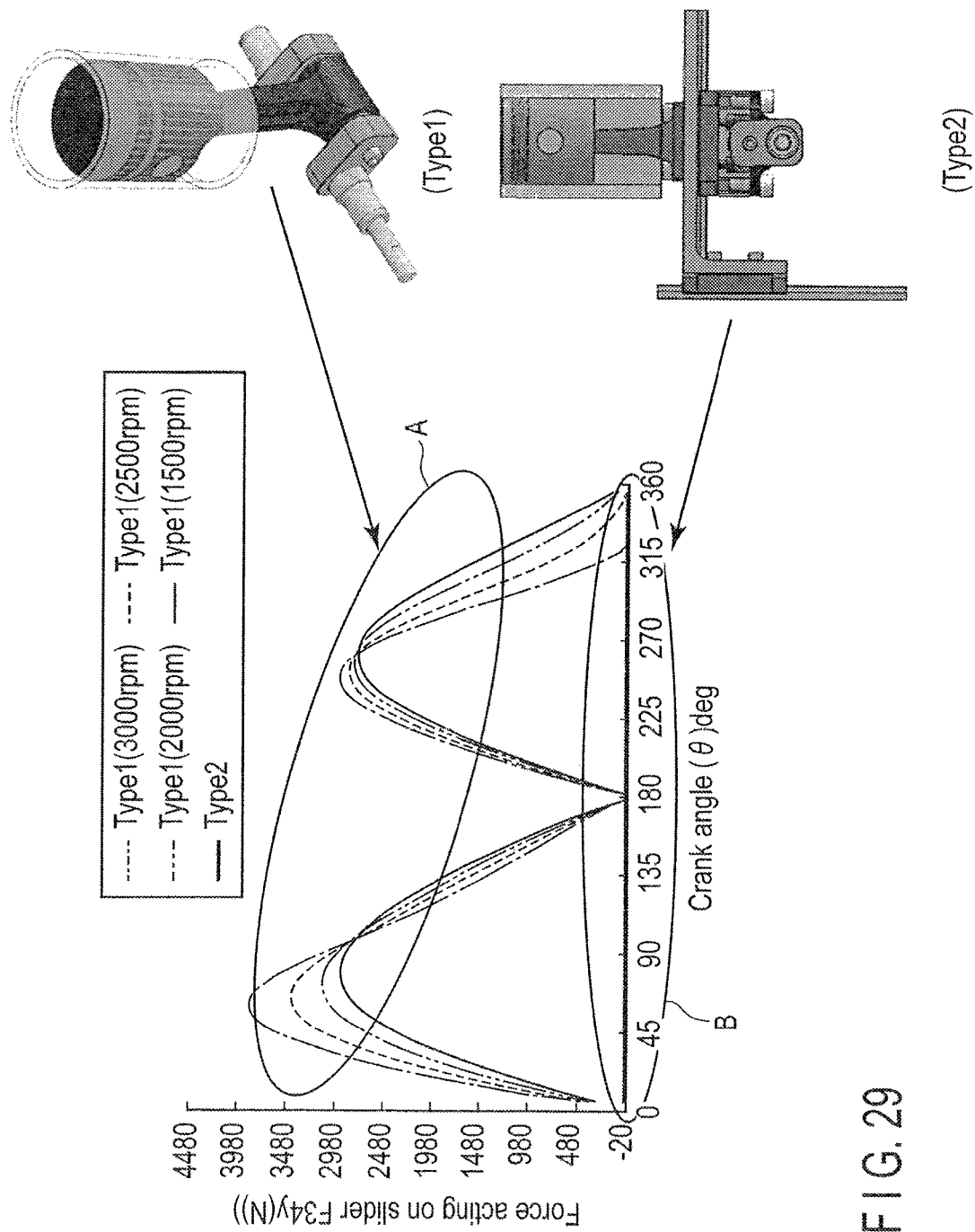
FIG. 29 is a diagram showing results of vibration analysis on the conventional slider crank mechanism and the XY separate crank mechanism according to this embodiment, to compare with each other.

FIG. 26 is a diagram showing comparison between a formula for displacement of a slider crank mechanism (Type 1) provided with a conventional coupling rod and a formula for displacement of the XY separate crank mechanism (Z-mechanism Type 2) according to this embodiment. FIG. 27 showing a formula of kinetic analysis of the XY separate crank mechanism according to this embodiment. FIG. 28 shows a kinetic analysis of the above-described conventional slider crank mechanism. FIG. 29 shows comparison in result of analysis of vibration between the conventional slider crank mechanism (Type 1) and the XY separate crank mechanism (Type 2) according to this embodiment.

As shown in FIG. 26, in the conventional slider crank mechanism, the formula of the stroke includes square terms and square-root terms, and if the stroke is differentiated by time dt, the circulation and diversion occur, and therefore it is understood that vibration cannot be avoided. By contrast, in the XY separate crank mechanism according to this embodiment, S1 and S2 are linear expressions, and even if differentiated by dt, they are not diverged. Therefore, with mirror arrangement of the first drive unit and the second drive unit, each including the XY separate crank mechanism, it can be understood that the vibration can be avoided.

As shown in FIGS. 27 to 29, as expressed by the formulas (3) and (4) for the kinetic analysis of the conventional slider crank mechanism, the slider crank mechanism generates phase deviation due to rotation number and therefore it becomes difficult to stop the vibration by one term. As enclosed by an ellipse A shown in FIG. 29, the slider crank mechanism changes its loss significantly for each angle. By contrast, as indicated by the formulas (1) and (2) of the kinetic analysis of the XY separate crank mechanism, the XY separate crank mechanism takes linear expressions of only -mg; therefore vibration can be easily cancelled out by placing the first drive unit and the second drive unit in mirror arrangement. As enclosed by an ellipse B shown in FIG. 29, the XY separate crank mechanism does not have substantial loss since the weight of the mechanism itself is the only formed applied thereto.

Next, drive devices according to other embodiments will be described. Note that in other embodiments described below, the same member as those the first embodiment described above will be denoted by the same reference symbols, and the detailed explanations therefor will be omitted. Structures different from those of the first embodiment will be mainly described in detail.

Second Embodiment

Figure 5:
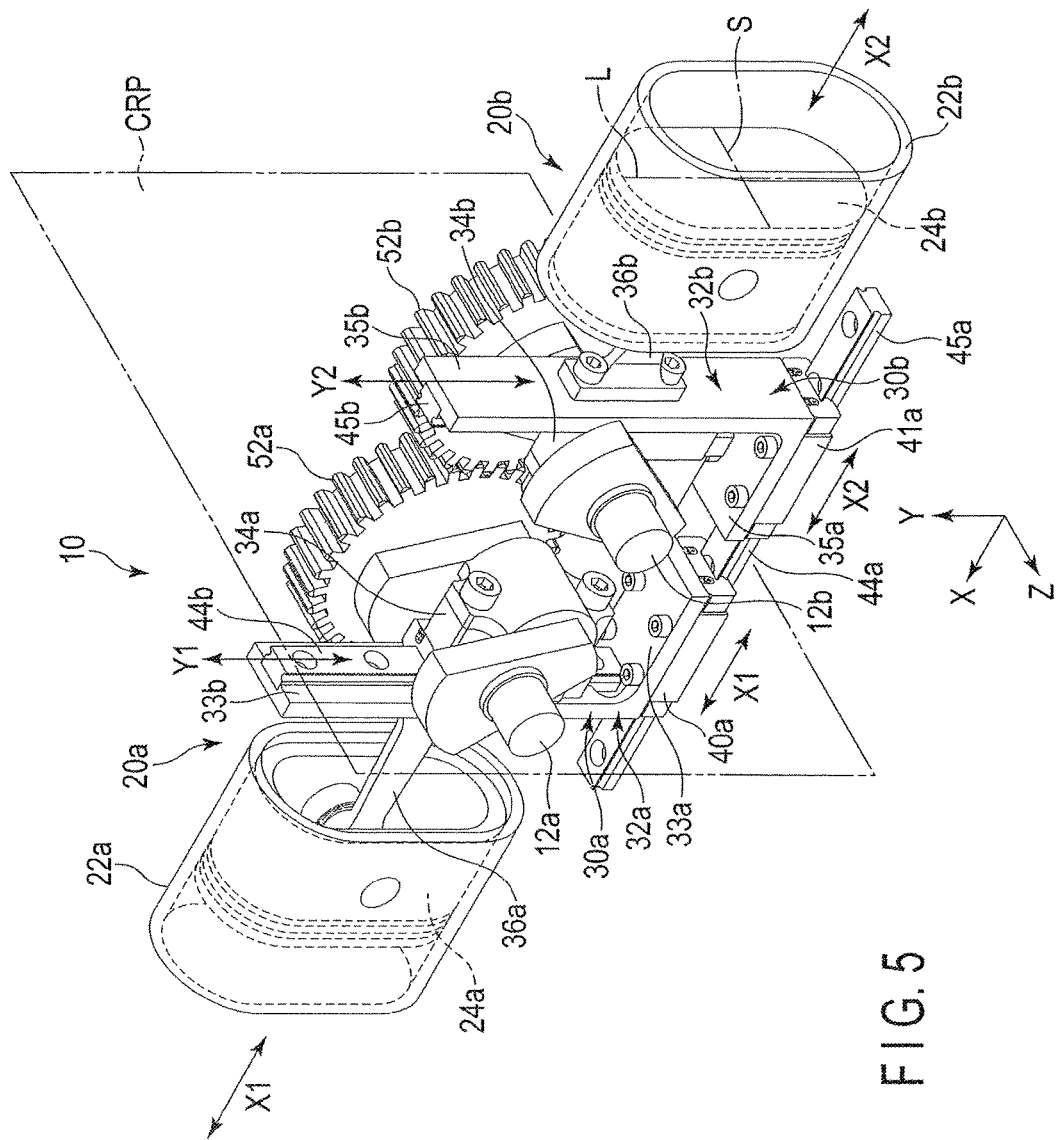
FIG. 5 is a perspective diagram showing a driving device according to a second embodiment.

FIG. 5 is a perspective view showing a drive device according to the second embodiment. According to the second embodiment, pistons having different plan and cross-sectional shapes, i.e., an un-circular shape are used as a first piston 24a and a second piston 24b. In this embodiment, the first piston 24a and the second piston 24b are formed into an oval shape such as an elliptical or field-track shape, and each have a long axis L and a short axis S orthogonal to the long shaft L. A first cylinder 22a and a second cylinder 22b formed into a shape having an oval cross section, to correspond to the first piston 24a and the second piston 24b, respectively.

The long axis L of the first piston 24a is located within a first mount plane to be parallel to a second support portion 33b of a first support member 32a, that is, parallel to the third direction Y1. The long axis L of the second piston 24b is located within a second mount plane to be parallel to a second support portion 35b of a second support member 32b, that is, parallel to the fourth direction Y2.

In the drive device 10, the other structure is the same as that of the drive unit according to the first embodiment.

When using the first and second pistons 24a and 24b having an oval shape, the displacement of the piston can be increased to two to three times as compared to a circular piston having diameter equal to the short axis S of these pistons. Moreover, the piston area can be increased for the same stroke, and therefore the volume can be increased. By using oval pistons in place of circular pistons, the capacity can be increased 2.5 times, for example. Thus, for a 2000-cc two-cylinder engine, the weight can be reduced to about $\frac{1}{4}$ of the conventional 4-cylinder engine with circular pistons, making it possible to reduce the weight and downsize.

Moreover, in the drive device 10, the first piston 24a and the second piston 24b can be driven in perfect parallel motion. Therefore, even when using non-circular, for example, oval pistons, or using large-sized pistons, the uneven contact of the pistons can be avoided, thereby achieving a sealing property and a high efficiency in side thrust lossless.

Furthermore, an advantageous effect similar to that of the first embodiment can be obtained by the drive device 10 of the second embodiment. In the second embodiment, the shape of the pistons is not limited to the oval shape, but it may as well be other non-circular shapes, for example, a rectangular shape with rounded corners, or other polygonal shape, or elliptical shape with a narrowed central portion.

Third Embodiment

Figure 6:
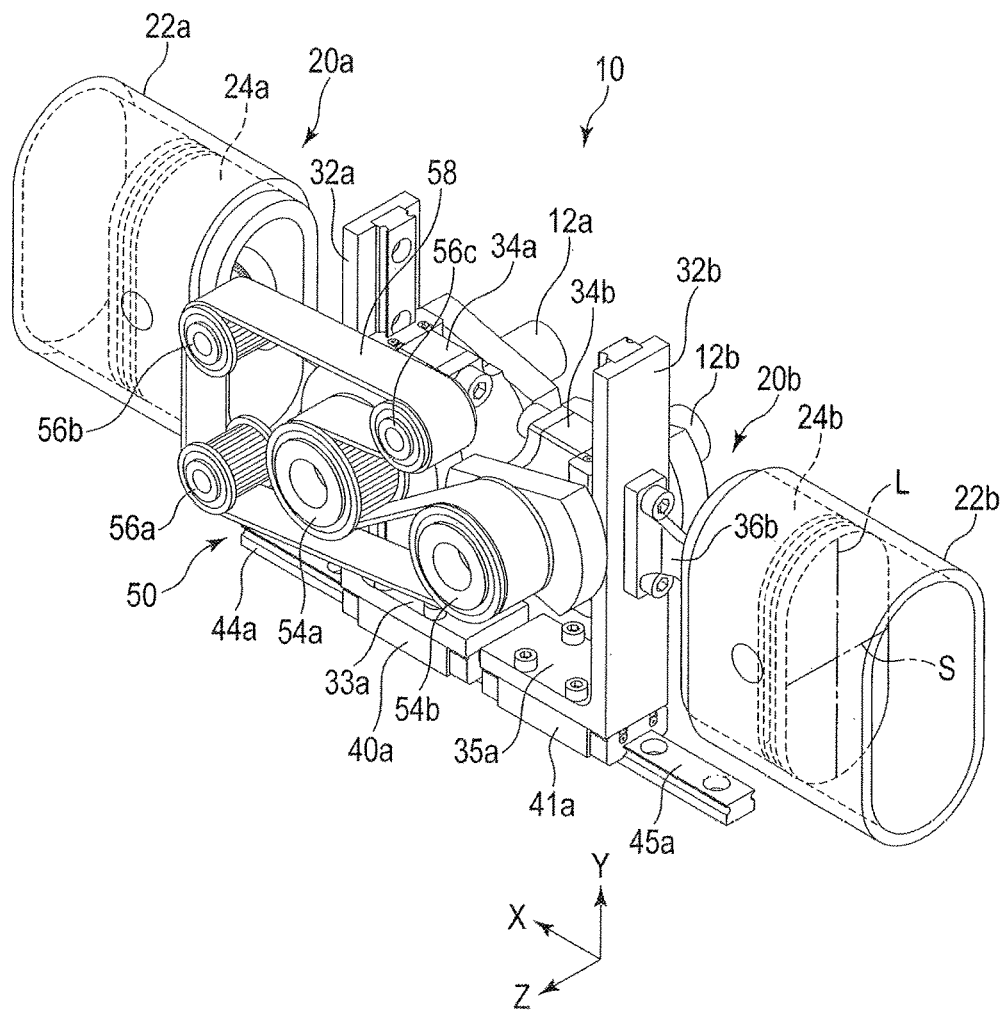
FIG. 6 is a perspective diagram showing a driving device according to a third embodiment.

FIG. 6 is a perspective view showing a drive device according to the third embodiment. The third embodiment is different from the first embodiment in the structure of the coupler-synchronizing mechanism. As shown in FIG. 6, a coupler-synchronizing mechanism 50 comprise a first drive pulley 54a coaxially mounted to one end portion of a first crankshaft 12a, a second drive pulley 54b coaxially mounted to one end portion of a second crankshaft 12b, a plurality of tension pulleys 56a, 56b and 56c each comprising a rotary shaft parallel to the rotary shafts of these drive pulleys, and an endless toothed belt 58 looped over the first and second drive pulleys and the tension pulleys.

The first crankshaft 12a and the second crankshaft 12b are coupled with each other via the coupler-synchronizing mechanism 50, and rotate synchronously in opposite directions. More specifically, when the first drive pulley 54a rotates with the first crankshaft 12a, the rotation of the first drive pulley 54a is transmitted to the second drive pulley 54b by the toothed belt 58, and the second drive pulley 54b rotates in an opposite direction together with the second crankshaft 12b. Thus, the first crankshaft 12a and the second crankshaft 12b rotate synchronously in opposite directions.

In the third embodiment also, pistons having different plane and cross section shapes, i.e., un-circular shapes, for example, oval pistons are used as the first piston 24a and the second piston 24b.

The other structure of the drive device 10 of the third embodiment is the same as that of the first or second embodiment. An advantageous effect similar to that of the first embodiment can be obtained by the drive device 10 of the third embodiment. In the third embodiment, the coupler-synchronizing mechanism 50 is not limited to the combination of pulleys and a belt, but may be a combination of a sprocket and a chain.

Fourth Embodiment

Figure 7:
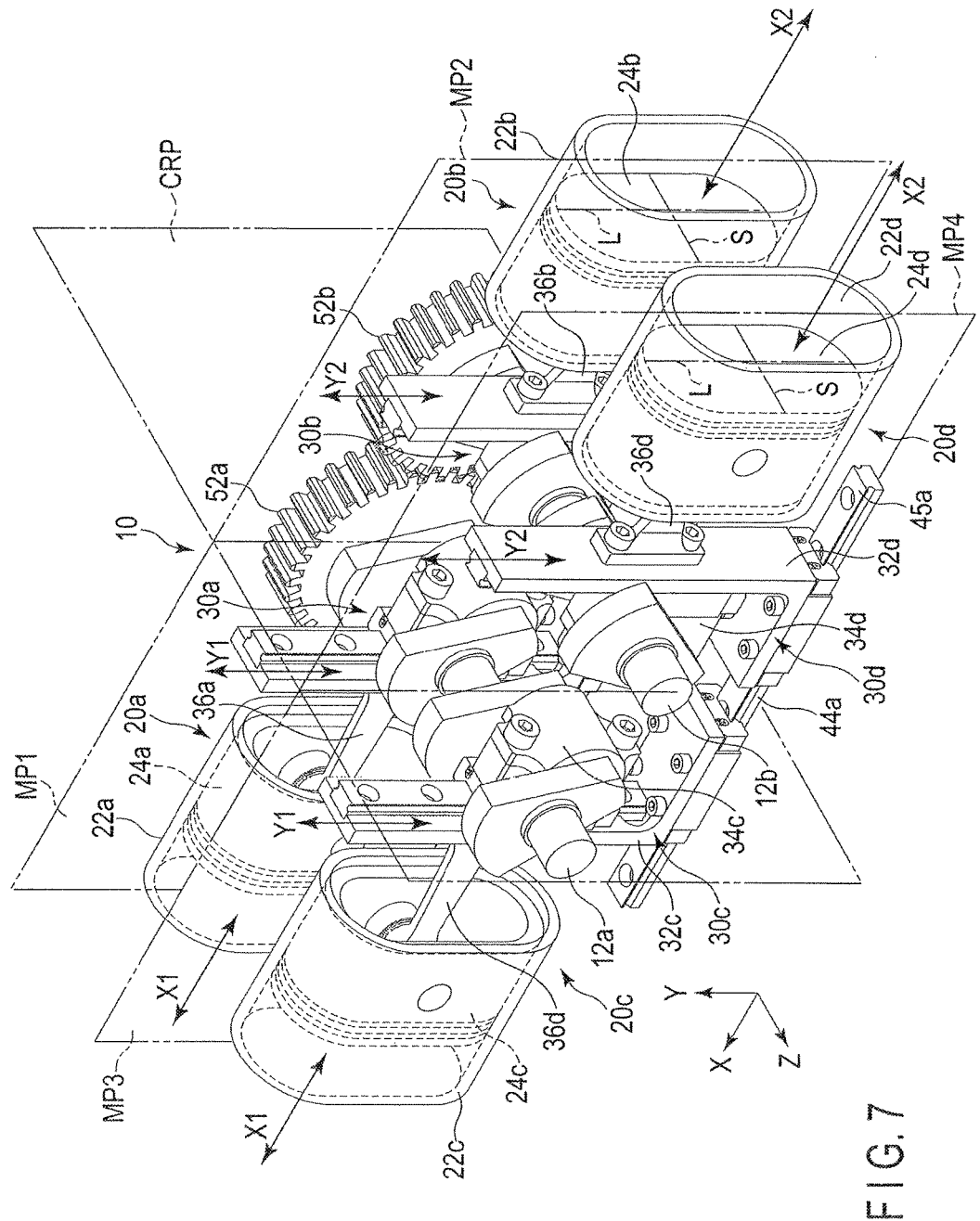
FIG. 7 is a perspective diagram showing a driving device according to a fourth embodiment.

FIG. 7 is a perspective view showing a drive device according to the fourth embodiment. A drive device 10 of the fourth embodiment is formed as of a multiple cylinder type, for example, a 4-cylinder drive device. More specifically, the drive device 10 comprises, in addition to the first drive unit 20a and the second drive unit 20b described above, a third drive unit 20c and a fourth drive unit 20d. The third drive unit 20c has the same structure as that of the first drive unit 20a and is arranged along a direction parallel to the first drive unit 20a and the central reference plane CRP. The fourth drive unit 20d has the same structure as that of the second drive unit 20b, and is arranged along a direction parallel to the second drive unit 20b and the central reference plane CRP.

The third drive unit 20c and the fourth drive unit 20d have the same structure. The third drive unit 20c and the fourth drive unit 20d are arranged on both sides of the central reference plane CRP, respectively, and are arranged and configured to be symmetrical along left to right directions as well as front to rear directions (mirror arrangement) with respect to the central reference plane CRP.

The third drive unit 20c comprises a third cylinder 22c located on one side of the central reference plane CRP and provided on a third mount plane MP3 orthogonal to the central reference plane CRP, a third piston 24c provided in the third cylinder 22c to be reciprocative along the first direction X1 within the third mount plane MP3, a first crankshaft 12a extending orthogonal to the third mount plane MP3, and a third XY separate crank mechanism 30c provided between the third piston 24c and the first crankshaft 12a within the third mount plane MP3, which converts the reciprocating motion of the third piston 24a and the rotary motion of the first crankshaft 12a into each other. The third mount plane MP3 opposes to be parallel to the first mount plane MP1 of the first drive unit 20a. The first direction which is the reciprocation direction of the third piston 24c is defined as a first direction X1 orthogonal to the central reference plane CRP. Further, the first crankshaft 12a is coupled with the first crankshaft 12a of the first drive unit 20a or formed integrally as one body, and they extend coaxially.

The fourth drive unit 20d comprises a fourth cylinder 22d located on an opposite side of the central reference plane CRP and provided on a fourth mount plane MP4 orthogonal to the central reference plane CRP, a fourth piston 24d provided in the fourth cylinder 22d to be reciprocative along the second direction X2 within the fourth mount plane MP4, a second crankshaft 12b extending orthogonal to the fourth mount plane MP4, and a fourth XY separate crank mechanism 30d provided between the fourth piston 24d and the second crankshaft 12b, which converts the reciprocating motion of the fourth piston 24d and the rotary motion of the second crankshaft 12b into each other.

The fourth mount plane MP4 is located symmetrical to the third mount plane MP3 with regard to the central reference plane CRP. Further, the fourth mount plane MP4 opposes parallel to the second mount plane MP2 of the second drive unit 20b. The second direction which is a reciprocation direction of the fourth piston 24d is a direction symmetrical to the first direction X1 described above and is defined as a second direction X2 orthogonal to the central reference plane CRP. The first direction X1 and the second direction X2 make an angle of 180 degrees with respect to each other, that is, they are in the same direction and the third piston 24c and fourth piston 24d are arranged to be coaxial with each other. Further, the second crankshaft 12b of the fourth drive unit 20d is coupled with the second crankshaft 12b of the second drive unit 20b, or formed integrally in one unit, and they extend coaxially.

The third XY separate crank mechanism 30c comprises a third support member (L-type combinatory) 32c provided reciprocatively along the first direction X1, a third crank connection member (crank connection plate) 34c mounted reciprocatively to the third support member 32c along the third direction Y1 (Y-axial direction) orthogonal the first direction X1 in the third mount plane MP3 and engaged rotatably with the crankpin of the first crankshaft 12a, and a coupling rod 36c which connects the third piston 24c and the third support member 32c to each other.

The third support member 32c is formed into an L shape, and comprises a first support portion extending in the first direction X1 and a second support portion extending in the third direction Y1 from one end (here, left end) of the first support portion as one unit. Of the third support members 32c, only the first support portion is supported reciprocatively on a guide rail 44a along the first direction X1 via a first linear slider, and only one end portion of the third crank connection member 34c is supported reciprocatively by the third support member 32c along the third direction Y1.

The fourth XY separate crank mechanism 30d of the fourth drive unit 20d has the same structure as that of the third XY separate crank mechanism 30c, and is arranged to be symmetrical to the third XY separate crank mechanism 30c with regard to the central reference plane CRP. More specifically, the fourth XY separate crank mechanism 30d comprises a fourth support members (L-type combinator) 32d provided reciprocatively along the second direction X2, a fourth crank connection member (crank connection plate) 34d mounted reciprocatively along a fourth direction Y2 (Y-axial direction) orthogonal to the second direction X2 in a fourth mount plane MP4 and engaged rotatably with the crankpin of the second crankshaft 12b, and a coupling rod 36d which connects the fourth piston 24d and the fourth support member 32d to each other.

In the fourth embodiment, pistons having different plane and cross section shapes, i.e., un-circular shapes, for example, oval pistons having, for example, a long axis L and a short axis S, are used as the first, second, third and fourth pistons 24a, 24b, 24c and 24d. The first piston 24a is arranged so that the long axis L is parallel to the third direction Y1 and the second piston 24b is arranged so that the long axis L is parallel to the fourth direction Y2. Similarly, the third piston 24c is arranged so that the long axis L is parallel to the third direction Y1, and the second piston 24b is arranged so that the long axis L is parallel to the fourth direction Y2. Thus, the long axis L of the third piston 24c is arranged parallel to the long axis L of the first piston 24a, and the long axis L of the fourth piston 24d is arranged parallel to the long axis L of the second piston 24b.

In the fourth embodiment, the other structure of the drive device 10 is the same as that of the drive device according to the first or second embodiment. An advantageous effect similar to that of the first embodiment can be obtained by the drive device 10 of the fourth embodiment. Further, the drive device 10 can be easily modeled into a multiple cylinder type. According to this embodiment, the so-called horizontally opposed type 4-cylinder engine or compressor can be provided. Further, when a plurality of oval-shaped pistons are arranged so that the long axes of the piston are arranged to be parallel to each other, the pistons can be arranged close to each other along the axial direction of the crankshaft. Thus, even if the drive device is formed into a multiple cylinder type, the dimensions of the drive device along the axial direction of the crankshaft can be reduced, thereby making it possible to downsize the drive device.

In the fourth embodiment, the drive device is not limited to the 4-cylinder type, but may be 6-cylinder or 8-cylinder type or more. Moreover, the shape of the pistons of each drive unit is not limited to an oval shape, but may be some other different shape or a circular.

Fifth Embodiment

Figure 8:
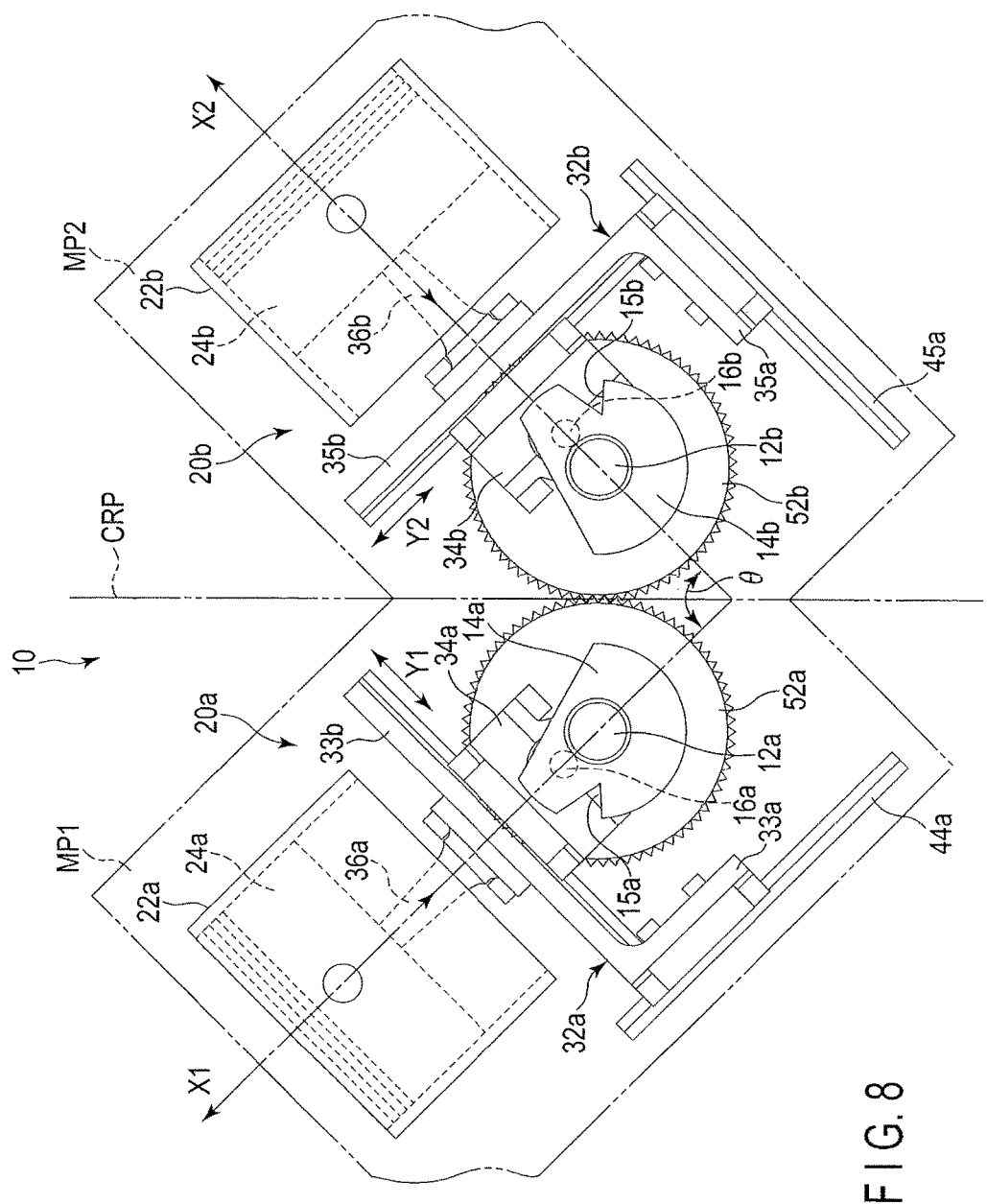
FIG. 8 is a perspective diagram showing a driving device according to a fifth embodiment.

FIG. 8 is a side view showing a drive device according to the fifth embodiment. The first to fourth embodiments described above are directed to the so-called horizontally opposite type drive device, in which the first direction which is the moving direction of the first piston and the second direction which is the moving direction of the second piston are opposite to each other by 180 degrees, that is, they extend coaxially. By contrast, according to the fifth embodiment, the drive device 10 comprise a first drive unit 20a and a second drive unit 20b arranged on both sides of the central reference plane CRP, respectively, and the first drive unit 20a and the second drive unit 20b are arranged so that the first direction X1 which is the moving direction of the first piston 24a and the second direction X2 which is the move direction of the second piston 24b make an angle θ, which is less than 180 degrees, for example, 60 to 90 degrees.

The first drive unit 20a and the second drive unit 20b are the same as the first drive unit and the second drive unit in the first embodiment, respectively. But, in the fifth embodiment, the first piston 24a and the second piston 24b are oval pistons.

The first drive unit 20a is located on one side of the central reference plane CRP and provided on the first mount plane MP1 orthogonal to the central reference plane CRP. The first piston 24a is provided in the first cylinder 22a to be reciprocative along the first direction X1 within the first mount plane MP1. In this embodiment, the first direction X1 is defined as a direction which crosses the central reference plane CRP at an angle less than 90 degrees. The first crankshaft 12a is arranged substantially parallel to the central reference plane CRP. The first piston 24a is arranged at such a direction that the long axis L thereof orthogonally crosses the first direction X1 within the first mount plane MP1.

The second drive unit 20b is located on a side opposite to the central reference plane CRP and is formed on the second mount plane MP2 orthogonal to the central reference plane CRP. The second mount plane MP2 is located to be symmetrical to the first mount plane MP1 with regard to the central reference plane CRP. Thus, the second drive unit 20b is arranged to be symmetrical to the first drive unit 20a with regard to the central reference plane CRP (mirror arrangement). The second direction X2 which is the reciprocating direction of the second piston 24b is symmetrical to the first direction X1 of the first piston 24a, and is defined to cross the central reference plane CRP at an angle less than 90 degrees. The first direction X1 and the second direction X2 cross each other at the central reference plane CRP to make an angle θ less than 180 degrees, for example, 50 to 120 degrees. Note that the second piston 24b is arranged along such a direction that the long axis L thereof orthogonally crosses the second direction X2 within the second mount plane MP2.

When the first direction X1 and the second direction X2 make an angle θ of 10 to 170 degrees, balance-adjusting notches 15a and 15b are formed in a crank web core 14a of the first crankshaft 12a and a crank web core 14b of the second crankshaft 12b, respectively, to maintain the rotation balance between the first and the second crankshafts 12a and 12b.

The other structure of the drive device 10 is the same as that of the drive device according to the first embodiment.

As described above, with the drive device 10 of the fourth embodiment, the so-called V type engine can be configured. Note that an advantageous effect similar to that of the first embodiment can be obtained by the drive device 10 of the fifth embodiment.

Sixth Embodiment

Figure 9:
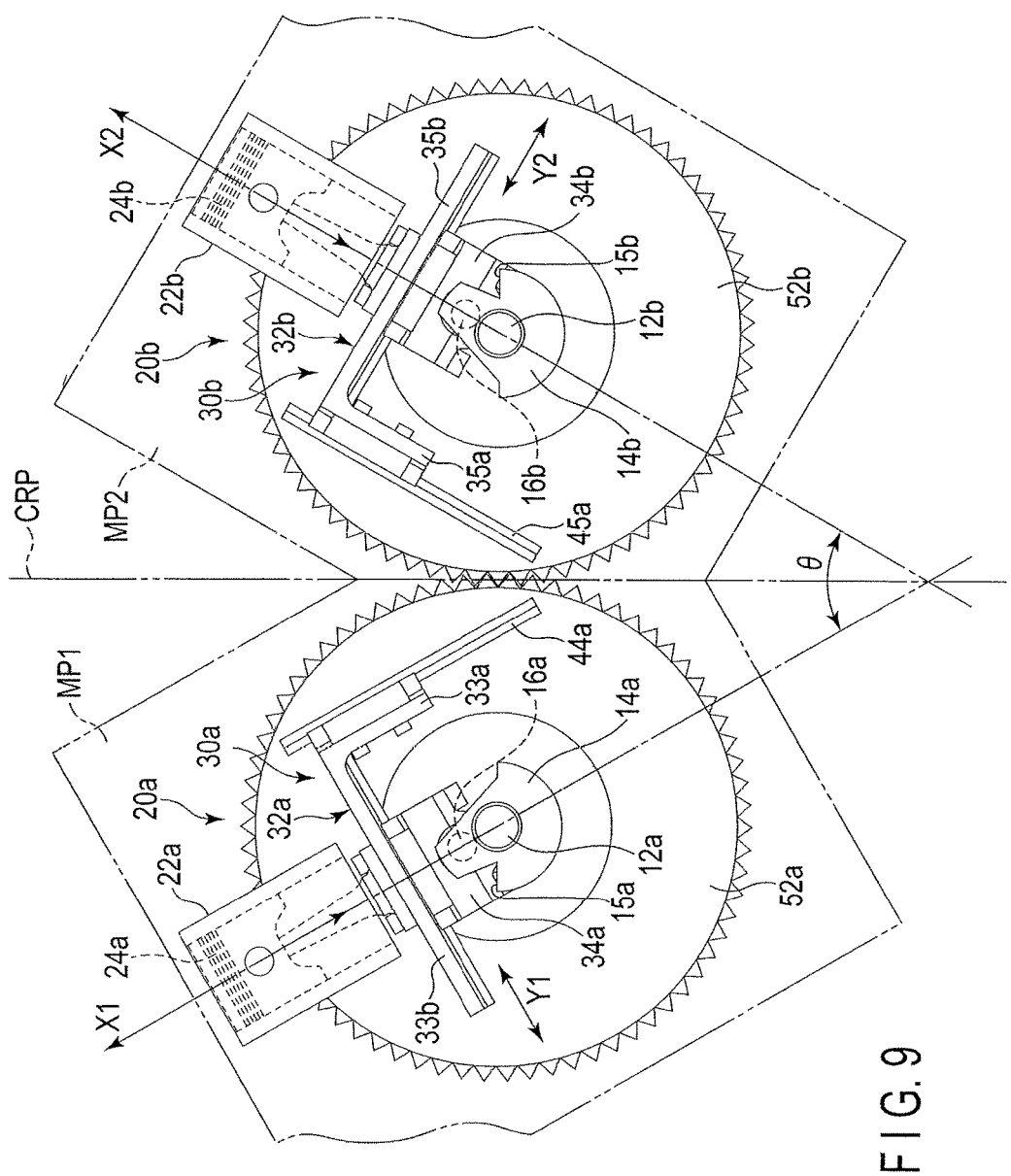
FIG. 9 is a perspective diagram showing a driving device according to a sixth embodiment.

FIG. 9 is a side view showing a drive device according to the sixth embodiment. A drive device 10 of this embodiment is configured substantially identically to the drive device 10 the fifth embodiment described above. In the sixth embodiment, pistons having circular plane and cross-section are used as a first piston 24a and a second piston 24b.

In a first drive unit 20a, a first support member 32a of a first XY separate crank mechanism 30a is provided in an opposite direction to that of the first support member in the embodiment described above. More specifically, a first support portion 33a of the first support member 32a and a guide rail 44a are arranged on a side of the central reference plane CRP with regard to the first crankshaft 12a in the first mount plane MP1, and extend parallel to the first direction X1. A second support portion 33b of the first support member 32a extends in the third direction Y1 from one end of the first support portion 33a, so as to be orthogonal to the moving shaft (the first direction X1) of the first piston 24a.

In the second drive unit 20b arranged and configured to be symmetrical to the first drive unit 20a, the first support portion 35a and the guide rail 45a of the second XY separate crank mechanism 30b are arranged on a side the central reference plane CRP with regard to the second crankshaft 12b in the second mount plane MP2, so as to extend parallel to the second direction X2. The second support portion 35b of the second support member 32b extends in the fourth direction Y2 from one end of the second support portion 33b, so as to be orthogonal to the moving shaft (the second direction X2) of the second piston 24b.

The first direction X1 which is the moving direction of the first piston 24a and the second direction X2 which is the moving direction of the second piston 24b cross each other at the central reference plane CRP to make an angle θ less than 180 degrees, for example, 60 to 90 degrees.

In the sixth embodiment configured as described above, the so-called V type drive device 10 can be configured. Note that an advantageous effect similar to that of the first embodiment can be obtained also by the drive device 10 of the sixth embodiment.

Seventh Embodiment

Figure 10:
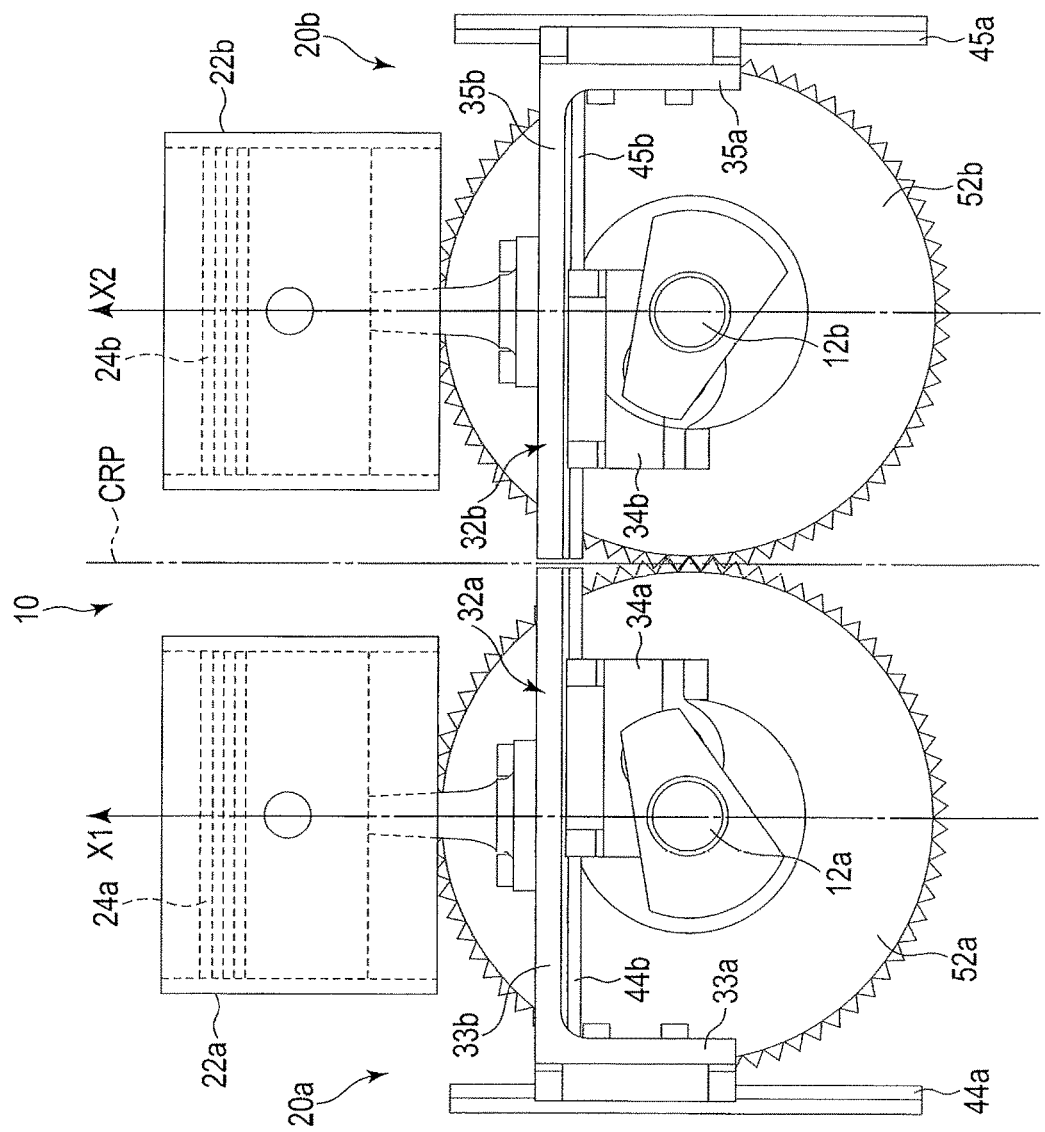
FIG. 10 is a perspective diagram showing a driving device according to a seventh embodiment.

FIG. 10 is a side view showing a drive device according to the seventh embodiment. According to this embodiment, a first drive unit 20a and a second drive unit 20b of a drive device 10 are symmetrically arranged so that the first direction X1 which is the moving direction of a first piston 24a and the second direction X2 which is the moving direction of a second piston 24b are parallel to each other and they are parallel to the central reference plane CRP. Thus, a first support portion 35a and a guide rail 45a of the first XY separate crank mechanism 30a and a first support portion 33a and a guide rail 44a of the second XY separate crank mechanism 30b are parallel to each other, and also parallel to the central reference plane CRP. The other structure of the drive device 10 is the same as that of the drive device of the fifth embodiment shown in FIG. 8.

Eighth Embodiment

Figure 11:
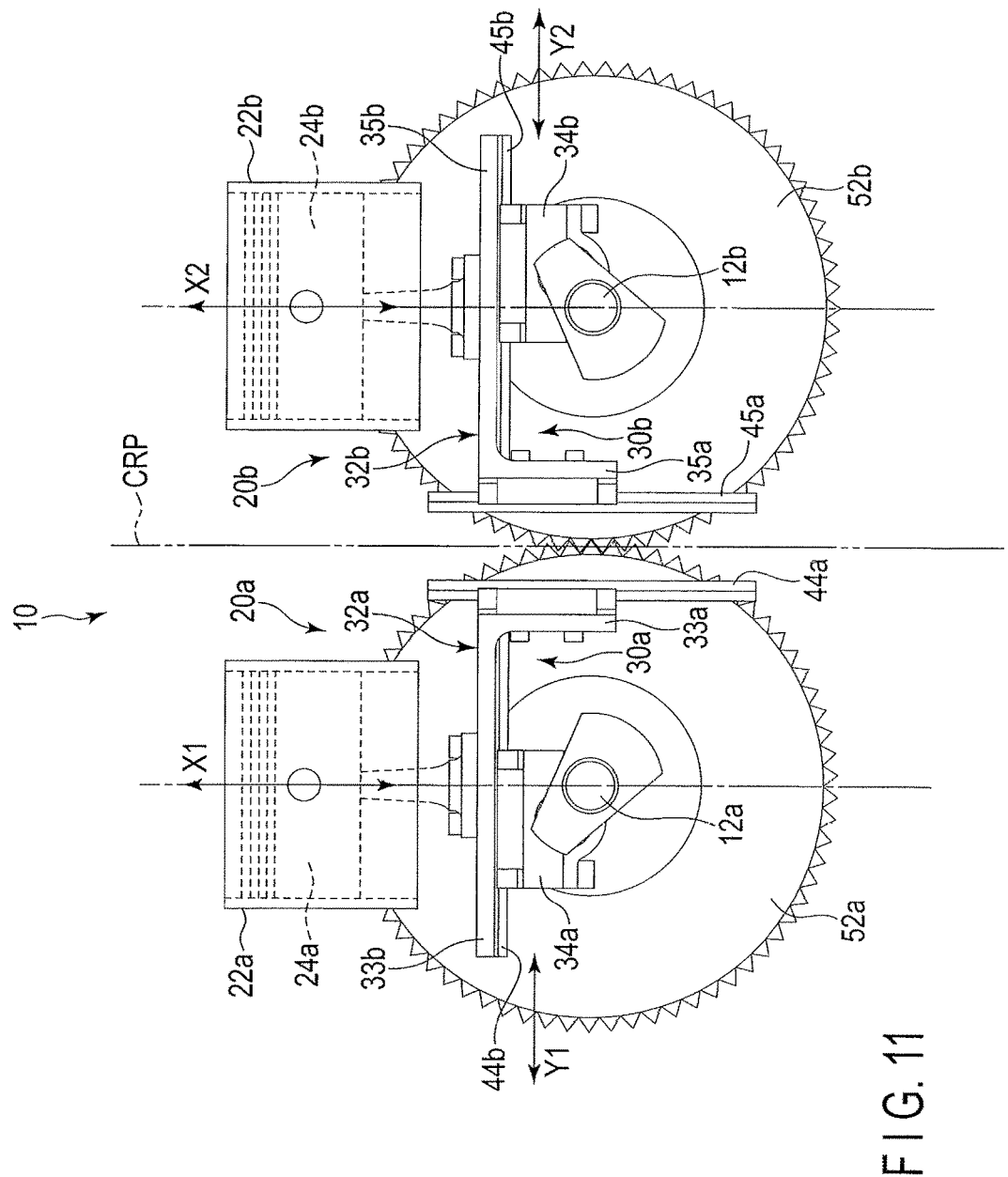
FIG. 11 is a perspective diagram showing a driving device according to an eighth embodiment.

FIG. 11 is a side view showing a drive device according to the eighth embodiment. According to this embodiment, as in the case of the seventh embodiment described above, a first drive unit 20a and a second drive unit 20b of a drive device 10 are symmetrically arranged so that the first direction X1 which is the moving direction of a first piston 24a and the second direction X2 which is the moving direction of a second piston 24b are parallel to each other, and also they are parallel to the central reference plane CRP.

In the first drive unit 20a, a first support member 32a of the first XY separate crank mechanism 30a is provided in an opposite direction to that of the first support member the embodiment described above. More specifically, a first support portion 33a of the first support member 32a and a guide rail 44a are arranged on a side of the central reference plane CRP with regard to the first crankshaft 12a in the first mount plane MP1, and extend parallel to the first direction X1. A second support portion 33b of the first support member 32a extends in the third direction Y1 from one end of the first support portion 33a, so as to be orthogonal to the moving shaft (the first direction X1) of the first piston 24a.

In the second drive unit 20b, a first support portion 35a and a guide rail 45a of the second XY separate crank mechanism 30b arranged on a side of the central reference plane CRP with regard to the second crankshaft 12b in the second mount plane MP2, and extend parallel to the second direction X2. A second support portion 35b of the second support member 32b extends in the fourth direction Y2 from one end of the second support portion 33b, so as to be orthogonal to the moving shaft (the second direction X2) of the second piston 24b. The other structure of the drive device 10 is the same as that of the seventh embodiment.

Ninth Embodiment

Figure 12:
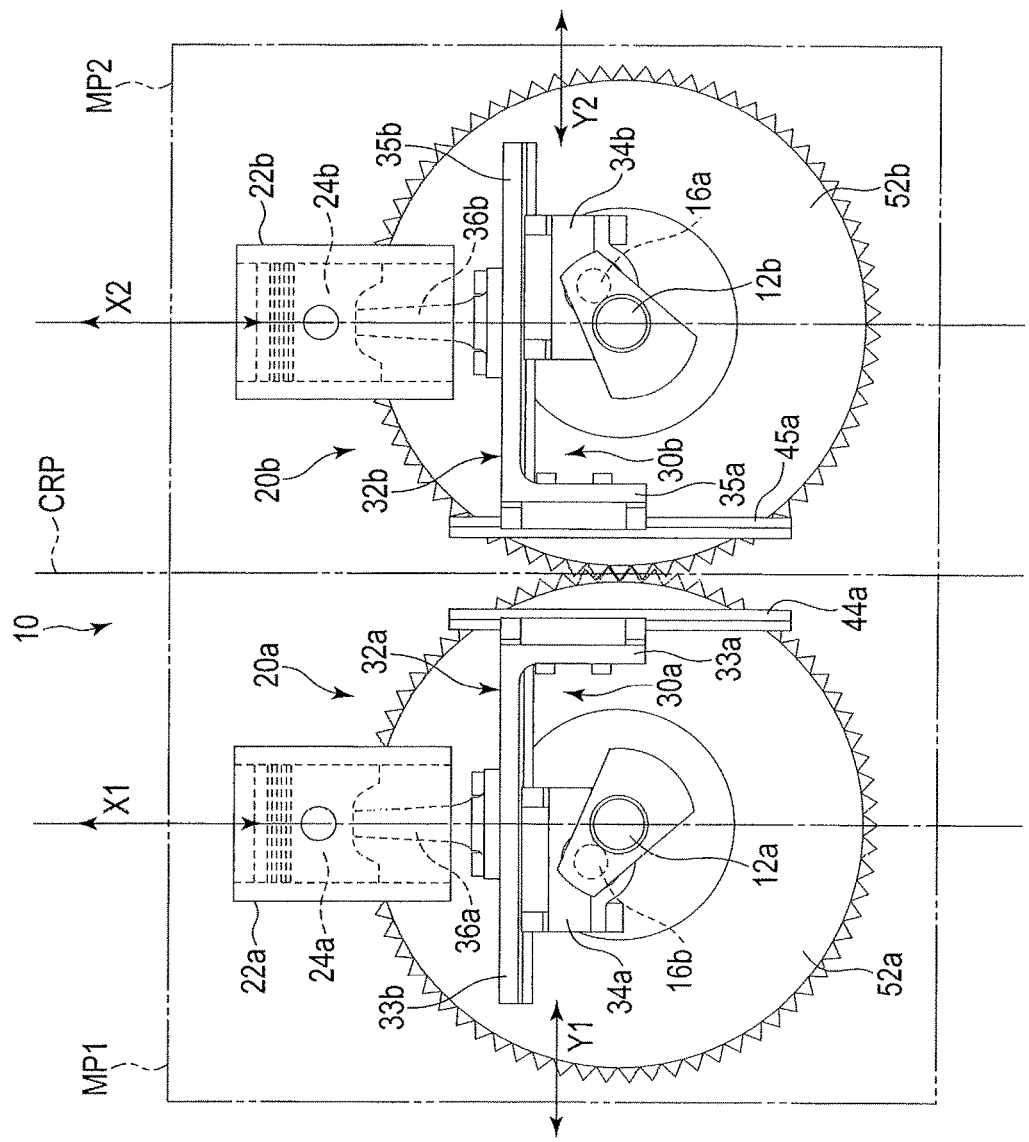
FIG. 12 is a perspective diagram showing a driving device according to a ninth embodiment.

FIG. 12 is a side view showing a drive device according to the ninth embodiment. According to this embodiment, as in the case of the seventh embodiment described above, a first drive unit 20a and a second drive unit 20b of a drive device 10 are symmetrically arranged so that the first direction X1 which is the moving direction of a first piston 24a and the second direction X2 which is the moving direction of a second piston 24b are parallel to each other and also parallel to the central reference plane CRP. In this embodiment, pistons having circular plane and cross-section are used as the first piston 24a and the second piston 24b. The other structure of the drive device 10 is the same as that of the seventh embodiment.

According to the seventh to ninth embodiments described above, the parallel type drive device 10 can be provided. Note that an advantageous effect similar to that of the first embodiment can be obtained also by the drive device 10 of each of the seventh to ninth embodiments.

The effect as the first embodiment described above can be acquired.

The V type drive devices according to the fifth to sixth embodiments described above and the parallel type drive devices according to the seventh to ninth embodiments are not limited to a 2-cylinder type, but may be formed into a multiple cylinder type with four cylinders, six cylinders, or eight cylinders or even more.

In the embodiments described above, the first mount plane MP1 and the second mount plane MP2 in which the first drive unit and the second drive unit are arranged are each defined as a plane orthogonal to the central reference plane CRP, but they are not limited to this. They may be a plane crossing the central reference plane CRP at an angle greater or less than 90 degrees. In this case, the first crankshaft and the second crankshaft are not parallel to the central reference plane CRP, but are located to be inclined thereto. However, with use of, for example, a bevel gear as the coupler-synchronizing mechanism, the first crankshaft and the second crankshaft can be coupled with each other, to acquire opposite rotation outputs equal to each other but in opposite directions.

Tenth Embodiment

FIG. 13 is a perspective view showing a drive device according to the tenth embodiment and FIG. 14 is an exploded perspective view showing the XY separate crank mechanism. The tenth embodiment is different from the first embodiment in the structure of the XY separate crank mechanism.

As shown in FIG. 13, the drive device 10 comprises a first drive unit 20a comprising a first crankshaft 12a, a second drive unit 20b comprising a second crankshaft 12b and a coupler-synchronizing mechanism 50 which couples the first crankshaft 12a and the second crankshaft 12b with each other, to rotate them in synchronous with each other.

The first drive unit 20a and the second drive unit 20b have the same structure. The first drive unit 20a and the second drive unit 20b are arranged on both sides of the central reference plane CRP, respectively, and the first drive unit 20a and the second drive unit 20b are further arranged and configured to be symmetrical along left to right directions as well as front to rear directions (mirror arrangement) with respect to the central reference plane CRP. The first drive unit 20a is located on one side of the central reference plane CRP and provided also in the first mount plane MP1 orthogonal to the central reference plane CRP. The second drive unit 20b is provided in the second mount plane MP2 located on an opposite side of the central reference plane CRP and orthogonal to the central reference plane CRP, i.e., the second mount plane MP2 symmetrical to the first mount plane MP1.

The first drive unit 20a comprises a first crankshaft 12a extending orthogonal to the first mount plane MP1, and a first XY separate crank mechanism 30a provided between a first piston 24a and the first crankshaft 12a within the first mount plane MP1, which converts the reciprocating motion of the first piston 24a and the rotary motion of the first crankshaft 12a into each other. The first direction which is the reciprocating direction of the first piston 24a is defined as the first direction X1 orthogonal to the central reference plane CRP. The first crankshaft 12a is arranged substantially parallel to the central reference plane CRP.

The second drive unit 20b comprises a second crankshaft 12b extending orthogonal to the second mount plane MP2 and a second XY separate crank mechanism 30b provided between a second piston 24b and the second crankshaft 12b within the second mount plane MP2, which converts the reciprocating motion of the second piston 24b and the rotary motion of the second crankshaft 12b into each other. The second direction which is the reciprocating direction of the second piston 24a is defined as the second direction X2 symmetrical to the first direction X1 described above and orthogonal to the central reference plane CRP. The first direction X1 and the second direction X2 make an angle of 180 degrees, that is, in the same direction, and the first piston 24a and the second piston 24b arranged to be coaxial with each other.

The first XY separate crank mechanism 30a and the second XY separate crank mechanism 30b have the same structure, and are arranged to be symmetrical along left to right directions as well as up and down directions with respect to the central reference plane CRP. Here, as a typical example, the second XY separate crank mechanism 30b will be described in detail. As shown in FIGS. 13 and 14, the second XY separate crank mechanism 30b comprises, in the second mount plane MP2 including the central axis (the moving shaft, the X-axis) of the second piston 24b, a second support member (combinator) 32b provided to be reciprocative along the second direction X2, a second crank connection member (crank connection plate) 34b mounted to the second support member 32b to be reciprocative along the fourth direction Y2 (Y-axial direction) orthogonal to the second direction X2 in the second mount plane MP2, and a second coupling rod 36b as a coupling member, which couples the second piston 24b and the second support member 32b with each other. The movable central axis (the second direction X2) of the second support member 32b, the movable central axis (fourth direction Y2) of the second crank connection member 34b, and the central moving shaft (second direction X2) of the second coupling rod 36b are located on the second mount plane MP2.

In this embodiment, the second support member 32b is formed into a rectangular frame shape, for example. More specifically, the second support member 32b comprises a first support portion 35a extending along the second direction X2, a second support portion 35b and a third support portion 35c, extending respectively from both axial ends of the first support portion 35a along the fourth direction Y2. In this embodiment, the second support member 32b comprises, integrally as one unit, a fourth support portion 35d which couples the extending end of the second support portion 35b and the extending end of the third support portion 35c with each other and opposes the first support portion 35a with a gap therebetween. Inner surfaces of the second support portion 35b and the third support portion 35c, which oppose each other, are formed to be flat and parallel to each other, and each extend along the fourth direction Y2. The second support member 32b is formed by, for example, die-casting from aluminum.

A first linear slider 41a is fixed to the first support portion 35a. Further, a second guide rail 45a is provided on an inner surface of the housing (not shown), to extend along the second direction X2 within the second mount plane MP2. The first linear slider 41a is supported and guided reciprocatively by the second guide rail 45a. Thus, of the second support member 32b, only the first support portion 35a is supported on the second guide rail 45a reciprocatively along the second direction X2. The second linear slider 41a may comprise a ball bearing built therein, which rollably contacts the second guide rail 45a.

The second crank connection member 34b is configured as a rectangular block-shaped member. The right and left side surfaces of the crank connection member 34b form a first sliding surface 60a and a second sliding surface 60b. The first sliding surfaces 60a and the second sliding surfaces 60b are formed to be flat and parallel to each other and each extend along the fourth direction Y2.

A circular through-hole 46 is formed to penetrate substantially a central portion of the second crank connection member 34b. The through-hole 46 extends in the Z-axial direction orthogonal to the second direction X2 and the fourth direction Y2, i.e., a direction parallel to the second crankshaft 12b. A crankpin 16b of the second crankshaft 12b is rotatably penetrated through the through-hole 46. The sliding surface, i.e., the inner surface of the through-hole 46, is formed into a plain bearing by a lining process (plating) such as electroforming or electrodeposition. After the plating, wire-cut may be used.

The second crank connection member 34b is placed in the frame-like second support member 32b, and thus the first sliding surfaces 60a is slidably in contact with the inner surface of the second support portion 35b, and the second sliding surfaces 60b is slidably in contact with the inner surface of the third support portion 35c. Thus, the second crank connection member 34b is supported and guided reciprocatively along the fourth direction Y2 between the second and third support portions 35b and 35c of the second support member 32b. Further, the crankpin 16b of the second crankshaft 12b is rotatably penetrated through the through-hole 46 of the second crank connection member 34b. Thus, the second crank connection member 34b engages with the second crankshaft 12 to connect the second crankshaft 12b and the second support member 32b to each other.

Note that guide rails may by provided on the inner surfaces of the second support portion 35b and the third support portion 35c of the second support member 32b, respectively, to extend along the fourth direction Y2, and guide slots to engage the guide rails, may be formed, respectively, in the first sliding surfaces 60a and the second sliding surfaces 60b of the second crank connection member 34b.

The second crank connection member 34b comprises two members (a first half portion 64a including the first sliding surfaces 60a and a second half portion 64b including the second sliding surfaces 60b) separated along separating planes 62 passing through the central axis of the through-hole 46 and crossing orthogonal to the second direction X2. When these two members are engaged with each other while the separating planes 62 meet each other, the rectangular block-shaped crank connection member 34b is formed. The separating planes 62 are defined as planes which pass through the central axis of the through-hole 46, and extend along the fourth direction Y2. Further, the separating planes 62 are each formed to have a projecting and recessed surface of a wavy, S-shaped, or cyclone configuration. The projections and recesses on each of the separating planes 62 are arranged alternately along the Z-axial direction (the axial direction of the through-hole 46) and the projections and recesses each extend along the fourth direction Y2. In this embodiment, each separating plane 62 comprises arcurate projections and arcurate recesses arranged alternately. In the engaged state, the gap between the separating plane 61 of the first half portion 64a and the separating planes 61 of the second half portion 64b is about 100 μm. The first and second half portions 64a and 64b should desirably be formed from a material which easy contains lubricating oil, for example, copper, brass or fine ceramic. Note that the first and second half portions 64a and 64b can also be made from an engineering plastic such as ABS, followed by vapor deposition plating onto the surfaces thereof.

The separating planes 62 of the first half portion 64a and the second half portion 64b each may be formed to comprise two or more projections and/or two or more recesses. Moreover, it suffices only if the concave and convex are arranged along the Z-axial direction, and the shape of the concave and convex themselves is not limited to wavy, but may be changed into various forms.

One end of the second coupling rod 36b of the second XY separate crank mechanism 30b is coupled with the second piston 24b via a support pin, and another end is coupled with the second support portion 35b of the second support member 32b. The second coupling rod 36b extends parallel to the second direction X2 and in coaxial with the second piston 24b. The second coupling rod 36b reciprocates together with the second support member 32b as one unit along the second direction X2, to reciprocate the second piston 24b along the second direction X2. Note that the connection member is not limited to a single coupling rod, but a plurality of coupling rods or a plate-shaped connection arm extending in the fourth direction Y2 may be used as well.

When using the drive device 10 as an engine, driving force is applied to the second piston 24b, and the second piston 24b reciprocates along the second direction X2. The reciprocating motion of the second piston 24b is converted into rotary motion by the reciprocating motion of the second support member 32b along the second direction X2 and the reciprocating motion of the second crank connection member 34b along the fourth direction Y2 in the second XY separate crank mechanism 30b, which is then transmitted to the second crankshaft 12b. Thus, rotation force is applied to the second crankshaft 12b.

As shown in FIG. 13, the first XY separate crank mechanism 30a is configured as the second XY separate crank mechanism 30b, and comprises a rectangular frame-shaped first support member 32a provided reciprocatively along the first direction X1, a block-shaped first crank connection member 34a supported and guided in the first support member 32a to be reciprocative along the third direction Y1, and a first coupling rod 36a which couples the first support member 32a and the first piston 24a with each other. A crankpin of the first crankshaft 12a is rotatably penetrated through the through-hole of the first crank connection member 34a.

The first XY separate crank mechanism 30a is arranged and configured to be symmetrical to the second XY separate crank mechanism 30b with regard to the central reference plane CRP, and operates symmetrically with the second XY separate crank mechanism 30b.

In the tenth embodiment, the other structure of the drive device 10 is the same as that of the first or second embodiment described above.

With the drive device 10 of the tenth embodiment configured as described above, the same advantageous effect as that of the drive device 10 of the first embodiment can be acquired. Further, according to the tenth embodiment, the support member in the XY separate crank mechanism is formed into a rectangular frame shape, and the crank connection member is disposed inside the frame slidably along the XYZ directions. With this structure, the linear guide can be omitted, making it possible to reduce the number of component members in the XY separate crank mechanism. Moreover, in the assembly, the crank connection member is divided and mounted on the crankshaft, and after the mounting, the crank connection member is mounted between the second support portion and third support portion of the support member. Thus, the crank connection member can be attached to the crankshaft 40 comprising a crankpin. Thus, the number of steps in the assembly of the crank mechanism can be reduced, and therefore the assembly is facilitated even in the case of multiple-cylinder types, thereby improving the assembling property. Furthermore, the support member and the crank connection member may be formed to have a function to automatically adjust to achieve sliding in an optimal position.

The crank connection member is divided to right and left into two along the central axis of the through-hole 46, and the separating planes 62 are formed into irregular configuration. With this structure, even if there is a gap along the XY directions between the first half portion 64a and the second half portion 64b divided, possible defects caused by mutual interference can be prevented. When the irregular configuration is formed as a wavy, S-shape, or cycloid, the mutual interference between the two members can be removed also in the ZY plane orthogonal to the Z-axial direction. When forming the clearance between the two members with a gap small as about 100 μm, the XY plane and ZY plane can be insulated from each other in terms of three-dimensional force.

Figure 15:
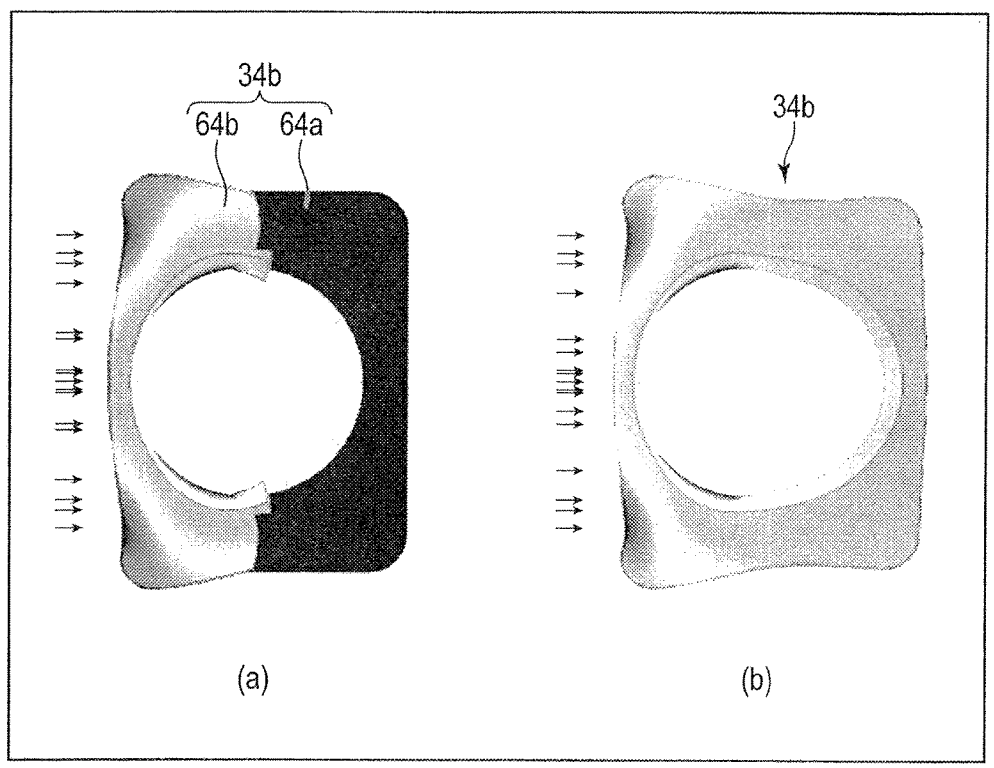
FIG. 15 is a diagram showing a crank connecting member in the tenth embodiment and a crank connecting member of a comparative example, to compare with each other in deformed states when stress acts on sliding surfaces thereof.

FIG. 15 compares in the stress acting on the crank connection member between the case (a) where the crank connection member is divided into two to have separating planes of irregular surface configuration as in this embodiment and the case (b) where the crank connecting member is undivided but an integrated one unit. As shown in FIG. 15, part (a), in the crank connection member of this embodiment, even if stress acts on the sliding surface of one half portion, the stress is insulated by the separating plane, and is not propagated to the other half portion; therefore deformation of the other half portion is not observed. Therefore, a side thrust loss is not created between the crank connection member and the support member, thereby making it possible to realize smooth sliding operation of the XY separate crank mechanism.

On the other hand, as shown in FIG. 15, part (b), in the case where the crank connection member is formed as an integral one unit, when stress acts on one sliding surface, the crank connection member deforms throughout itself. Therefore, a counter plane can be easily formed between the sliding surface of the crank connection member and the sliding surfaces of the support member, and a side thrust loss is produced between these sliding surfaces.

Eleventh Embodiment

Figure 16:
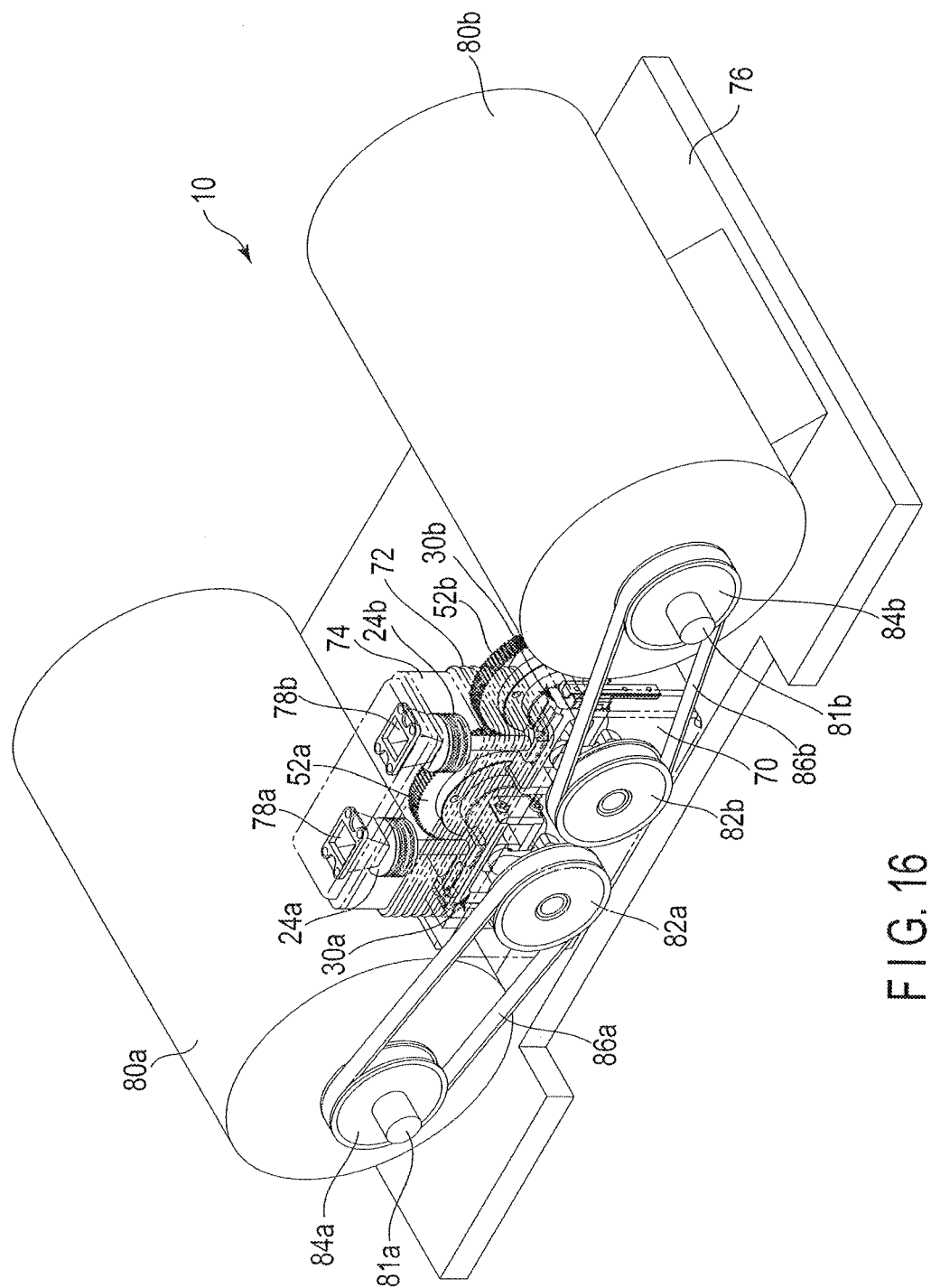
FIG. 16 is a perspective diagram showing a front side of the drive unit according to an eleventh embodiment.
Figure 17:
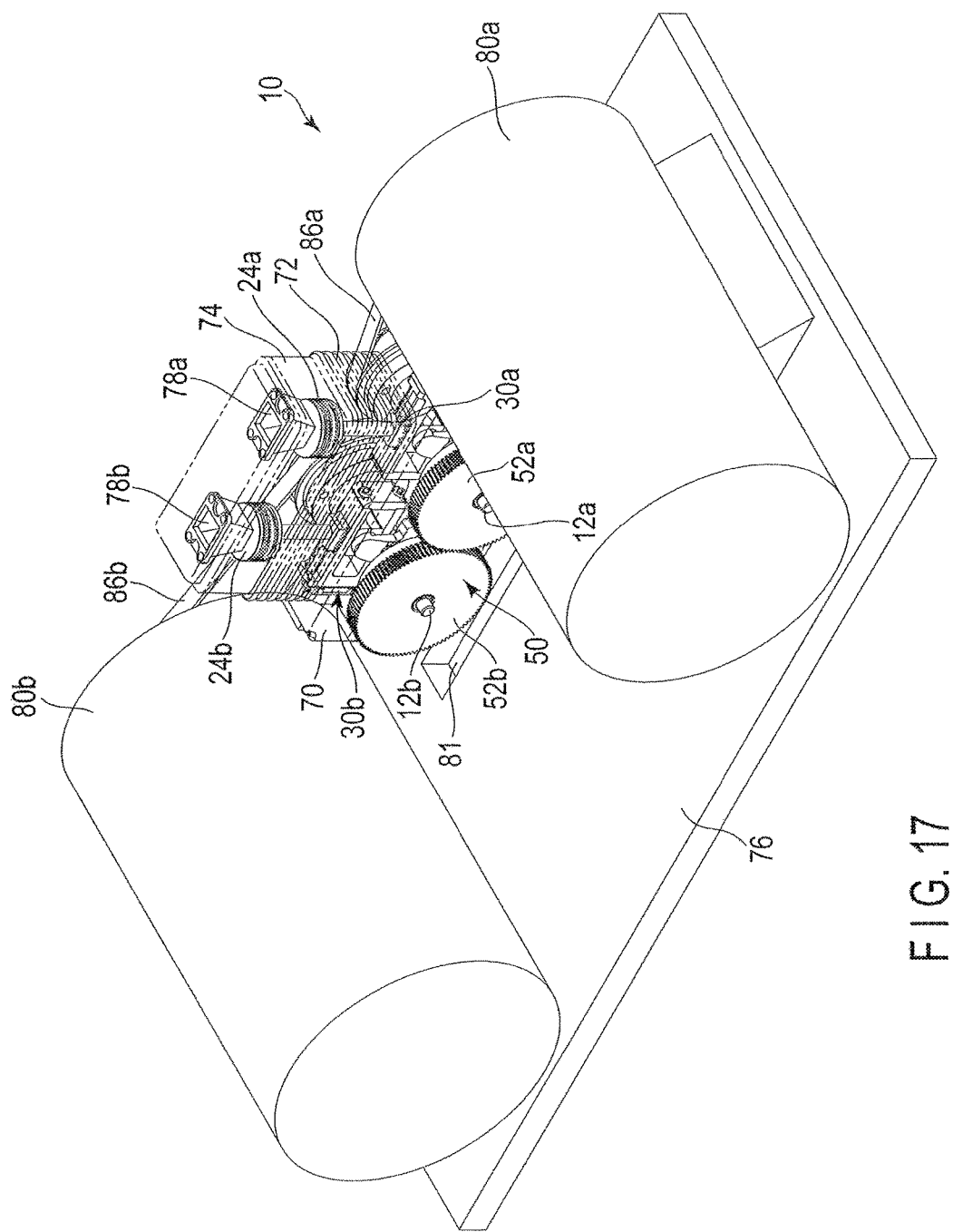
FIG. 17 is a perspective diagram showing a back side of the drive unit according to an eleventh embodiment.
Figure 18:
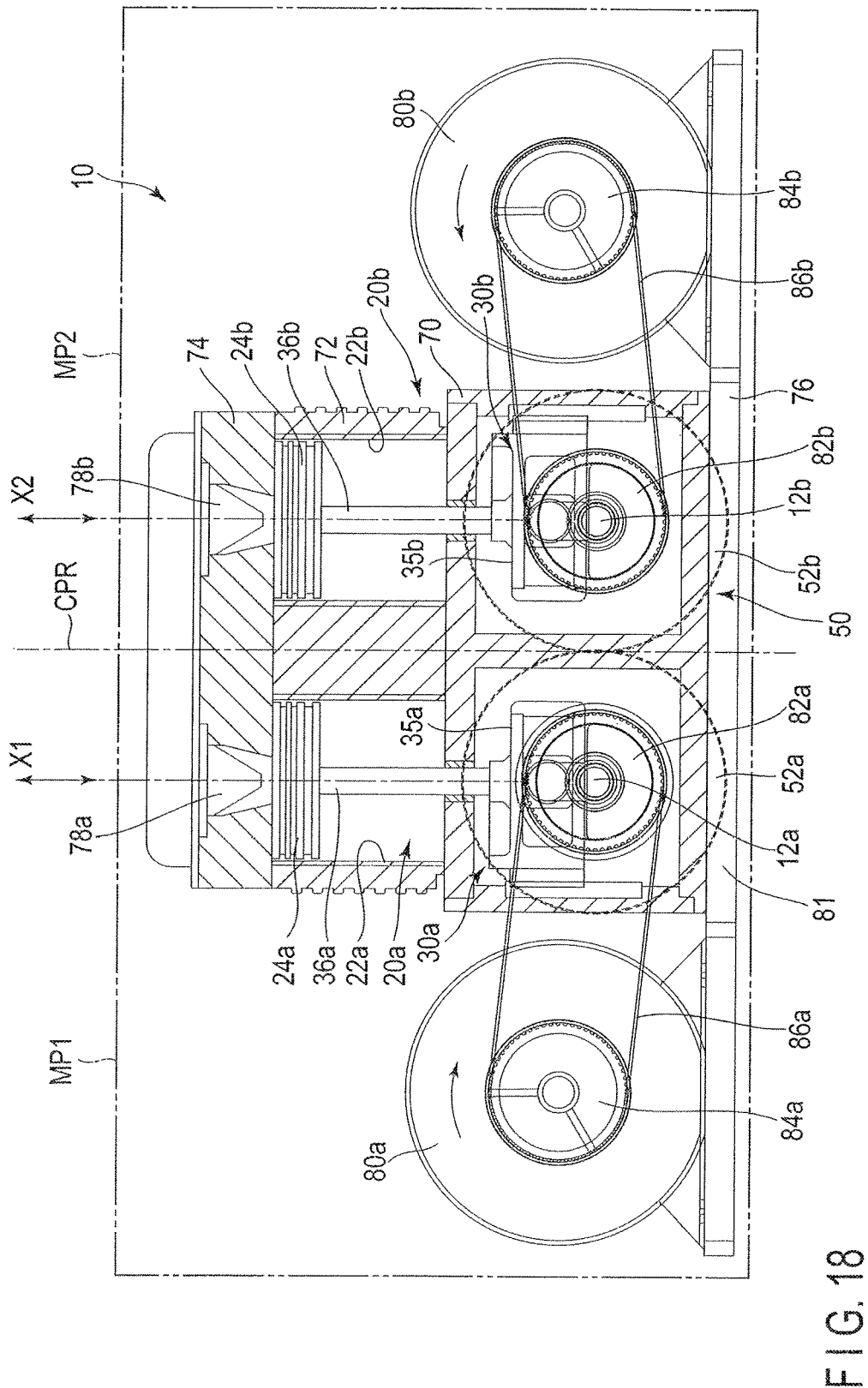
FIG. 18 is a partially exploded perspective diagram showing the front side of the drive unit according to the eleventh embodiment.

FIG. 16 is a perspective view showing a drive device according to the eleventh embodiment. FIG. 17 is a perspective view of the drive device as viewed from an opposite side to that of FIG. 16. FIG. 18 is a partially exploded front view of the drive device. According to this embodiment, the drive device is configured as a double-shaft type compressor comprising a drive motor which rotates two crankshafts.

As shown in FIGS. 16 to 18, the drive device 10 as a compressor, comprises a rectangular box-shaped crankcase 70, a cylinder block 72 provided on the crankcase 70 and comprising two cylinders 22a and 22b, a cylinder head 74 which covers top openings of the cylinders 22a and 22b, a first crankshaft 12a and a second crankshaft 12b each supported rotatably in the crankcase 70. The crankcase 70 is installed on a plate base 76.

In this embodiment, the two cylinders 22a and 22b are arranged parallel to each other, and each formed to have an equal inner diameter. Moreover, central axes of the cylinders 22a and 22b extend orthogonal to the base 76. The cylinder head 74 comprises a first lead valve 78a which controls aspiration and exhaust of the air to and from the cylinder 22a, and a second lead valve 78b which controls aspiration and exhaust of the air to and from the cylinder 22b.

The drive device 10 comprises a first drive unit 20a including the first piston 24a provided in the cylinder 22a and the first crankshaft 12a, a second drive unit 20b including the second piston 24b provided in the cylinder 22b and the second crankshaft 12b, a coupler-synchronizing mechanism 50 which couples the first crankshaft 12a and the second crankshaft 12b with each other to rotates the first crankshaft and the second crankshaft in synchronous with each other, a first drive motor 80a which drives (rotates) the first crankshaft 12a and a second drive motor 80b which drives (rotates) the second crankshaft 12b in a direction opposite to that of the first crankshaft 12a. The first drive motor 80a and the second drive motor 80b have, for example, the same size and the same output and are arranged on the base 76, respectively, on both sides of the crankcase 70.

As shown in FIG. 18, the first drive unit 20a and the second drive unit 20b have the same structure. The first drive unit 20a and the second drive unit 20b are arranged so that the first direction X1 which is the moving direction of the first piston 24a and the second direction X2 which is the moving direction of the second piston 24b are parallel each other. The first drive unit 20a and the second drive unit 20b are arranged respectively on both sides of central reference plane CRP and the first drive unit 20a and the second drive unit 20b are further arranged and configured to be symmetrical along left to right directions as well as front and rear directions with respect to the central reference plane CRP (mirror arrangement). The first drive unit 20a is provided on the first mount plane MP1 located on one side of central reference plane CRP and orthogonal to the central reference plane CRP, and the second drive unit 20b is provided on the second mount plane MP2 located on a side opposite of the central reference plane CRP and orthogonal to the central reference plane CRP, i.e., the second mount plane MP2 symmetrical to the first mount plane MP1.

According to this embodiment, the first drive unit 20a comprises a first crankshaft 12a extending orthogonal to the first mount plane MP1, and a first XY separate crank mechanism 30a provided between the first piston 24a and the first crankshaft 12a within the first mount plane MP1, which converts the reciprocating motion of the first piston 24a and the rotary motion of the first crankshaft 12a into each other. The first direction which is the reciprocating direction of the first piston 24a is defined as the first direction X1 parallel to the central reference plane CRP. The first crankshaft 12a is arranged substantially parallel to the central reference plane CRP.

The second drive unit 20b comprises a second crankshaft 12b extending orthogonal to the second mount plane MP2 and a second XY separate crank mechanism 30b provided between a second piston 24b and the second crankshaft 12b within the second mount plane MP2, which converts the reciprocating motion of the second piston 24b and the rotary motion of the second crankshaft 12b into each other. The second direction which is the reciprocating direction of the second piston 24a is defined as the second direction X2 parallel to the first direction X1 described above and also parallel to the central reference plane CRP.

The first XY separate crank mechanism 30a and the second XY separate crank mechanism 30b have the same structure, and are arranged to be symmetrical along left to right directions as well as up and down directions with respect to the central reference plane CRP. Here, as a typical example, the second XY separate crank mechanism 30b will be described in detail. As shown in FIGS. 18 and 19, the second XY separate crank mechanism 30b comprises, in the second mount plane MP2 including the central axis (the moving shaft, the X-axis) of the second piston 24b, a second support member (combinator) 32b provided to be reciprocative along the second direction X2, a second crank connection member (crank connection plate) 34b mounted to the second support member 32b to be reciprocative along the fourth direction Y2 (Y-axial direction) orthogonal to the second direction X2 in the second mount plane MP2, and a second coupling rod 36b as a coupling member, which couples the second piston 24b and the second support member 32b with each other. The movable central axis (the second direction X2) of the second support member 32b, the movable central axis (fourth direction Y2) of the second crank connection member 34b, and the central moving shaft (second direction X2) of the second coupling rod 36b are located on the second mount plane MP2.

In this embodiment, the second support member 32b is formed into a rectangular frame shape, for example. More specifically, the second support member 32b comprises a first support portion 35a extending along the second direction X2, a second support portion 35b and a third support portion 35c, extending respectively from both axial ends of the first support portion 35a along the fourth direction Y2 as one integral body. In this embodiment, the second support member 32b comprises a fourth support portion 35d which couples the extending end of the second support portion 35b and the extending end of the third support portion 35c with each other and opposes the first support portion 35a with a gap therebetween. Inner surfaces of the second support portion 35b and the third support portion 35c, which oppose each other, are formed to be flat and parallel to each other, and each extend along the fourth direction Y2. The second support member 32b is formed by, for example, die-casting from aluminum.

A second linear slider 41a is fixed to the first support portion 35a. Further, a second guide rail 45a is provided on an inner surface of the crankcase 70, to extend along the second direction X2 within the second mount plane MP2. The second linear slider 41a is supported and guided reciprocatively by the second guide rail 45a. Thus, of the second support member 32b, only the first support portion 35a is supported on the second guide rail 45a reciprocatively along the second direction X2. The second linear slider 41a may comprise a ball bearing built therein, which rollably contacts the second guide rail 45a.

The second crank connection member 34b is configured as a rectangular block-shaped member. The upper and lower side surfaces of the crank connection member 34b form a first sliding surface 60a and a second sliding surface 60b, respectively. The first sliding surfaces 60a and the second sliding surfaces 60b are formed to be flat and parallel to each other and each extend along the fourth direction Y2.

A circular through-hole 46 is formed to penetrate substantially a central portion of the second crank connection member 34b. The through-hole 46 extends in the Z-axial direction orthogonal to the second direction X2 and the fourth direction Y2, i.e., a direction parallel to the second crankshaft 12b. A crankpin 16b of the second crankshaft 12b is rotatably penetrated through the through-hole 46. The sliding surface, i.e., the inner surface of the through-hole 46, is formed into a plain bearing by a lining process (plating) such as electroforming or electrodeposition. After the plating, wire-cut may be used.

The second crank connection member 34b is placed in the frame-like second support member 32b, and thus the first sliding surfaces 60a is slidably in contact with the inner surface of the second support portion 35b, and the second sliding surfaces 60b is slidably in contact with the inner surface of the third support portion 35c. Thus, the second crank connection member 34b is supported and guided reciprocatively along the fourth direction Y2 between the second and third support portions 35b and 35c of the second support member 32b. Further, the crankpin 16b of the second crankshaft 12b is rotatably penetrated through the through-hole 46 of the second crank connection member 34b. Thus, the second crank connection member 34b engages with the second crankshaft 12 to connect the second crankshaft 12b and the second support member 32b to each other.

Note that guide rails may by provided on the inner surfaces of the second support portion 35b and the third support portion 35c of the second support member 32b, respectively, to extend along the fourth direction Y2, and guide slots to engage the guide rails, may be formed, respectively, in the first sliding surfaces 60a and the second sliding surfaces 60b of the second crank connection member 34b.

The second crank connection member 34b comprises two members (a first half portion 64a including the first sliding surfaces 60a and a second half portion 64b including the second sliding surfaces 60b) separated along separating planes 62 passing through the central axis of the through-hole 46 and crossing orthogonal to the second direction X2. When these two members are engaged with each other while the separating planes 62 meet each other, the rectangular block-shaped crank connection member 34b is formed. The separating planes 62 are defined as planes which pass through the central axis of the through-hole 46, and extend along the fourth direction Y2. Further, the separating planes 62 are each formed to have a projecting and recessed surface of a wavy, S-shaped, or cyclone configuration. The projections and recesses on each of the separating planes 62 are arranged alternately along the Z-axial direction (the axial direction of the through-hole 46) and the projections and recesses each extend along the fourth direction Y2. In this embodiment, each separating plane 62 comprises arcurate projections and arcurate recesses arranged alternately. In the engaged state, the gap between the separating plane 61 of the first half portion 64a and the separating planes 61 of the second half portion 64b is about 100 μm. The first and second half portions 64a and 64b should desirably be formed from a material which easy contains lubricating oil, for example, copper, brass or fine ceramic. Note that the first and second half portions 64a and 64b can also be made from an engineering plastic such as ABS, followed by vapor deposition plating onto the surfaces thereof.

The separating planes 62 of the first half portion 64a and the second half portion 64b each may be formed to comprise two or more projections and/or two or more recesses. Moreover, it suffices only if the concave and convex are arranged along the Z-axial direction, and the shape of the concave and convex themselves is not limited to wavy, but may be changed into various forms.

One end of the second coupling rod 36b of the second XY separate crank mechanism 30b is coupled with the second piston 24b via a support pin, and another end is coupled with the second support portion 35b of the second support member 32b. The second coupling rod 36b extends parallel to the second direction X2 and in coaxial with the second piston 24b. The second coupling rod 36b reciprocates together with the second support member 32b as one unit along the second direction X2, to reciprocate the second piston 24b along the second direction X2. Note that the connection member is not limited to a single coupling rod, but a plurality of coupling rods or a plate-shaped connection arm extending in the fourth direction Y2 may be used as well.

As shown in FIGS. 18 and 19, the first XY separate crank mechanism 30a is configured to be similar to the second XY separate crank mechanism 30b, and comprises a rectangular frame-shaped first support member 32a provided reciprocatively along the first direction X1 by the first linear slider 40a and the first guide rail 44a, a block-shaped first crank connection member 34a supported and guided in the first support member 32a to be reciprocative along the third direction Y1, and a first coupling rod 36a which couples the first support member 32a and the first piston 24a with each other. A crankpin of the first crankshaft 12a is rotatably penetrated through the through-hole of the first crank connection member 34a.

The first XY separate crank mechanism 30a configured and the second XY separate crank mechanism 30b, described above are provided in the crankcase 70. The first XY separate crank mechanism 30a is arranged and configured to be symmetrical to the second XY separate crank mechanism 30b with regard to the central reference plane CRP, and operates symmetrically with the second XY separate crank mechanism 30b.

Both axial ends of the first crankshaft 12a respectively penetrate side walls of the crankcase 70 and are each supported rotatably to the crankcase 70 by a bearing. The second crankshaft 12b extends parallel to the first crankshaft 12a, and both axial ends thereof penetrate the side walls of the crankcase 70, respectively, to be supported rotatably by the bearings to the crankcase 70.

As shown in FIGS. 16 to 18, the coupler-synchronizing mechanism 50 of the drive device 10 comprises a first gear 52a attached coaxially to one end portion of the first crankshaft 12a and a second gear 52b attached coaxially to one end portion of the second crankshaft 12b. The first gear 52a and the second gear 52b are formed to have the same number of teeth and the same diameter, to be engaged with each other. The first crankshaft 12a and the second crankshaft 12b are coupled with each other via the first gear 52a and the second gear 52b. In order to avoid interference between the first gear 52a and the second gear 52b and the base 76, a slot 81 is formed in the base 76 and lower end portions of the first gear 52a and the second gear 52b are located in the slot 81. When the first gear 52a rotates, the second gear 52b rotates with the first gear 52a in an opposite direction in synchronous with rotation of the first gear 52a. Thus, the first crankshaft 12a and the second crankshaft 12b rotate synchronously in opposite directions to each other.

A first driven pulley 82a is attached coaxially to the other end portion of the first crankshaft 12a. A second driven pulley 82a is attached coaxially to the other end portion of the second crankshaft 12b. The first driven pulley 82a and the second driven pulley 82b are formed to have the same diameter. The first drive pulley 84a is attached coaxially to a drive shaft 81a of a first drive motor 80a, and a first driving belt 86a is looped over the first drive pulley 84a and the first driven pulley 82a. The second drive pulley 84b is attached coaxially to a drive shaft 81b of a second drive motor 80b, and a second driving belt 86b is looped over the second drive pulley 84b and the second driven pulley 82b. The first drive pulley 84a and the second drive pulley 84b are formed to have the same diameter. The belt pulleys and driving belt described above each may as well be toothed pulleys and timing belt, respectively.

Note that the transmission mechanism which transmits the rotation force of the drive motor to the crankshaft may be configured from not only the combination of pulleys and belt, but also a combination of a sprocket and a chain.

In the drive device 10 configured as a compressor as described above, when the first drive motor 80a and the second drive motor 80b are operated, the rotation force of the first drive motor 80a is applied to the first crankshaft 12a via the first drive pulley, the first driving belt and the first driven pulley, and at the same time, the rotation force of the second drive motor 80b is applied to the second crankshaft 12b via the second drive pulley, the second driving belt and the second driven pulley. Thus, rotation forces opposite to each other are applied to the first crankshaft 12a and the second crankshaft 12b, respectively, to rotate the first crankshaft 12a and the second crankshaft 12b in opposite directions. During this period, the first crankshaft 12a and the second crankshaft 12b rotate in synchronous with each other by the coupler-synchronizing mechanism 50. The crankpins of the crankshafts eccentricity rotate around the respective crankshafts.

The eccentric rotary motion of the crankpin 16a of the first crankshaft 12a is split into the reciprocating motion along the third direction Y1 and the reciprocating motion along the first direction X1 by the first crank connection member 34a and the first support member 32a of the first XY separate crank mechanism 30a, and the reciprocating motion of the first support member 32a along the first direction X1 is transmitted to the first piston 24a via the first coupling rod 36a. Thus, the first piston 24a reciprocates along the first direction X1 in the first cylinder 22a to compress the fluid in the first cylinder 22a and then output the compressed fluid through the first lead valve 78a.

Similarly, the eccentric rotary motion of the crankpin 16b of the second crankshaft 12b is split into the reciprocating motion along the fourth direction Y2 and the reciprocating motion along the second direction X2 by the second crank connection member 34b and the second support member 32b of the second XY separate crank mechanism 30b and the reciprocating motion of the second support member 32b along the second direction X2 is transmitted to the second piston 24b via the second coupling rod 36b. Thus, the second piston 24b reciprocates along the second direction X2 in the second cylinder 22b to compress the fluid in the second cylinder 22b and then output the compressed fluid through the second lead valve 78b.

The first drive unit 20a and the second drive unit 20b are arranged to be symmetrical laterally and longitudinally with respect to the central reference plane CRP, and therefore they operate symmetrically. When the first piston 24a moves to the top dead center, the second piston 24b also moves synchronously to the top dead center. When the first piston 24a moves toward the bottom dead center from the top dead center, the second piston 24b also moves simultaneously from the top dead center toward the bottom dead center. The first XY separate crank mechanism 30a and second XY separate crank mechanism 30b also operate synchronously with each other while maintaining the symmetrical state with respect to the central reference plane CRP.

According to the drive device 10 configured as described above, the first and second XY separate crank mechanisms 30a and 30b of the first drive unit 20a and the second drive unit 20b split and convert the rotary motion of the first crankshaft 12a and the rotary motion of the second crankshaft 12b into the linear reciprocating motion along the first and second directions and the linear reciprocating motion along the third and fourth directions orthogonal to the first and second directions, respectively, thereby making it possible to achieve perfect parallel motion between the first piston 24a and the second piston 24b. Therefore, the uneven contact of the pistons to the cylinders can be avoided, thereby improving the sealing property, reducing the friction loss, and achieving high efficiency in side thrust lossless. Furthermore, since the first drive unit and the second drive unit are arranged and configured to be symmetrical along left to right directions as well as front to rear directions with respect to the central reference plane CRP (mirror arrangement), vibration caused by deviation can be completely canceled out, thereby making it possible to form a non-vibrating rotary structure.

Moreover, with the XY separate crank mechanism, the side thrust of the pistons can be substantially avoided, and as a result, the cylinders and pistons can be formed from a ceramic, glass or the like, thereby making it possible to structure a compressor with sufficient thermal efficiency at low temperature. Further, in the drive device, no vibration caused by side thrust is produced; therefore the cylinder can be formed from carbon fiber, or a plastic raw material such as PBT. Further, with being side thrustless, a higher aspect ratio of piston can be realized, and accordingly, a shorter stroke can be achieved, making it possible to obtain a small-sized and low-profile compressor or pump.

Further, according to the eleventh embodiment, the support member in the XY separate crank mechanism is formed into a U shaped frame, and the crank connection member is disposed inside the frame slidably along the XYZ directions. With this structure, the linear guide can be omitted, making it possible to reduce the number of component members in the XY separate crank mechanism. Moreover, in the assembly, the crank connection member is divided and mounted on the crankshaft, and after the mounting, the crank connection member is mounted between the second support portion and third support portion of the support member. Thus, the crank connection member can be attached to the first and second crankshafts 12a and 12b each comprising a crankpin. Thus, the number of steps in the assembly of the crank mechanism can be reduced, and therefore the assembly is facilitated even in the case of multiple-cylinder types, thereby improving the assembling property. Furthermore, the support member and the crank connection member may be formed to have a function to automatically adjust to achieve sliding in an optimal position.

The crank connection member is divided to right and left into two along the central axis of the through-hole 46, and the separating planes 62 are formed into irregular configuration. With this structure, even if there is a gap along the XY directions between the first half portion 64a and the second half portion 64b divided, possible defects caused by mutual interference can be prevented. When the irregular configuration is formed as a wavy, S-shape, or cycloid, the mutual interference between the two members can be removed also in the ZY plane orthogonal to the Z-axial direction. When forming the clearance between the two members with a gap small as about 100 μm, the XY plane and ZY plane can be insulated from each other in terms of three-dimensional force. At the same time, the two members can be automatically centered with each other along the Z-axial direction.

As described above, according to this embodiment, a mirror-type XY separate crank mechanism in which two crankshafts are combined with a gear or a belt to operate in opposite directions to suppress vibration, and a self-centering XYZ force separation mechanism are combined. With this structure, the friction loss and vibration are reduced, making it possible to obtain a high-efficiency compressor or pump. Further, the cylinders and pistons can be arranged respectively adjacent to each other, thereby facilitating collective piping. The conventional crosshead is not required and no substantial vibration is produced, and therefore the weight of the entire device can be reduced. Furthermore, the two crankshafts are in perfect synchronization and simultaneous positive and opposite rotations, and therefore the crankshafts can be driven with two independent drive motors. Therefore, small-sized and inexpensive motors can be employed as the drive motors.

Note that the number of drive motors is not limited to two, but a single drive motor may be used. In this case, the rotation force is applied to one of the crankshafts with the drive motor, and is transmitted to the other crankshaft by a coupler-synchronizing mechanism. Moreover, the shape of the pistons is not limited to circular, but it may as well be other non-circular shapes, for example, an oval, a rectangular shape with rounded corners, or other polygonal shape, or elliptical shape with a narrowed central portion.

Twelfth Embodiment

Figure 20:
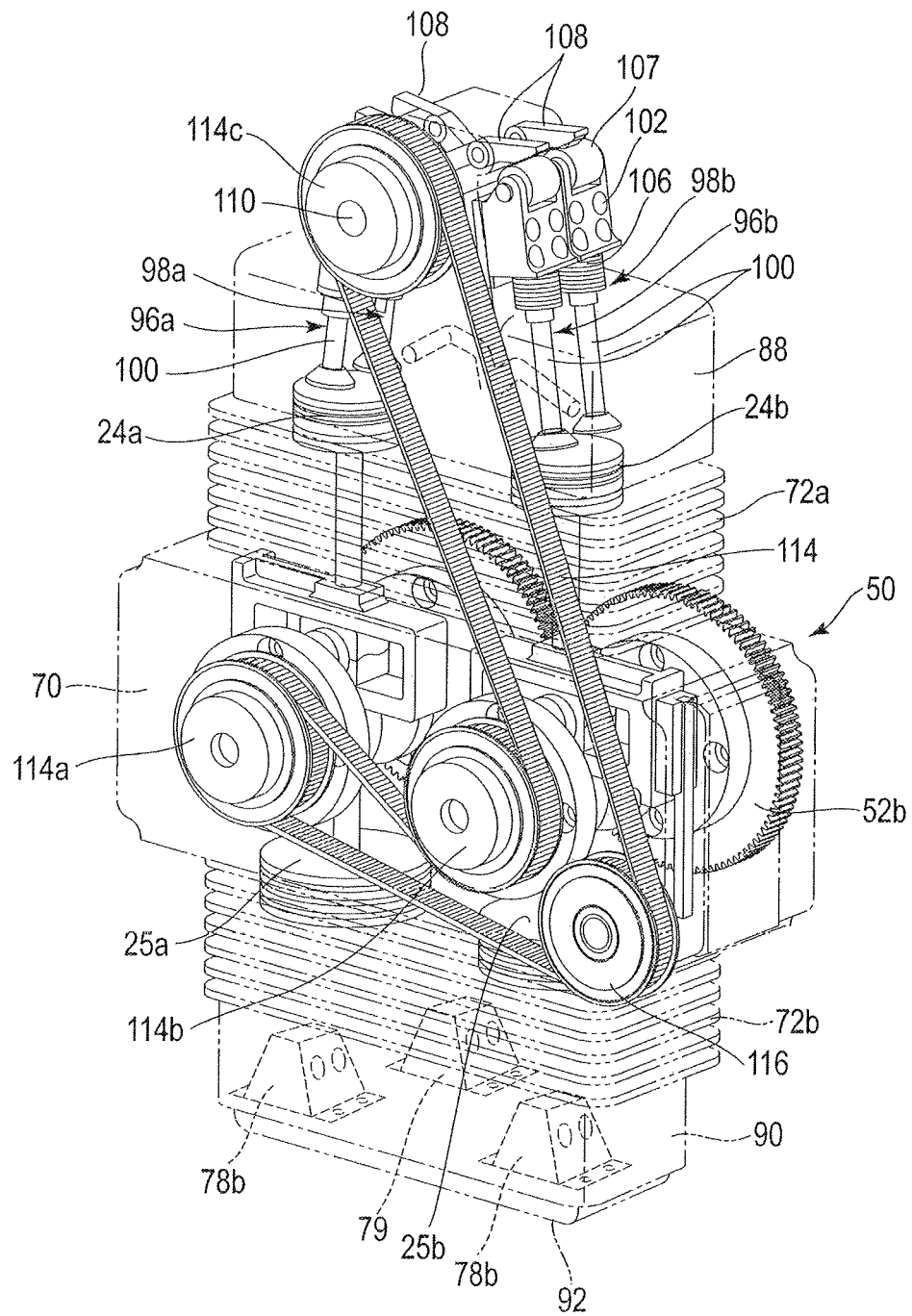
FIG. 20 is a perspective diagram showing a front side of the drive unit according to a twelfth embodiment.
Figure 21:
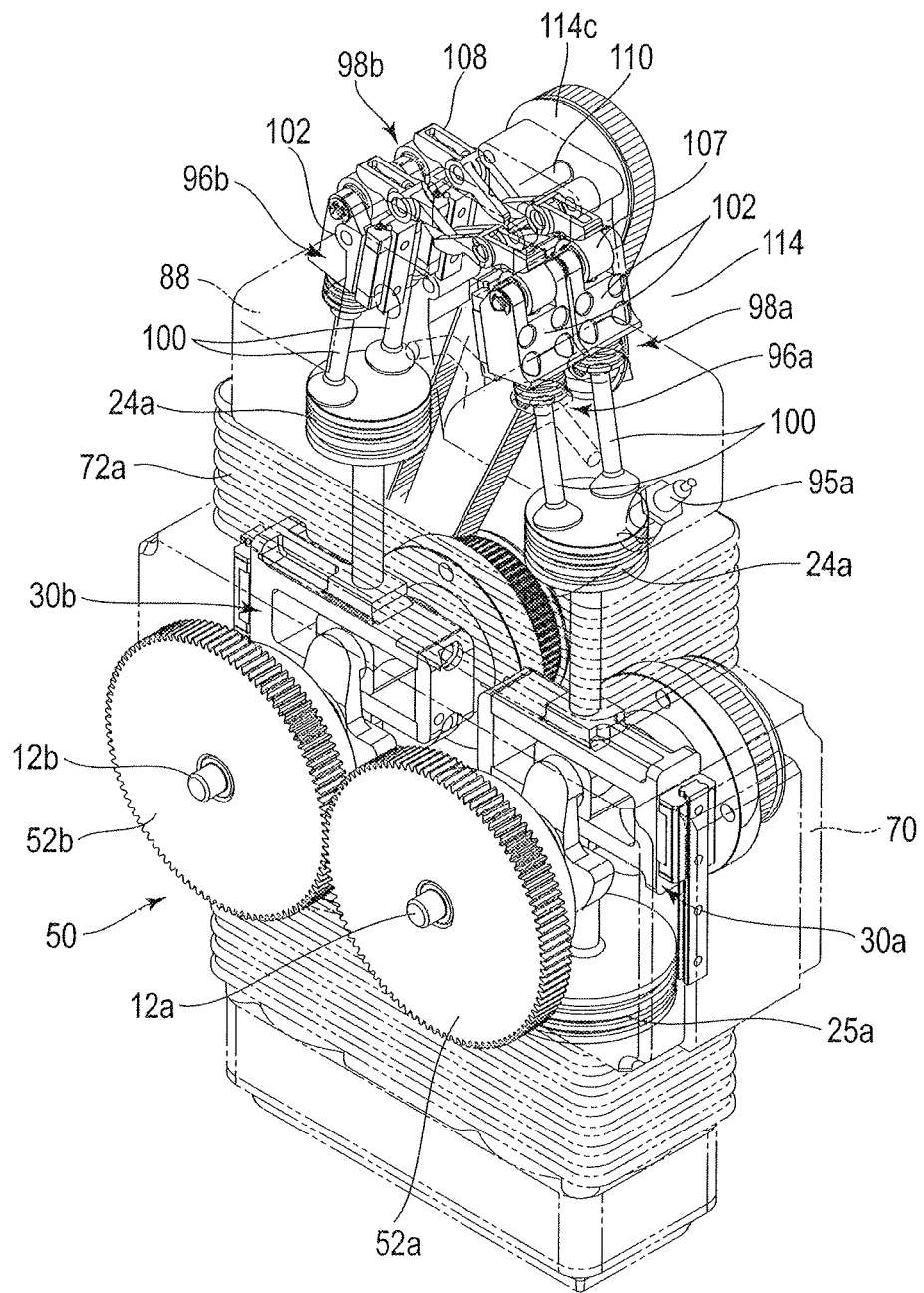
FIG. 21 is a perspective diagram showing a back side of the drive unit according to the twelfth embodiment.
Figure 23:
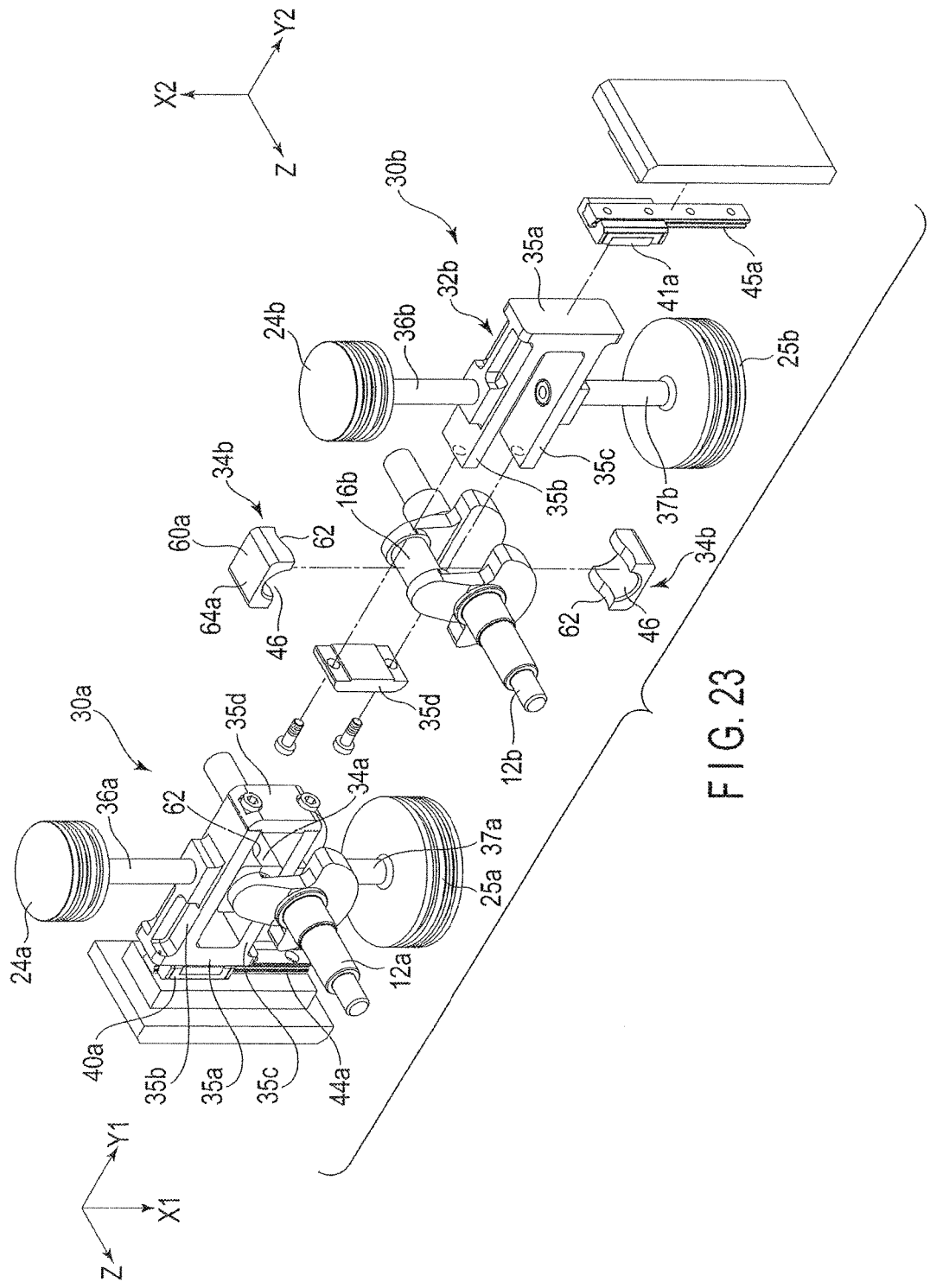
FIG. 23 is an exploded perspective diagram showing an XY separate crank mechanism of the drive unit according to the twelfth embodiment.

FIG. 20 is a perspective view showing a front side of a drive device according to the twelfth embodiment. FIG. 21 is a perspective view showing a rear side of the drive device. FIG. 22 is a partially exploded front view of the drive device. FIG. 23 is an exploded perspective view showing an XY separate crank mechanism of the drive device. According to this embodiment, the drive device is configured as a double-shaft engine device.

As shown in FIGS. 20 to 22, a drive device 10 is configured as an engine device which operates in, for example, two cycles. The drive device 10 comprises a rectangular box shaped crankcase 70, a top cylinder block (first cylinder block) 72a provided on the crankcase 70 and comprising a first cylinder 22a and a second cylinder 22b, a cylinder-head cover (cam case) 88 which covers top openings of the first and second cylinders 22a and 22b, a lower cylinder block (second cylinder block) 72b provided under the crankcase 70 and comprising a third cylinder 23a and a fourth cylinder 23b, a valve casing 90 which covers lower openings of the third and fourth cylinders 23a and 23b, an air collector 92 provided on an bottom surface of the valve casing 90, and a first crankshaft 12a and a second crankshaft 12b each supported rotatably in the crankcase 70. In this embodiment, the first crankshaft 12a and the second crankshaft 12b are arranged to be parallel to each other.

In this embodiment, the two upper cylinders, namely, the first and second cylinders 22a and 22b are arranged to be parallel to each other and formed to have the same inner diameter. The two lower cylinders, namely, the third and fourth cylinders 23a and 23b are arranged to be parallel to each other and formed to have the same inner diameter. The inner diameter of the third and fourth cylinders 23a and 23b is greater than the inner diameter of the first and second cylinders 22a and 22b. Further, the first cylinder 22a on an upper side and the third cylinder 23a on a lower side are formed to be coaxial with each other and have a common central axis. The second cylinder 22b on an upper side and the fourth cylinder 23b on a lower side are formed to be coaxial with each other and have a common central axis.

The cylinder-head cover 88 comprises a combustion chamber 94a formed therein to communicate to the top opening of the first cylinder 22a, and comprising an air inlet port and an air outlet port each opened in the combustion chamber 94a, and further a combustion chamber 94b formed therein to communicate to the top openings of the second cylinder 22b and comprising an air inlet port and an air outlet port opened in the combustion chamber 94b. Further, the cylinder-head cover 88 comprises a first charge-side valve mechanism 96a which opens/closes the air outlet port on a first cylinder 22a side, a first discharge-side valve mechanism 98a which opens/closes the outlet port on a first cylinder 22a side, a second charge-side valve mechanism 96b which opens/closes the air inlet port on a second cylinder 22b side, and a second discharge-side valve mechanism 98b which opens/closes the outlet port on a second cylinder 22b side.

The valve mechanisms 96a, 96b, 98a and 98b have the same structure. The valve mechanisms each comprise, for example, a mushroom valve 100 as a valve body, a bulb slider 102 connected to a stem of the mushroom valve 100, a linear guide 104 fixed to the cylinder-head cover 88, which guides the bulb slider 102 slidably in opening and closing directions of the mushroom valve 100, a valve spring 106 provided between the bulb slider 102 and the cylinder-head cover 88, which urges the mushroom valve 100 toward a direction of a close position, a cam follower 107 attached rotatably to the bulb slider 102, a rocker arm 108 attached swingably to the cylinder-head cover 88 and comprising one end abutting to the cam follower 107, and a common cam shaft 110 comprising a plurality of cams in contact with the other end of the rocker arm 108 and the supported rotatably by the cylinder-head cover 88.

Further, ignition plugs 95a and 95b are mounted to the cylinder-head cover 88 to oppose the combustion chamber 94a and 94b, respectively.

On the other hand, the lower valve casing 90 comprises a first lead valve 78a which controls the aspiration of the air to the third cylinder 23a and a second lead valve 78b which controls the aspiration of the air to the fourth cylinder 23b. Further, an exhaust lead valve 79 is provided in the valve casing 90. The exhaust lead valve 79 controls exhaust of compression gas from the third cylinder 23a and the fourth cylinder 23b. The drive device 10 comprises an exhaust passage (exhaust piping) 112 extending from the exhaust lead valve 79 to two inlet ports of the cylinder-head cover 88. In this embodiment, the exhaust passage 112 is defined a circulating pore continuously formed in the lower cylinder block 72b, the crankcase 70, the top cylinder block 72a and the cylinder-head cover 88. The compression gas discharged from the third cylinder 23a and the fourth cylinder 23b is supplied to the combustion chambers 94a and 94b of the first cylinder 22a and the second cylinder 22b via the exhaust lead valve 79, the exhaust passage 112 and the inlet ports of the cylinder-head cover 88, as will be described later.

As shown in FIGS. 20 to 22, the drive device 10 comprises a first drive unit 20a which drives a first crankshaft 12a, a second drive unit 20b having the same structure as that of the first drive unit 20a, which drives a second crankshaft 12b and a coupler-synchronizing mechanism 50 which couples the first crankshaft 12a and the second crankshaft 12b with each other and synchronously rotates them. The first drive unit 20a and the second drive unit 20b are arranged on the respective sides of the central reference plane CRP and further the first drive unit 20a and the second drive unit 20b are arranged to be symmetrical along left to right as well as front to rear directions with respect to the central reference plane CRP (mirror arrangement). The first drive unit 20a is located on one side of the central reference plane CRP and provided also in the first mount plane MP1 orthogonal to the central reference plane CRP. The second drive unit 20b is provided in the second mount plane MP2 located on an opposite side of the central reference plane CRP and orthogonal to the central reference plane CRP, i.e., the second mount plane MP2 symmetrical to the first mount plane MP1. The first crankshaft 12a extends orthogonal to the first mount plane MP1, and the second crankshaft 12b extends orthogonal to the second mount plane MP2.

The first drive unit 20a comprises a first piston 24a provided reciprocatively in the first cylinder 22a, the first crankshaft 12a described above, a third piston 25a provided reciprocatively in the third cylinder 23a, and a first XY separate crank mechanism 30a provided between the first piston 24a and the first crankshaft and between the third piston 25a and the first crankshaft, which converts the reciprocating motion of the first piston 24a and the third piston 25a and the rotary motion of the first crankshaft 12a into each other. The first direction which is the reciprocating direction of the first piston 24a and the third piston 25a is defined as the first direction X1 parallel to the central reference plane CRP. Moreover, in this embodiment, the third piston 25a on the lower side is formed to have a greater diameter than that of the first piston 24a on the upper side, and further formed to have a greater aspect ratio.

The second drive unit 20b comprises a second piston 24b provided reciprocatively in the second cylinder 22b, the second crankshaft 12b described above, a fourth piston 25b provided reciprocatively in the fourth cylinder 23b, a second XY separate crank mechanism 30b provided between the second piston 24b and the second crankshaft 12b and between the fourth piston 25b and the second crankshaft, which converts the reciprocating motion of the second piston 24b and the fourth piston 25b and the rotary motion of the second crankshaft 12b into each other. The second direction which is the reciprocating direction of the second piston 24b and the fourth piston 25b is defined as the second direction X2 parallel to the first direction X1 and also parallel to the central reference plane CRP. In this embodiment, the fourth piston 25b on the lower side is formed to have a greater diameter than that of the second piston 24b on the upper side, and further formed to have a greater aspect ratio (diameter/height).

The first XY separate crank mechanism 30a and the second XY separate crank mechanism 30b have the same structure, and are arranged to be symmetrical along left to right directions as well as up and down directions with respect to the central reference plane CRP. Here, as a typical example, the second XY separate crank mechanism 30b will be described in detail. As shown in FIGS. 22 and 23, the second XY separate crank mechanism 30b comprises, in the second mount plane MP2 including the central axis (the moving shaft, the X-axis) of the second piston 24b and the central axis of the fourth piston 25b, a second support member (combinator) 32b provided to be reciprocative along the second direction X2, a second crank connection member (crank connection plate) 34b mounted to the second support member 32b to be reciprocative along the fourth direction Y2 (Y-axial direction) orthogonal to the second direction X2 in the second mount plane MP2, a second coupling rod 36b as a coupling member, which couples the second piston 24b and the second support member 32b with each other, and a fourth coupling rod 37b as a coupling member, which couples the fourth piston 25b and the second support member 32b with each other. The movable central axis (the second direction X2) of the second support member 32b, the movable central axis (fourth direction Y2) of the second crank connection member 34b, and the central moving shafts (second direction X2) of the second and fourth coupling rods 36b and 37b are located on the second mount plane MP2.

In this embodiment, the second support member 32b is formed into a rectangular frame shape, for example. More specifically, the second support member 32b comprises a first support portion 35a extending along the second direction X2, a second support portion 35b and a third support portion 35c, extending respectively from both axial ends of the first support portion 35a along the fourth direction Y2. In this embodiment, the second support member 32b comprises, integrally as one unit, a fourth support portion 35d which couples the extending end of the second support portion 35b and the extending end of the third support portion 35c with each other and opposes the first support portion 35a with a gap therebetween. Inner surfaces of the second support portion 35b and the third support portion 35c, which oppose each other, are formed to be flat and parallel to each other, and each extend along the fourth direction Y2. The second support member 32b is formed by, for example, die-casting from aluminum.

A first linear slider 41a is fixed to the first support portion 35a. Further, a second guide rail 45a is provided on an inner surface of the crankcase 70, to extend along the second direction X2 within the second mount plane MP2. The second linear slider 41a is supported and guided reciprocatively by the second guide rail 45a. Thus, of the second support member 32b, only the first support portion 35a is supported on the second guide rail 45a reciprocatively along the second direction X2. The second linear slider 41a may comprise a ball bearing built therein, which rollably contacts the second guide rail 45a.

The second crank connection member 34b is configured as a rectangular block-shaped member. The upper and lower side surfaces of the crank connection member 34b form a first sliding surface 60a and a second sliding surface 60b. The first sliding surfaces 60a and the second sliding surfaces 60b are formed to be flat and parallel to each other and each extend along the fourth direction Y2.

A circular through-hole 46 is formed to penetrate substantially a central portion of the second crank connection member 34b. The through-hole 46 extends in the Z-axial direction orthogonal to the second direction X2 and the fourth direction Y2, i.e., a direction parallel to the second crankshaft 12b. A crankpin 16b of the second crankshaft 12b is rotatably penetrated through the through-hole 46. The sliding surface, i.e., the inner surface of the through-hole 46, is formed into a plain bearing by a lining process (plating) such as electroforming or electrodeposition. After the plating, wire-cut may be used.

The second crank connection member 34b is placed in the frame-like second support member 32b, and thus the first sliding surfaces 60a is slidably in contact with the inner surface of the second support portion 35b, and the second sliding surfaces 60b is slidably in contact with the inner surface of the third support portion 35c. Thus, the second crank connection member 34b is supported and guided reciprocatively along the fourth direction Y2 between the second and third support portions 35b and 35c of the second support member 32b. Further, the crankpin 16b of the second crankshaft 12b is rotatably penetrated through the through-hole 46 of the second crank connection member 34b. Thus, the second crank connection member 34b engages with the second crankshaft 12 to connect the second crankshaft 12b and the second support member 32b to each other.

Note that guide rails may by provided on the inner surfaces of the second support portion 35b and the third support portion 35c of the second support member 32b, respectively, to extend along the fourth direction Y2, and guide slots to engage the guide rails, may be formed, respectively, in the first sliding surfaces 60a and the second sliding surfaces 60b of the second crank connection member 34b.

The second crank connection member 34b comprises two members (a first half portion 64a including the first sliding surfaces 60a and a second half portion 64b including the second sliding surfaces 60b) separated along separating planes 62 passing through the central axis of the through-hole 46 and crossing orthogonal to the second direction X2. When these two members are engaged with each other while the separating planes 62 meet each other, the rectangular block-shaped crank connection member 34b is formed. The separating planes 62 are defined as planes which pass through the central axis of the through-hole 46, and extend along the fourth direction Y2. Further, the separating planes 62 are each formed to have a projecting and recessed surface of a wavy, S-shaped, or cyclone configuration. The projections and recesses on each of the separating planes 62 are arranged alternately along the Z-axial direction (the axial direction of the through-hole 46) and the projections and recesses each extend along the fourth direction Y2. In this embodiment, each separating plane 62 comprises arcurate projections and arcurate recesses arranged alternately. In the engaged state, the gap between the separating plane 61 of the first half portion 64a and the separating planes 61 of the second half portion 64b is about 100 μm. The first and second half portions 64a and 64b should desirably be formed from a material which easy contains lubricating oil, for example, copper, brass or fine ceramic. Note that the first and second half portions 64a and 64b can also be made from an engineering plastic such as ABS, followed by vapor deposition plating onto the surfaces thereof.

The separating planes 62 of the first half portion 64a and the second half portion 64b each may be formed to comprise two or more projections and/or two or more recesses. Moreover, it suffices only if the concave and convex are arranged along the Z-axial direction, and the shape of the concave and convex themselves is not limited to wavy, but may be changed into various forms.

One end of the second coupling rod 36b of the second XY separate crank mechanism 30b is coupled with the second piston 24b via a support pin, and another end is coupled with the second support portion 35b of the second support member 32b. The second coupling rod 36b extends parallel to the second direction X2 and in coaxial with the second piston 24b. The second coupling rod 36b reciprocates together with the second support member 32b as one unit along the second direction X2, to reciprocate the second piston 24b along the second direction X2.

One end of the second coupling rod 36b of the second XY separate crank mechanism 30b is coupled with the second piston 24b via a support pin, and another end is coupled with the second support portion 35b of the second support member 32b. The second coupling rod 36b extends parallel to the second direction X2 and in coaxial with the second piston 24b. The second coupling rod 36b reciprocates together with the second support member 32b as one unit along the second direction X2, to reciprocate the second piston 24b along the second direction X2.

One end of the fourth coupling rod 37b of the second XY separate crank mechanism 30b is coupled with the fourth piston 25b via a support pin, and another end is coupled with the third support portion 35c of the second support member 32b. The fourth coupling rod 37b extends parallel to the second direction X2 and in coaxial with the fourth piston 25b. The fourth coupling rod 37b reciprocates together with the second support member 32b as one unit along the second direction X2, to reciprocate the fourth piston 25b along the second direction X2.

Note that the connection member is not limited to a single coupling rod, but a plurality of coupling rods or a plate-shaped connection arm extending in the fourth direction Y2 may be used as well.

As shown in FIGS. 22 and 23, the first XY separate crank mechanism 30a is configured to be similar to the second XY separate crank mechanism 30b, and comprises a rectangular frame-shaped first support member 32a provided reciprocatively along the first direction X1 by the first linear slider 40a and the first guide rail 44a, a block-shaped first crank connection member 34a supported and guided in the first support member 32a to be reciprocative along the third direction Y1, a first coupling rod 36a which couples the first support member 32a and the first piston 24a with each other, and a third coupling rod 37a which couples the first support member 32a and the third piston 25a with each other. A crankpin of the first crankshaft 12a is rotatably penetrated through the through-hole of the first crank connection member 34a.

The first crank connection member 34a comprises two members (a first half portion including the first sliding surfaces and a second half portion including the second sliding surfaces) separated along separating planes 62 passing through the central axis of the through-hole and crossing orthogonal to the first direction X1. When these two members are engaged with each other while the separating planes 62 meet each other, the rectangular block-shaped crank connection member 34a is formed. The separating planes 62 are defined as planes which pass through the central axis of the through-hole 46, and extend along the fourth direction Y2. Further, the separating planes 62 are each formed to have a projecting and recessed surface of a wavy, S-shaped, or cyclone configuration. The projections and recesses on each of the separating planes 62 are arranged alternately along the Z-axial direction (the axial direction of the through-hole) and the projections and recesses each extend along the second direction Y1.

The first XY separate crank mechanism 30a configured and the second XY separate crank mechanism 30b, described above are provided in the crankcase 70. The first XY separate crank mechanism 30a is arranged and configured to be symmetrical to the second XY separate crank mechanism 30b with regard to the central reference plane CRP, and operates symmetrically with the second XY separate crank mechanism 30b.

Both axial ends of the first crankshaft 12a respectively penetrate side walls of the crankcase 70 and are each supported rotatably to the crankcase 70 by a bearing. The second crankshaft 12b extends parallel to the first crankshaft 12a, and both axial ends thereof penetrate the side walls of the crankcase 70, respectively, to be supported rotatably by the bearings to the crankcase 70.

As shown in FIGS. 20 to 22, the coupler-synchronizing mechanism 50 of the drive device 10 comprises a first gear 52a attached coaxially to one end portion of the first crankshaft 12a and a second gear 52b attached coaxially to one end portion of the second crankshaft 12b. The first gear 52a and the second gear 52b are formed to have the same diameter and the same number of teeth, to be engaged with each other. The first crankshaft 12a and the second crankshaft 12b are coupled with each other via the first gear 52a and the second gear 52b. When the first gear 52a rotates, the second gear 52b rotates with the first gear 52a in an opposite direction in synchronous with rotation of the first gear 52a. Thus, the first crankshaft 12a and the second crankshaft 12b rotate synchronously in opposite directions to each other.

A first timing pulley 114a is attached coaxially to the other end portion of the first crankshaft 12a. A second timing pulley 114b is attached coaxially to the other end portion of the second crankshaft 12b. A third timing pulley 114a is attached coaxially to one end of the cam shaft 110 mounted to the cylinder-head cover 88. Further, a rotatable idler pulley 116 is provided near the second timing pulley 114b. The idler pulley 116 is supported by, for example, the crankcase 70.

A cam timing belt 114 is looped over the first, second and third timing pulleys 114a, 114b and 114c and the idler pulley 116. Toothed pulleys are used for the timing pulleys and the idler belt pulley 116, respectively. For the timing belt 114, a toothed belt with gears on both sides is used. With the first, second and third timing pulleys 114a, 114b and 114c, the idler belt pulley 116 and the cam timing belt 114, the cam shaft 110 is rotated in synchronous with the rotation of the first and second crankshafts 12a and 12b to open/close the inlet-side and outlet-side valves at predetermined timings.

Note that the transmission mechanism for rotating the crankshaft 110 may be configured from not only the combination of toothed pulleys and toothed belt, but also a combination of a sprocket and a chain.

In the drive device 10 configured as an engine device as described above, at the starting-up, the first crankshaft 12a and the second crankshaft 12b are rotated by a motor or the like (not shown) to ascend and descend the first to fourth pistons 24a, 24b, 25a and 25b. For example, as shown in FIG. 22, while the first and second pistons 24a and 24b are moving to the top dead center from the bottom dead center, the first suction valve and the second suction valve are opened to supply air and fuel to the first and second cylinders 22a and 22b and the combustion chambers 94a and 94b from the inlet ports, and thereafter the first suction valve and second suction valve are closed to compress the mixture gas of the fuel and air. Subsequently, the air-fuel mixture in the combustion chamber 94a and 94b is ignited by the ignition plugs 95a and 95b, respectively, to cause combustion and explosion to descend the first and second pistons 24a and 24b toward the bottom dead center from the top dead center. During this period, the first outlet valve and the second outlet valve are opened and the combustion gas is exhausted from the exhaust ports in the last half stage of the descending of the pistons. After the start-up, the air feed and combustion are repeated to reciprocatively drive the first and second pistons 24a and 24b along the first direction X1 and the second direction X2. The reciprocating motion of the first and second pistons 24a and 24b is converted into rotary motions by the first XY separate crank mechanism 30a and second XY separate crank mechanism 30b, and the rotation forces are applied to each of the first and second crankshafts 12a and 12b, respectively. Thus, the first crankshaft 12a and the second crankshaft 12b rotate in opposite directions to each Other. During this period, the first crankshaft 12a and the second crankshaft 12b rotate in synchronous with each other by the coupler-synchronizing mechanism 50.

Further, in synchronous with the reciprocating motion of the first and second pistons 24a and 24b, the third and fourth pistons 25a and 25b are driven reciprocatively along the first direction X1 and the second direction X2. While the third and fourth pistons 25a and 25b are moving to the top dead center from the bottom dead center, the outside air is charged to the second cylinder 23a and the fourth cylinder 23b from the first lead valve 78a and the second lead valve 78b. While the third and fourth pistons 25a and 25b are moving to the bottom dead center from the top dead center, the air in the second cylinder 23a and the fourth cylinder 23b is compressed by the third and fourth pistons, and the compression gas is discharged to the exhaust passage 112 from the exhaust lead valve 79. Then, the compression gas is sent to the inlet ports of the cylinder-head cover 88 via the exhaust passage 112, and supplied to the combustion chambers 94a and 94b via the first suction valve and second suction valve. As the third and fourth pistons 25a and 25b repeat the reciprocation motion along the first direction X1 and the second direction X2, the air feed and discharging of the compression gas are repeated. Thus, the second and fourth cylinders 23a and 23b and the second and fourth pistons 25a and 25b can function as pumps or turbo superchargers.

The first drive unit 20a and the second drive unit 20b are arranged to be symmetrical along left to right well as front to rear directions with respect to the central reference plane CRP, and therefore they operate symmetrically. When the first piston 24*a* moves to the top dead center, the second piston 24*b* also moves synchronously to the top dead center. When the first piston 24*a* moves toward the bottom dead center from the top dead center, the second piston 24*b* also moves simultaneously from the top dead center toward the bottom dead center. Similarly, the second piston 25*a* and the fourth piston 25*b* ascend and descend in synchronous with each other.

According to the drive device 10 configured as described above, the first and second XY separate crank mechanisms 30*a* and 30*b* of the first drive unit 20*a* and the second drive unit 20*b* split and convert the rotary motion of the first crankshaft 12*a* and the rotary motion of the second crankshaft 12*b* into the linear reciprocating motion along the first and second directions and the linear reciprocating motion along the third and fourth directions orthogonal to the first and second directions, respectively, thereby making it possible to achieve perfect parallel motion between the first piston 24*a* and the second piston 24*b* and between the third piston 25*a* and the fourth piston 25*b*. Therefore, the uneven contact of the pistons to the cylinders can be avoided, thereby improving the sealing property, reducing the friction loss, and achieving high efficiency in side thrust lossless. Furthermore, since the first drive unit and the second drive unit are arranged and configured to be symmetrical along left to right directions as well as front to rear directions with respect to the central reference plane CRP (mirror arrangement), vibration caused by deviation can be completely canceled out, thereby making it possible to form a non-vibrating rotary structure.

Moreover, with the XY separate crank mechanism, the side thrust of the pistons can be substantially avoided, and as a result, the cylinders and pistons can be formed from a ceramic, glass or the like, thereby making it possible to structure an engine with sufficient thermal efficiency at low temperature. Further, in the drive device, no vibration caused by side thrust is produced; therefore the cylinder can be formed from carbon fiber, or a plastic raw material such as PBT. Further, with being side thrustless, a higher aspect ratio of piston can be realized, and accordingly, a shorter stroke can be achieved, making it possible to obtain a small-sized and low-profile engine.

Further, according to this embodiment, the support member in each of the XY separate crank mechanisms is formed into a U shaped frame, and the crank connection member is disposed inside the frame slidably along the XYZ directions. With this structure, the linear guide can be omitted, making it possible to reduce the number of component members in the XY separate crank mechanism. Moreover, in the assembly, the crank connection member is divided and mounted on the crankshaft, and after the mounting, the crank connection member is mounted between the second support portion and third support portion of the support member. Thus, the crank connection member can be attached to the first and second crankshafts 12*a* and 12*b* each comprising a crankpin. Thus, the number of steps in the assembly of the crank mechanism can be reduced, and therefore the assembly is facilitated even in the case of multiple-cylinder types, thereby improving the assembling property. Furthermore, the support member and the crank connection member may be formed to have a function to automatically adjust to achieve sliding in an optimal position.

The crank connection member is divided to right and left into two along the central axis of the through-hole 46, and the separating planes 62 are formed into irregular configuration. With this structure, even if there is a gap along the XY directions between the first half portion 64*a* and the second half portion 64*b* divided, possible defects caused by mutual interference can be prevented. When the irregular configuration is formed as a wavy, S-shape, or cycloid, the mutual interference between the two members can be removed also in the ZY plane orthogonal to the Z-axial direction. When forming the clearance between the two members with a gap small as about 100 μm, the XY plane and ZY plane can be insulated from each other in terms of three-dimensional force. At the same time, the two members can be automatically centered with each other along the Z-axial direction.

Furthermore, this embodiment comprises the third and fourth pistons which operate in synchronous with the first and second pistons, which are the combustion pistons, and the third and fourth pistons are configured as the supercharger (turbo-pump). With this structure, compression (pressurized) gas can be supplied to the combustion chambers together with fuel, thus improving the combustion efficiency. Thus, various types of engines devices such as two-cycle turbo-engines, four-cycle turbo-engines and diesel engines can be easily realized.

In this embodiment, the shape of the pistons is not limited to oval, but it may as well be other non-circular shapes, for example, a rectangular shape with rounded corners, or other polygonal shape, or elliptical shape with a narrowed central portion.

(First Modification)

In the twelfth embodiment described above, the engine device is not limited to the two-cycle, but may be a four-cycle type. FIG. 24 is a diagram schematically showing a turbocharger mechanism according to the first modification suitable for a four-cycle engine device.

As shown in the figure, the turbocharger mechanism comprises an outlet pipe 130 which forms an exhaust passage 112. One end of the outlet pipe 130 is connected to the exhaust port of a second (third) cylinder 23*a* (23*b*) on a lower side, and the other end is connected to the inlet port of a first (second) cylinder 22*a* (22*b*) on an upper side. An intercooler 124 and an accumulate chamber 126 are provided for the outlet pipe 130, and also a relief valve 128 is connected to the accumulate chamber 126. Further, a carburetor 120 is connected to the inlet port of a second (third) cylinder 23*a* (23*b*) on the lower side. In the case of a four-cycle engine device, the diameter of the third fourth pistons 25*a* and 25*b* is equal to or less than the diameter of the first and second pistons 24*a* and 24*b*.

In the turbocharger mechanism configured as described above, the air-fuel mixture supplied to the third and fourth cylinders 23*a* and 23*b* from the carburetor 120 are pressurized and compressed by the third and fourth pistons 25*a* and 25*b* and then exhausted to the outlet pipe 130. The compressed air-fuel mixture is cooled with the intercooler 124 and temporarily reserved in the accumulate chamber 126. Thereafter, the mixture is supplied to the combustion chambers of the first and second cylinders 22*a* and 22*b* on the upper side via the outlet pipe 130 and the inlet ports.

(Second Modification)

Next, a turbocharger mechanism according to the second modification suitable for a four-cycle engine device will be described. In the following explanation, elements identical to those in the first modification will be denoted by the same reference numerals as in the first modification, respectively, and their detailed explanations will be omitted or simplified. Only elements different from those of the first modification will be mainly explained in detail.

Figure 25:
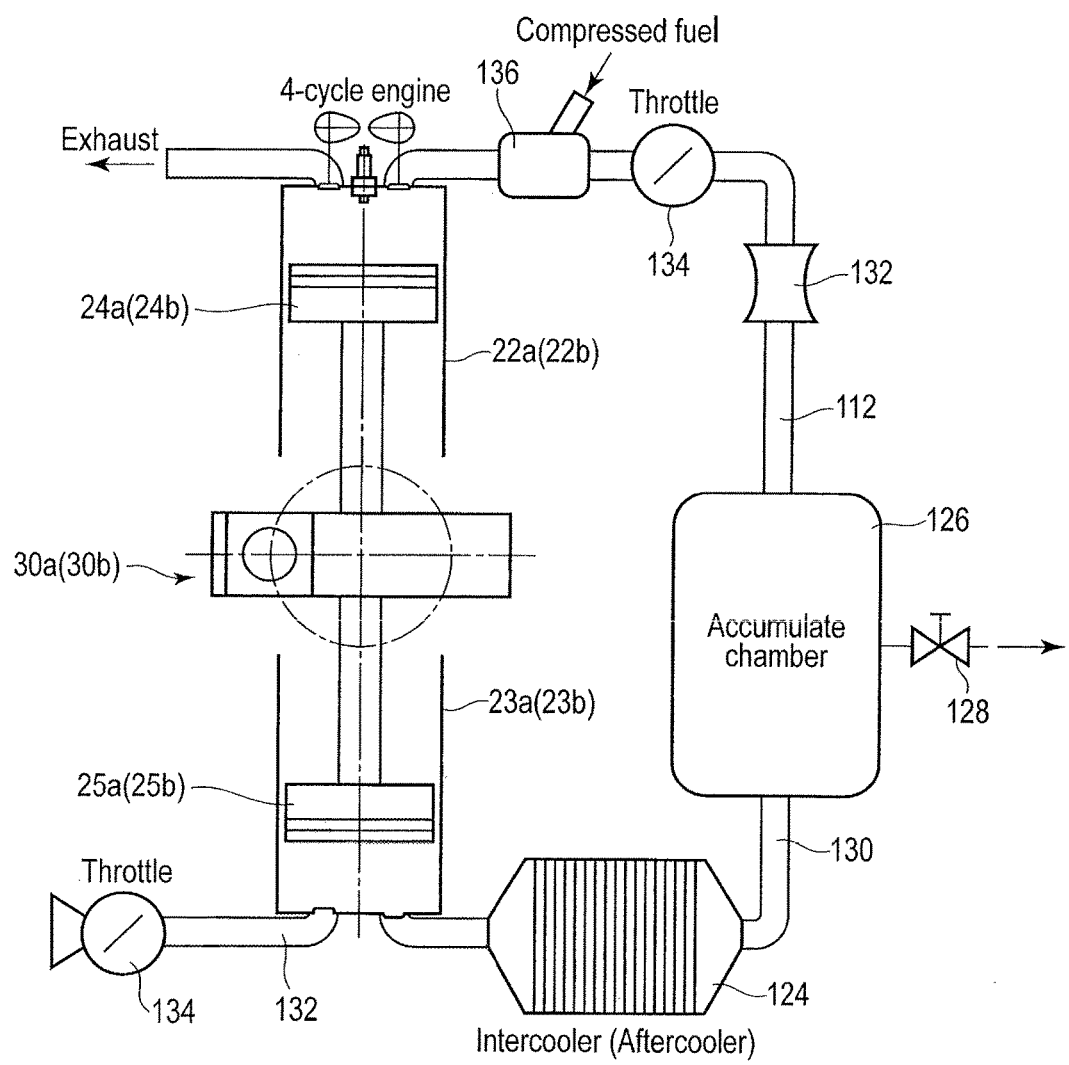
FIG. 25 is a diagram schematically showing a modification of the intake-and-exhaust system of the drive unit according to the twelfth embodiment.

FIG. 25 is a diagram schematically showing a turbocharger mechanism according to the second modification.

According to the second modification, in an outlet pipe 130 of the turbocharger mechanism, an air flow meter 132 for control, a throttle 134 and a fuel injector 136 are provided in order between an accumulate chamber 126 and first and second cylinders 22a and 22b. Further, air feed pipes 131 are connected respectively to inlet ports of second and third cylinders 23a and 23b on a lower side, and the throttle 134 is provided in each of the air feed pipes 131.

In the turbocharger mechanism configured as described above, the air supplied to the third and fourth cylinders 23a and 23b via the throttles 134 is pressurized and compressed by the third and fourth pistons 25a and 25b and then exhausted to the outlet pipe 130. The compressed air is cooled with the intercooler 124 and temporarily reserved in the accumulate chamber 126. Thereafter, the air is supplied to the combustion chambers of the first and second cylinders 22a and 22b on the upper side from the inlet ports via the air flow meter 132 and the throttle 134. During this period, the fuel is injected to the compressed air by an injector 136, and a mixture of the compressed air and the fuel is supplied to the combustion chambers.

According to the turbocharger mechanisms of the first and second modifications configured as described above, the air pressurized and compressed by the third and fourth pistons can be supplied together with fuel to the combustion chamber on the upper side, thereby improving the combustion efficiency. Note that the turbocharger mechanisms of the first and second modifications are applicable not only to four-cycle turboengine devices, but also to two-cycle engine devices, diesel engines, etc.

(Third Modification)

Next, an XY separate crank mechanism according to the third modification will be described. In the third modification, elements identical to those in the tenth to twelfth embodiments will be denoted by the same reference numerals as in the those embodiments, respectively, and their detailed explanations will be omitted or simplified. Only elements different from those of the embodiments will be mainly explained in detail.

Figure 30:
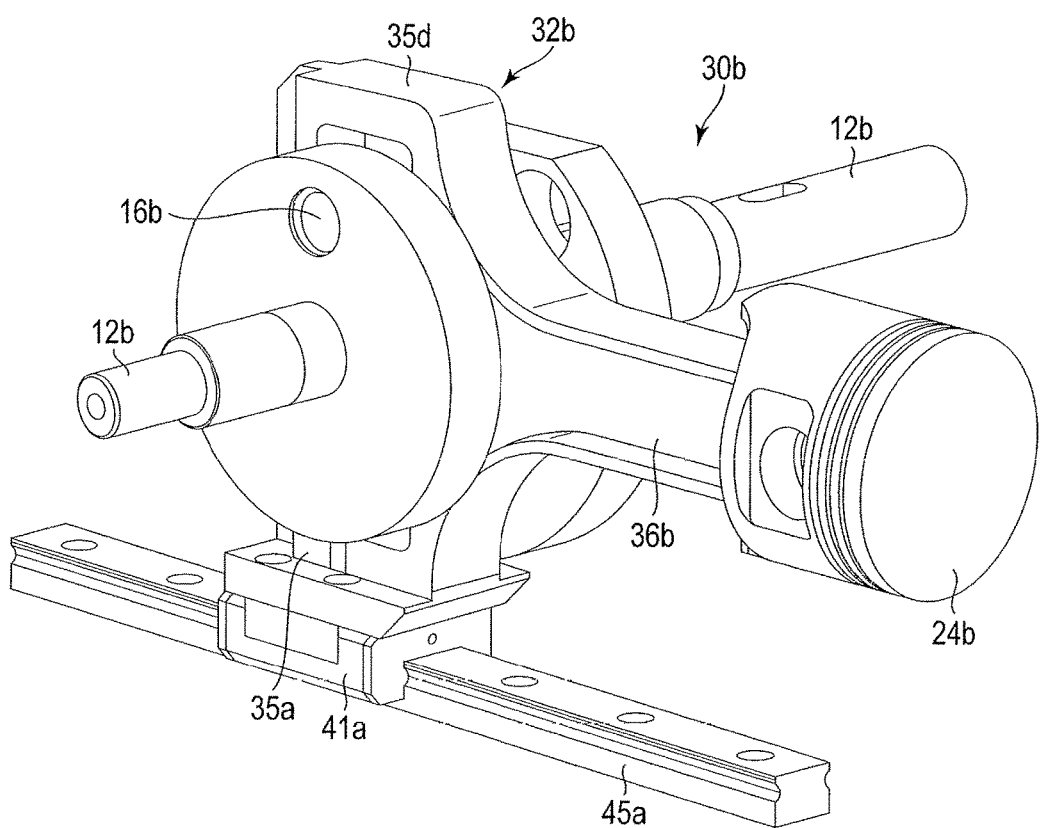
FIG. 30 is a perspective diagram showing an XY separate crank mechanism according to a third modification.
Figure 31:
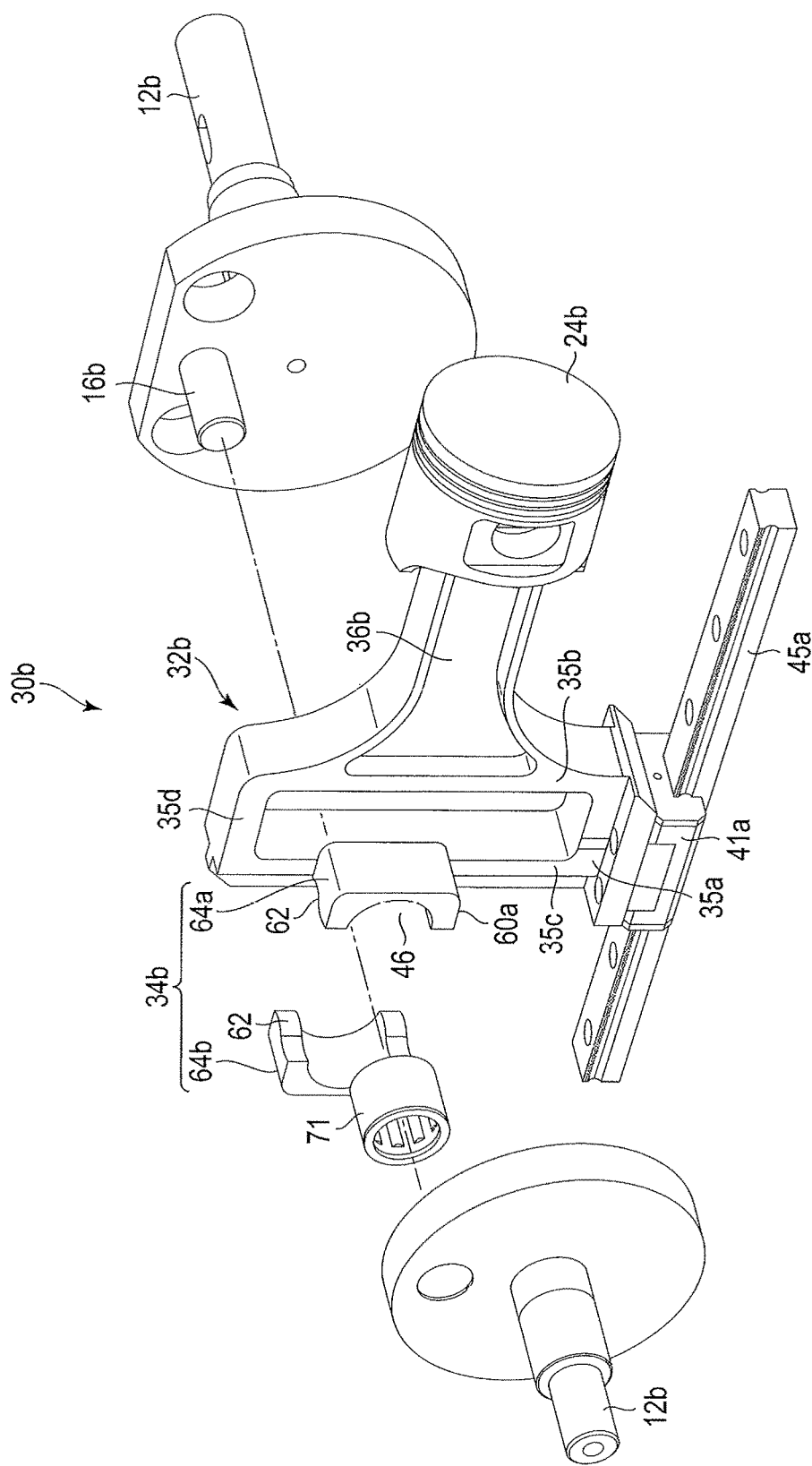
FIG. 31 is a perspective diagram showing an XY separate crank mechanism according to a third modification.

FIG. 30 is a perspective view showing the XY separate crank mechanism of the third modification and FIG. 31 is an exploded perspective view of the XY separate crank mechanism. Of the two XY separate crank mechanisms, the structure of a second XY separate crank mechanism 30b will be described as a typical example.

As shown in FIGS. 30 and 31, according to the third modification, in the second XY separate crank mechanism 30b, a roller bearing 71 is mounted in a through-hole 46 of a second crank connection member 34b and a crankpin 16b of a crankshaft 12 is penetrated to the roller bearing 71. The crankpin 16b is engaged rotatably with the second crank connection member 34b via the roller bearing 71.

In this case, the crankpin 16b of the crankshaft 12 is formed as a separated member from the crankshaft 12 and one set of crank webs 14b. In the assembly, the crankpin 16b is penetrated to the roller bearing 16b and then fixed to the crank webs. Moreover, in the third modification, the support member (combinator) 32b is fabricated into a rectangular frame shape as one unit. More specifically, the second support member 32b comprises a first support portion 35a extending along the second direction, second and third support portions 35b and 35c extending from both axial ends of the first support portion 35a along the fourth direction, and the extending end of the second support portion 35b and a fourth support portion 35d which couples an extending end of the second support portion 35b and an extending end of the third support portion 35c with each other and opposes the first support portion 35a with a gap therebetween, as one integral unit. Further, the second coupling rod 36b as a connection member which couples the piston 24b and the support member 32b with each other is fabricated integrally with the support member 32b as one unit.

The XY separate crank mechanism of the above-described structure is applicable to the XY separate crank mechanism of any of the tenth to twelfth embodiments described above. The crankpin 16b is supported rotatably by the roller bearing 71, and therefore the rotary motion of the crankpin 16b is even smoother, thereby making it possible to achieve an XY separate crank mechanism suitable for high rotation speed engines and the like.

The present invention is not limited to the embodiments or modifications described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A drive device for an engine comprising:
a first cylinder in a first mount plane located on one side of a central reference plane;
a first piston in the first cylinder reciprocatively along a first direction within the first mount plane;
a first crankshaft extending orthogonal to the first mount plane;
a first XY separation crank mechanism between the first piston and the first crankshaft within the first mount plane, which converts reciprocating motion of the first piston and rotary motion of the first crankshaft into each other;
a second cylinder in a second mount plane located on an opposite side of the central reference plane and located symmetrical to the first mount plane with regard to the central reference plane;
a second piston in the second cylinder reciprocatively along a second direction symmetrical to the first direction within the second mount plane;
a second crankshaft extending orthogonal to the second mount plane;
a second XY separation crank mechanism between the second piston and the second crankshaft within the second mount plane, which converts reciprocating motion of the second piston and rotary motion of the second crankshaft into each other; and
a coupler-synchronizing mechanism which couples the first crankshaft and the second crankshaft with each other and rotates the first crankshaft and the second crankshaft in a synchronous motion with each other,
the first XY separation crank mechanism comprising: a first support member component provided reciprocatively along in the first direction and including a first support portion extending along the first direction, a second support portion extending from the first support portion along a third direction orthogonal to the first direction within the first mount plane and a third support portion extending from the first support portion along the third direction to oppose the second support portion with a gap therebetween; a first crank connection member provided between the second support portion and the third support portion of the first support member to be reciprocative along the third direction within the first mount plane, which engages with a crankpin of the first crankshaft to be rotatable; and a first coupling member which couples the first piston and the first support member with each other, the second XY separation crank mechanism comprising: a second support member provided reciprocatively along the second direction and including a first support portion extending along the second direction, a second support portion extending from the first support portion along a fourth direction orthogonal to the second direction within the second mount plane; and a third support portion extending from the first support portion along the fourth direction and opposing the second support portion with a gap therebetween, a second crank connection member provided between the second support portion and the third support portion of the second support member to be reciprocative along the fourth direction within the second mount plane, which engages with a crankpin of the second crankshaft to be rotatable, and a second coupling member which couples the second piston and the second support member with each other, the first crank connection member and the second crank connection member, each comprising a first sliding portion supported by the second support portion to be reciprocative along the third direction or the fourth direction, a second sliding portion supported by the third support portion to be reciprocative along the third direction or the fourth direction, and a through-hole extending along a direction orthogonal to the first direction and the second direction, to which the crank of the first crankshaft or the second crankshaft is penetrated rotatably, and each of the first crank connection member and the second crank connection member being separated along a separated plane passing through a central axis of the through-hole and orthogonal to the first direction or the second direction into a first connection member including the first sliding portion and a second connection member including the second sliding portion, separation surfaces of the first and second connection members being formed into an uneven concave and convex surface configuration arranged along an axial direction of the through-hole, and the first connection member and the second connection member being mounted to the crankpins and engaged with each other while the separation surfaces are abutted against each other.

2. The drive device for an engine of claim 1, wherein the first crankshaft and the second crankshaft are arranged parallel to each other.

3. The drive device for an engine of claim 1, wherein the first direction and the second direction are orthogonal to the central reference plane, and extend to be coaxial with each other.

4. The drive device for an engine of claim 1, wherein the first direction and the second direction make an angle less than 180 degrees and cross each other at the central reference plane.

5. The drive device for an engine of claim 1, wherein the first direction and the second direction extend parallel to the central reference plane.

6. The drive device for an engine of claim 1, wherein the first piston is formed into an un-circular shape including an oval shape having a long axis and a short axis orthogonal to the first direction, and the second piston is formed into an un-circular shape including an oval shape having a long axis and a short axis orthogonal to the second direction.

7. The drive device for an engine of claim 6, wherein the first piston is arranged so as to direct the long axis thereof parallel to the third direction and the second piston is arranged so as to direct the long axis thereof parallel to the fourth direction.

8. The drive device for an engine of claim 1, wherein the coupler-synchronizing mechanism comprises a first gear mounted to the first crankshaft and a second gear mounted to the second crankshaft and the first gear and the second gear are formed to have a same diameter and a same number of teeth.

9. The drive device for an engine of claim 1, wherein the coupler-synchronizing mechanism comprises a first drive pulley mounted to the first crankshaft, a second drive pulley mounted to the second crankshaft and a driving belt looped over the first drive pulley and the second drive pulley to rotate the first and second crankshafts in opposite directions to each other and in a synchronous motion with each other.

10. The drive device for an engine of claim 1, wherein the first and second XY separation crank mechanisms each comprise a roller bearing mounted in the through-hole of each of the first crank connection member and the second crank connection member, and the crankpin is supported rotatably by the roller bearing.

11. The drive device for an engine of claim 1, further comprising: a first drive motor which rotates the first crankshaft in the first direction; and a second drive motor which rotates the second crankshaft in the second direction opposite to the first direction, thereby forming a compressor which outputs compression gas compressed by the first piston and the second piston.

12. The drive device for an engine of claim 1, configured to provide outputs identical to each other in opposite rotations to each other synchronously from the first crankshaft and the second crankshaft.

13. A drive device for an engine comprising:
a first drive unit including a first crankshaft and provided on one side of a central reference plane;
a second drive unit including a second crankshaft, having a structure identical to that of the first drive unit, and disposed on an opposite side of the central reference plane, to be symmetrical to the first drive unit with regard to the central reference plane; and
a coupler-synchronizing mechanism which couples the first crankshaft and the second crankshaft to rotate the first crankshaft and the second crankshaft in a synchronous motion with each other in opposite directions to each other,
the first drive unit comprising: a first cylinder; a first piston in the first cylinder reciprocatively along a first direction; a first crankshaft extending orthogonal to the first mount plane and including a movable axis of the first piston along the first direction; and a first XY separation crank mechanism between the first piston and the first crankshaft within the first mount plane, which converts reciprocating motion of the first piston and rotary motion of the first crankshaft into each other;
the second drive unit comprising: a second cylinder; a second piston in the second cylinder reciprocatively along a second direction symmetrical to the first direction with regard to the central reference plane; a second crankshaft extending orthogonal to the second mount plane and including a movable axis of the second piston along the second direction and located to be symmetrical to the first mount plane with regard to the central reference plane; and a second XY separation crank mechanism between the second piston and the second crankshaft within the second mount plane, which converts reciprocating motion of the second piston and rotary motion of the second crankshaft into each other;

the first XY separation crank mechanism comprising: a first support member provided reciprocatively along the first direction, including a first support portion extending along the first direction and a second support portion extending from the first support portion along a third direction orthogonal to the first direction within the first mount plane; a first crank connection member mounted reciprocatively to the first support member along the third direction within the first mount plane, to which a crankpin of the first support member is engaged rotatably; and a first coupling member which couples the first piston and the first support member with each other, and the second XY separation crank mechanism comprising: a second support member provided reciprocatively along the second direction and including a first support portion extending along the second direction; a second support portion extending from the first support portion along a fourth direction orthogonally to the second direction within the second mount plane; a second crank connection member mounted to the second support member reciprocatively along the fourth direction within the second mount plane, to which the crankpin of the second crankshaft is engaged rotatably; and a second coupling member which couples the second piston and the second support member, the second support member, the second crank connection member and the second coupling member being symmetrical respectively to the first support member, the first crank connection member and the first coupling member of the first XY separation crank mechanism, with regard to the central reference plane.

14. A drive device for an engine comprising:
a first drive unit including a first crankshaft and provided on one side of a central reference plane;
a second drive unit including a second crankshaft, having a structure identical to that of the first drive unit, and disposed provided on an opposite side of the central reference plane, to be symmetrical to the first drive unit with regard to the central reference plane; and
a coupler-synchronizing mechanism which couples the first crankshaft and the second crankshaft to rotate the first crankshaft and the second crankshaft in a synchronous motion with each other in opposite directions to each other,
the first drive unit comprising: a first cylinder; a first piston in the first cylinder reciprocatively along a first direction; a third cylinder coaxially with the first cylinder; a third piston in the third cylinder reciprocatively along the first direction; the first crankshaft provided between the first piston and the third piston and extending orthogonal to a first mount plane which includes a movable axis extending along the first direction; and a first XY separation crank mechanism provided between the first piston and the third piston and the first crankshaft within the first mount plane, which converts the reciprocating motion of the first piston and the third piston and the rotary motion of the first crankshaft into each other;

the second drive unit comprising: a second cylinder; a second piston in the second cylinder reciprocatively along a second direction symmetrical to the first direction with regard to the central reference plane; a fourth cylinder coaxially with the second cylinder; a fourth piston in the fourth cylinder reciprocatively along the second direction; a second crankshaft provided between the second piston and the fourth piston and extending orthogonal to the second mount plane including a movable axis of the second piston along the second direction; and a second XY separation crank mechanism between the second piston and the fourth piston and the second crankshaft within the second mount plane, which converts the reciprocating motion of the second piston and the fourth piston and the rotary motion of the second crankshaft into each other;

the first XY separation crank mechanism comprising: a first support member provided reciprocatively along in the first direction; a first crank connection member mounted to the first support member reciprocatively along a third direction orthogonal to the first direction within the first mount plane, to which a crankpin of the first crankshaft is engaged rotatably; a first coupling member which couples the first piston and the first support member with each other; and a third coupling member which couples the third piston and the first support member with each other, and the second XY separation crank mechanism comprising: a second support member provided reciprocatively along the second direction; a second crank connection member mounted to the second support member, reciprocatively along a fourth direction orthogonally to the second direction within the second mount plane, to which a crankpin of the second crankshaft is engaged rotatably; a second coupling member which couples the second piston and the second support member; and a fourth coupling member which couples the second piston and the fourth support member.

15. The drive device for an engine of claim 14, further comprising: an exhaust passage which supplies the compression gas compressed in the third cylinder and the fourth cylinder and discharged from the third cylinder and the fourth cylinder to an inlet side of the first cylinder and the second cylinder.

16. The drive device for an engine of claim 14, wherein the first support member of the first XY separation crank mechanism includes a first support portion extending along the first direction, a second support portion extending from the first support portion along the third direction within the first mount plane, a third support portion extending from the first support portion along the third direction and opposing the second support portion with a gap therebetween,
the first crank connection member comprises a first sliding portion supported by the second support portion reciprocatively along the third direction, a second sliding portion supported by the third support portion reciprocatively along the third direction and a through-hole extending along a direction orthogonal to the first direction, to which the crankpin of the first crankshaft is penetrated rotatably, the first coupling member being coupled with the first support portion and the third coupling member being coupled with the third support portion, and
the second support member of the second XY separation crank mechanism includes a first support portion extending in the second direction, a second support portion extending from the second support portion along the fourth direction, a third support portion extending from the first support portion along the fourth direction and opposing the second support portion with a gap therebetween, and the second crank connection member comprises a first sliding portion supported by the second support portion reciprocatively along the fourth direction, a second sliding portion supported by the third support portion reciprocatively along the fourth direction, and a through-hole extending in a direction orthogonal to the second direction, to which the crankpin of the second crankshaft is penetrated rotatably, the second coupling member being coupled with the first support portion and the fourth coupling member being coupled with the third support portion.

17. The drive device for an engine of claim 16, wherein each of the first crank connection member and the second crank connection member is separated along a separated plane passing through a central axis of the through-hole and orthogonal to the first direction or the second direction into a first connection member including the first sliding portion and a second connection member including the second sliding portion, separation surfaces of the first and second connection members being formed into an uneven concave and convex surface configuration arranged along an axial direction of the through-hole, and the first connection member and the second connection member being mounted to the crankpin and engaged with each other while the separation surfaces are abutted against each other.

18. The drive device for an engine of claim 14, wherein the third piston and the fourth piston have a same diameter, and the first piston has a diameter greater than that of the second piston.

\* \* \* \* \*